(12) United States Patent
Yawata et al.

(10) Patent No.: US 8,027,145 B2
(45) Date of Patent: Sep. 27, 2011

(54) CAPACITOR ELEMENT AND METHOD OF MANUFACTURING CAPACITOR ELEMENT

(75) Inventors: Kazushi Yawata, Tsukuba (JP); Hidetoshi Masuda, Takasaki (JP); Masaru Kurosawa, Takasaki (JP); Kotaro Mizuno, Takasaki (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 511 days.

(21) Appl. No.: 12/182,110

(22) Filed: Jul. 29, 2008

(65) Prior Publication Data

US 2009/0034162 A1 Feb. 5, 2009

(30) Foreign Application Priority Data

Jul. 30, 2007 (JP) .................................. 2007-197039
Dec. 20, 2007 (JP) .................................. 2007-329326

(51) Int. Cl.
  *H01G 4/005* (2006.01)
  *H01G 4/06* (2006.01)
(52) U.S. Cl. ........................................ 361/303; 361/311
(58) Field of Classification Search .................. 361/303, 361/311
See application file for complete search history.

(56) References Cited

U.S. PATENT DOCUMENTS

| 7,645,669 | B2 | 1/2010 | Hsu et al. |
| 2007/0273263 | A1 | 11/2007 | Hudspeth et al. |
| 2008/0129178 | A1 | 6/2008 | Hudspeth et al. |
| 2008/0180883 | A1* | 7/2008 | Palusinski et al. ............. 361/524 |
| 2008/0197399 | A1* | 8/2008 | Hsu et al. ....................... 257/307 |
| 2009/0154054 | A1 | 6/2009 | Masuda et al. |
| 2009/0195963 | A1 | 8/2009 | Masuda et al. |

FOREIGN PATENT DOCUMENTS

| JP | S61-029133 B | 7/1986 |
| JP | 03155110 A * | 7/1991 |
| JP | 2001-196263 A | 7/2001 |
| JP | 2003-011099 A | 1/2003 |
| JP | 2003-249417 A1 | 9/2003 |

OTHER PUBLICATIONS

Non-Final Office Action dated May 9, 2011, of U.S. Appl. No. 12/238,423, filed Sep. 25, 2008.
Non-Final Office Action dated May 9, 2011, issued for U.S. Appl. No. 12/238,423.

* cited by examiner

*Primary Examiner* — Eric Thomas
(74) *Attorney, Agent, or Firm* — Law Office of Katsuhiro Arai

(57) ABSTRACT

There are provided a porous plate dielectric substance, pillar-shaped electrodes respectively formed in pores belonging to a first group and pores belonging to a second group alternately arranged on the dielectric substance, insulator layers made of an organic insulator formed on tips of pillar-shaped electrodes in the pores of the first and second groups so as to fill the pores and hide electrodes respectively provided on one principal surface and another principal surface of the dielectric substance and connected to base ends of the pillar-shaped electrodes.

14 Claims, 32 Drawing Sheets

[Fig. 1]
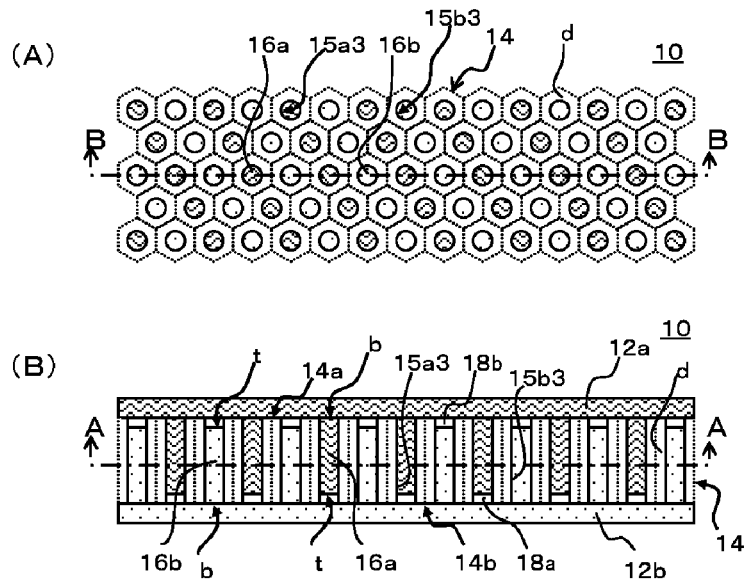
[Fig. 2]
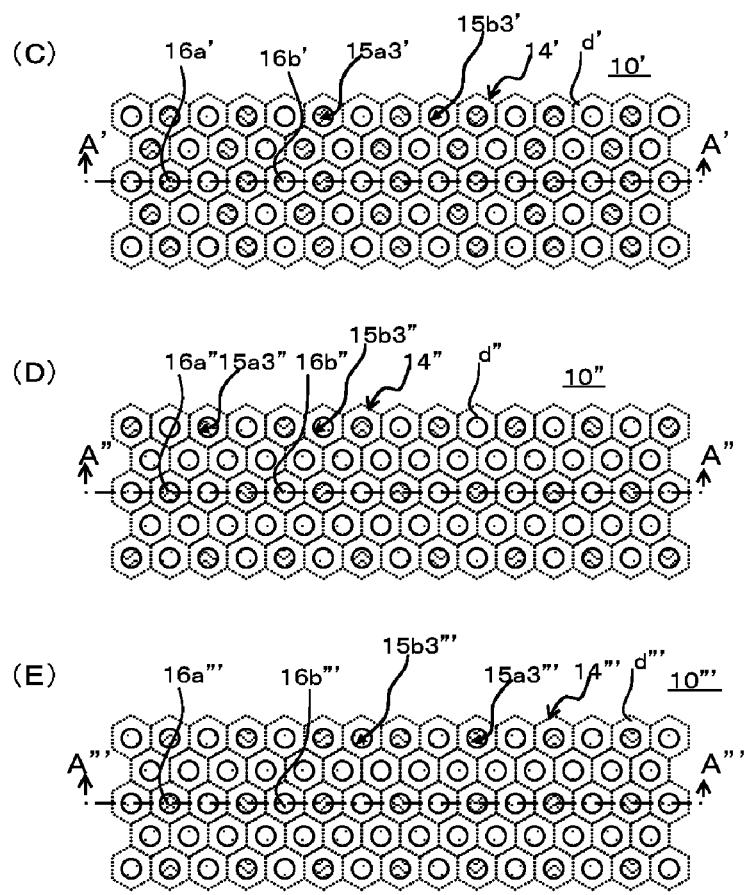

[Fig. 3]
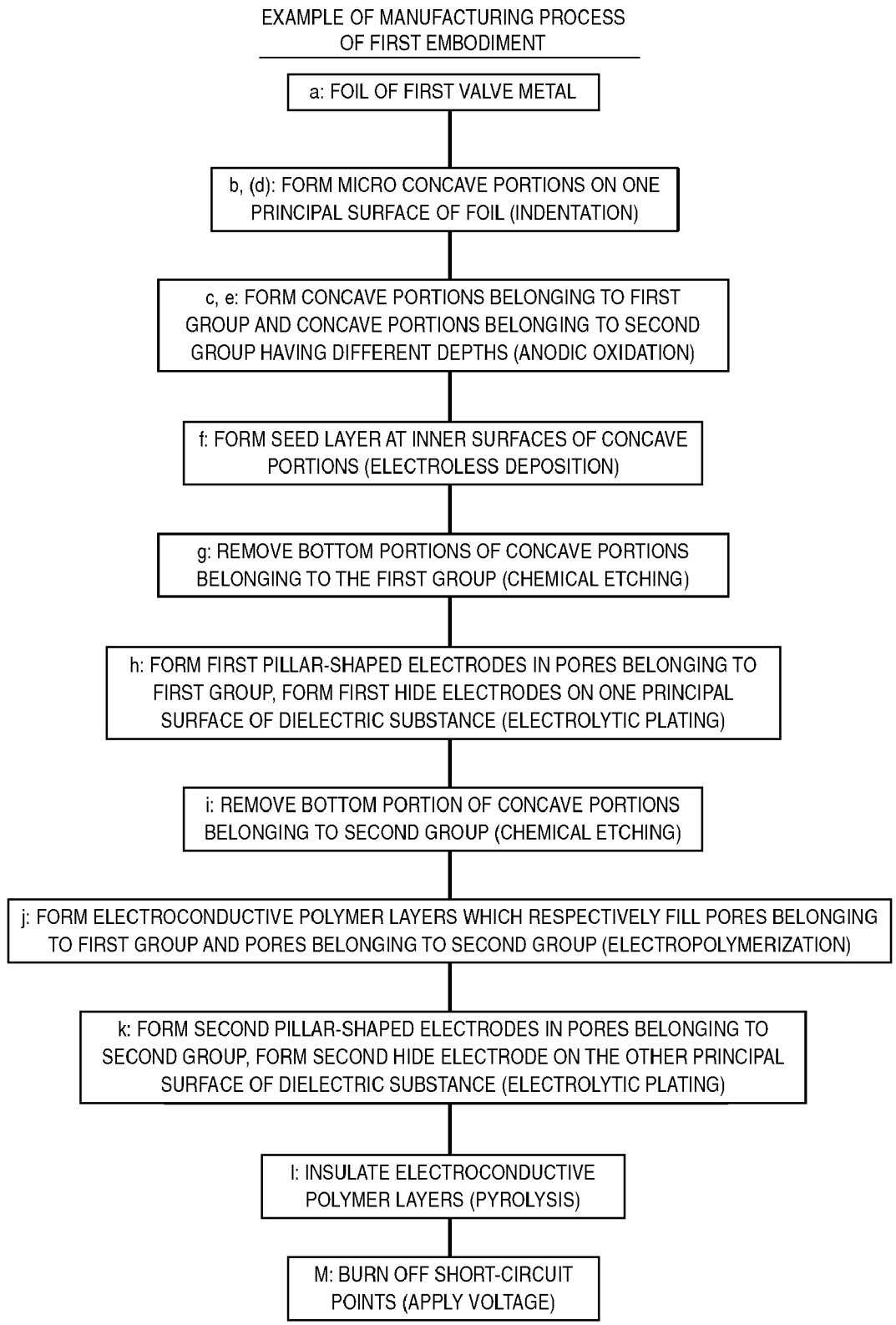

[Fig. 4]
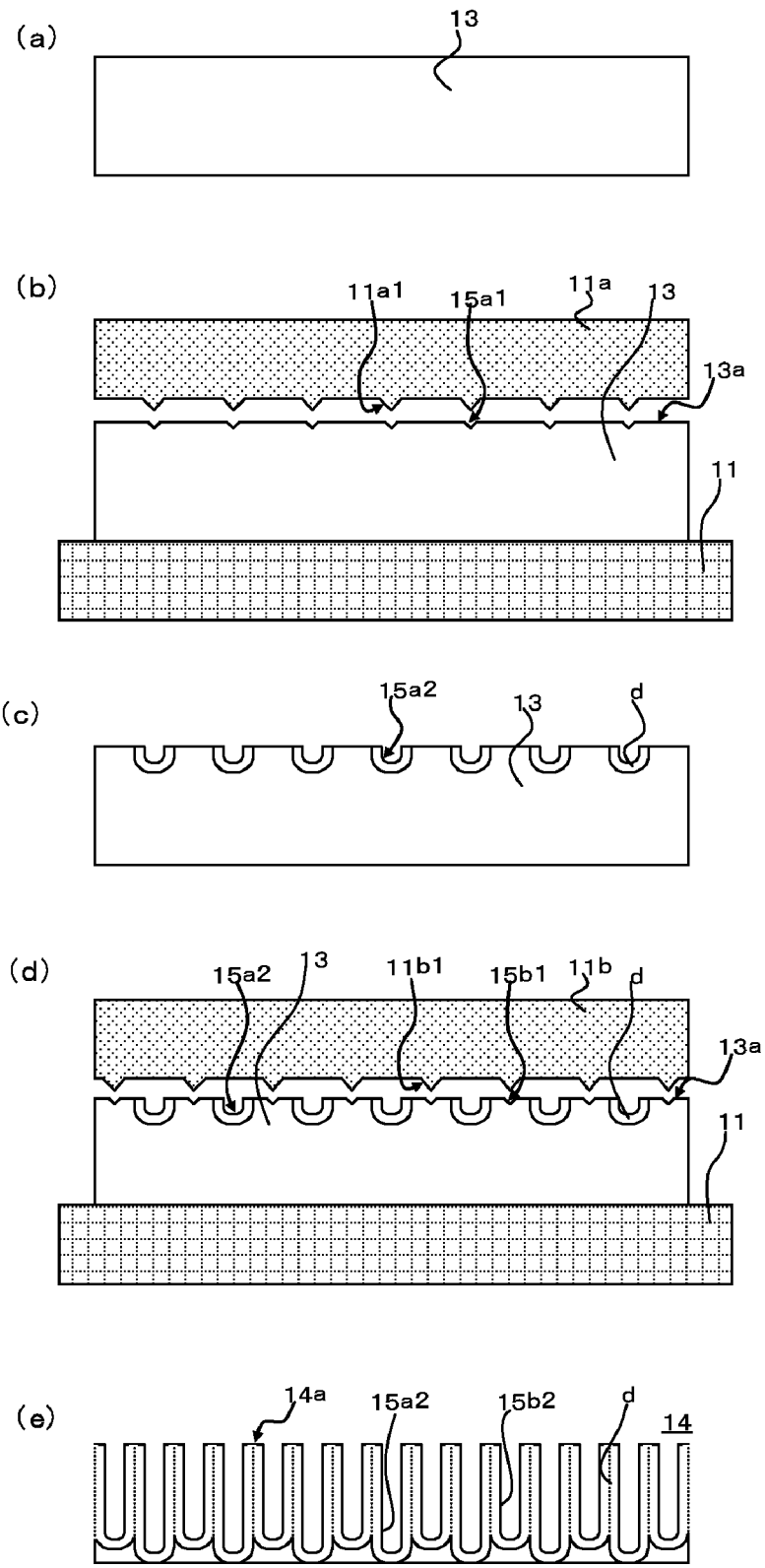

[Fig. 5]
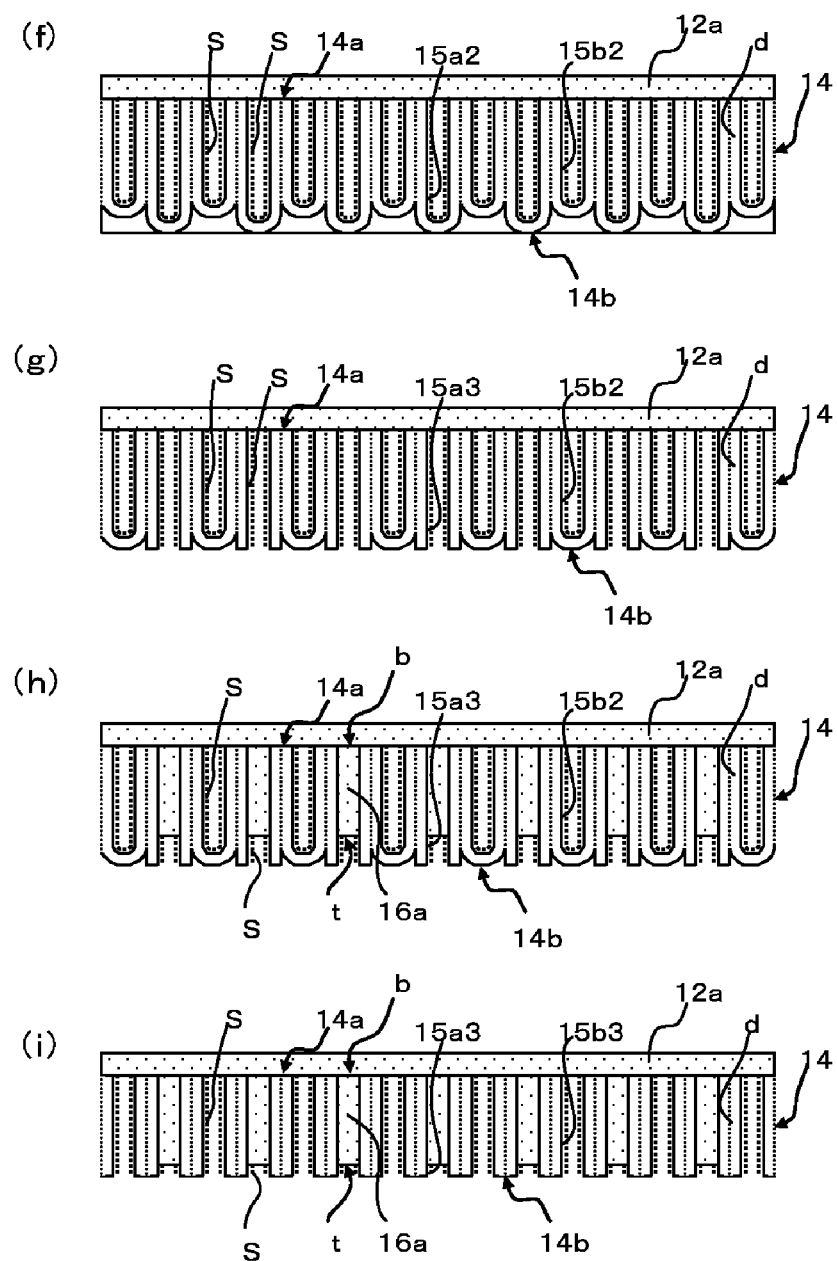

[Fig. 6]
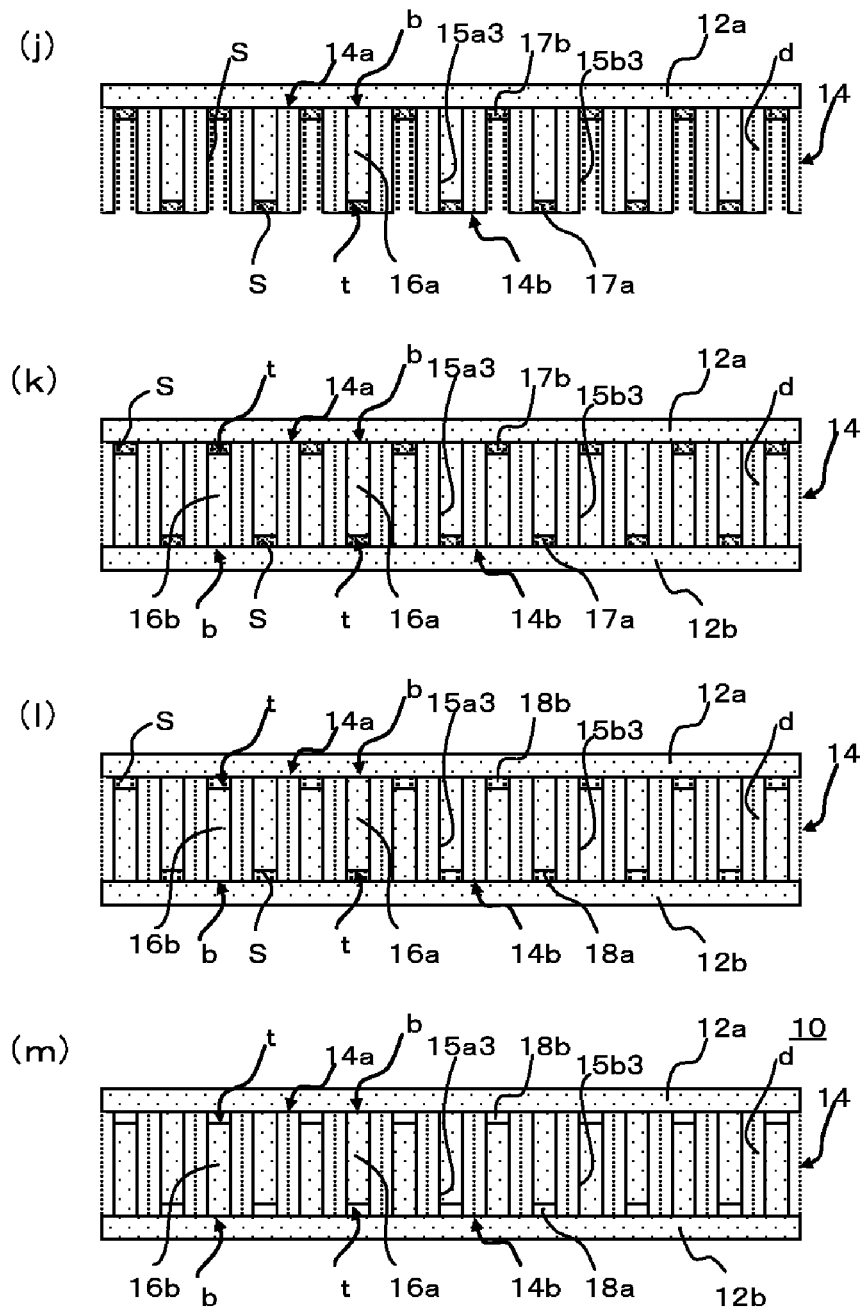

[Fig. 7]
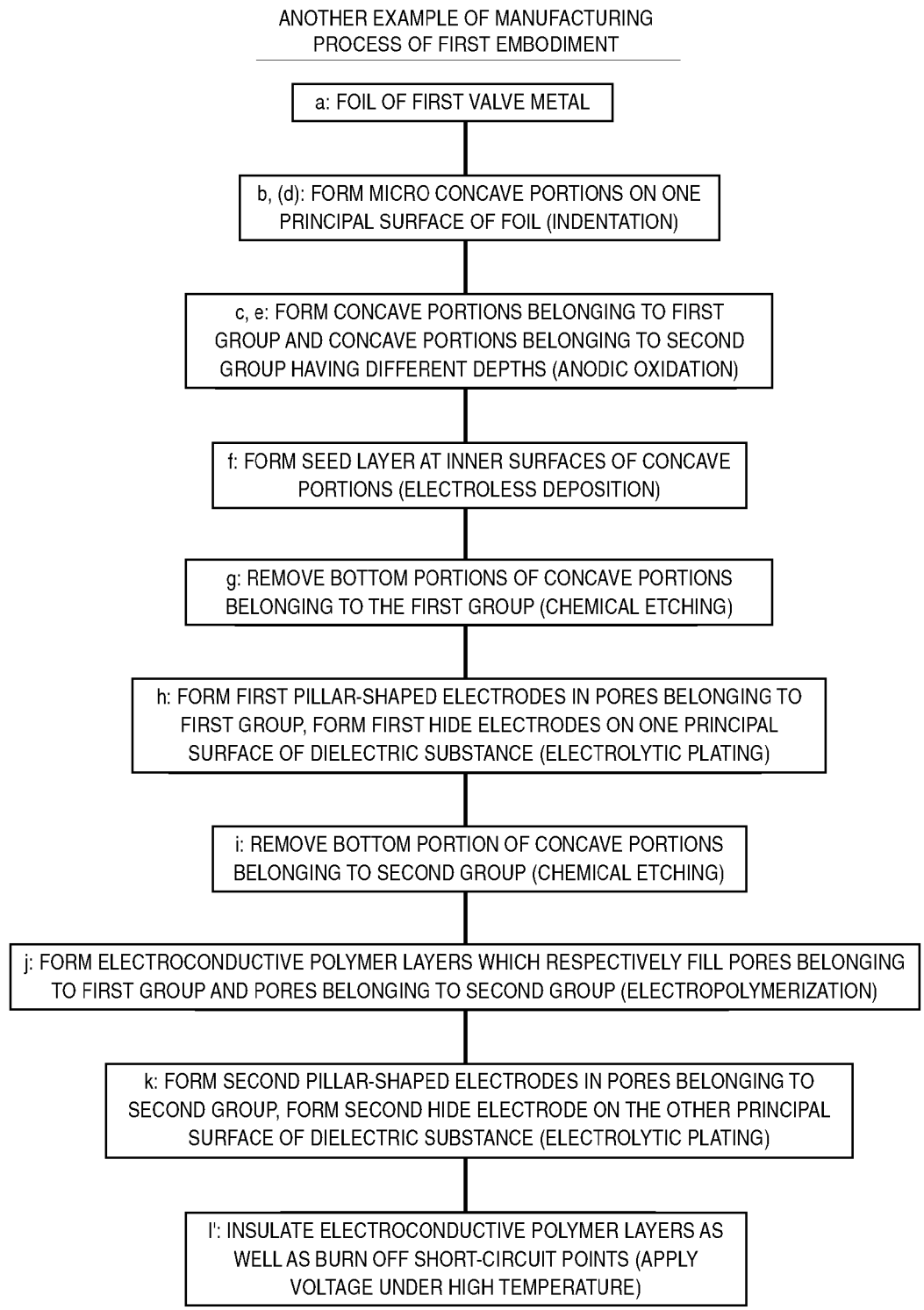

[Fig. 8]
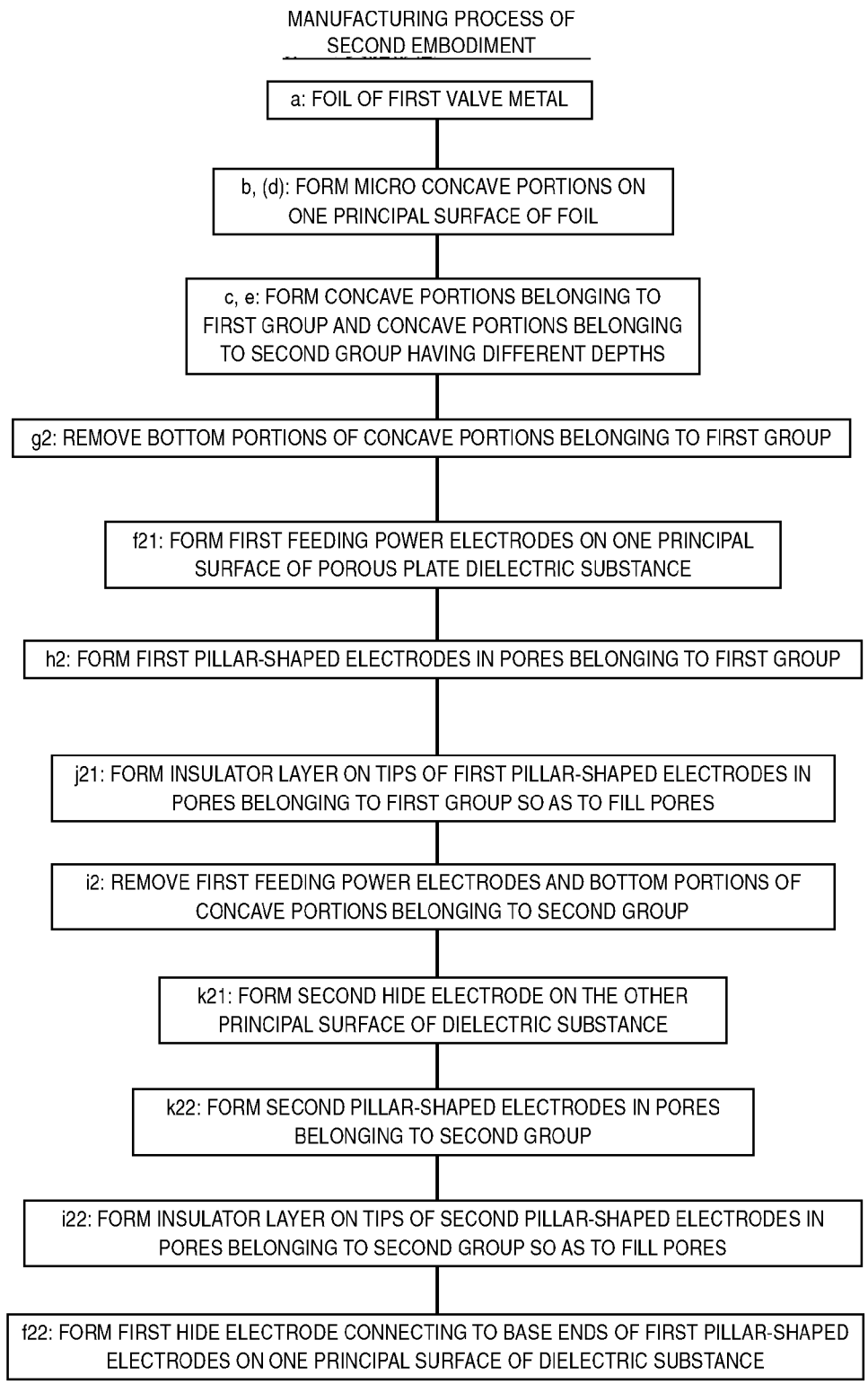

[Fig. 9]
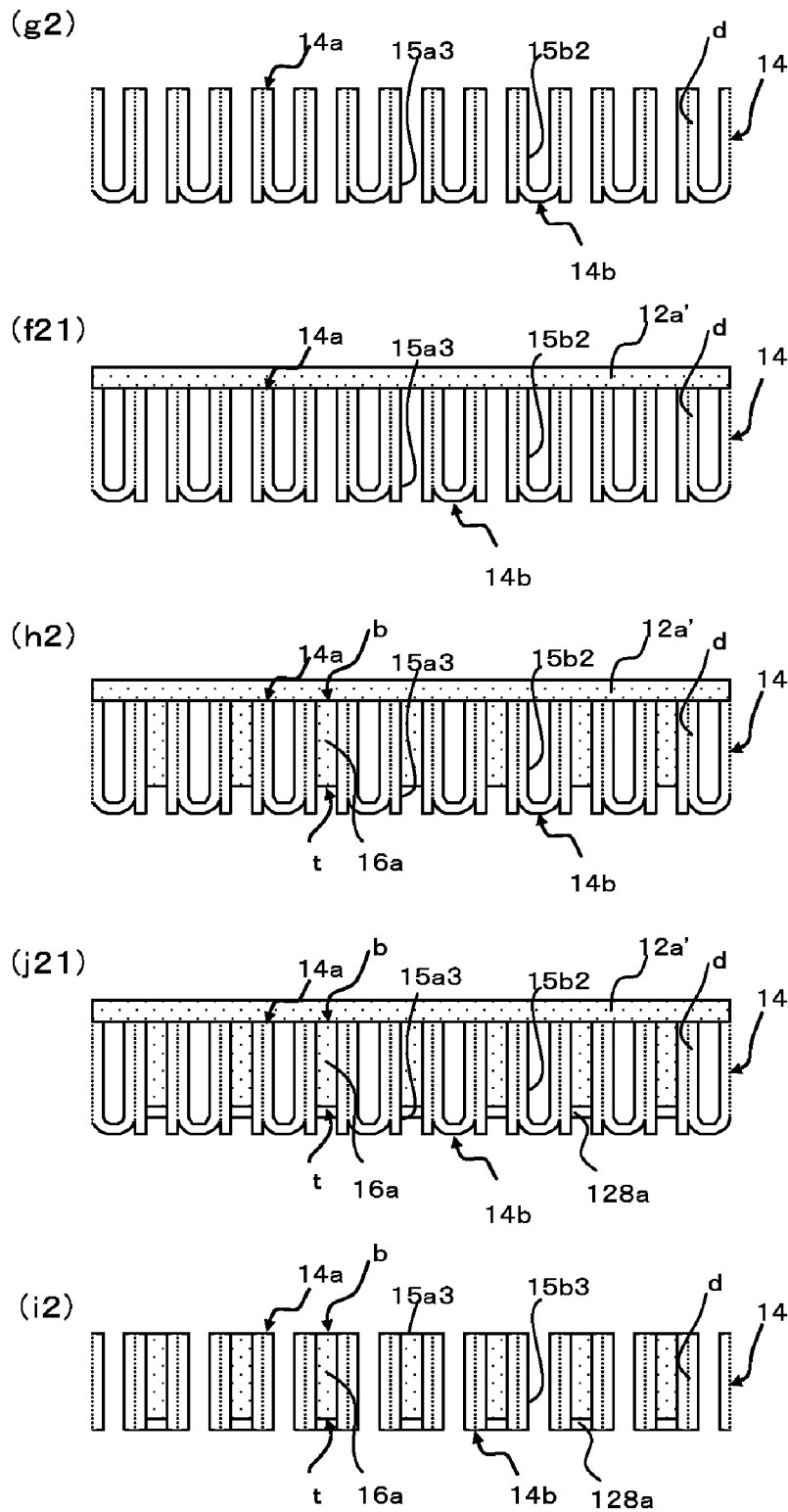

[Fig. 10]
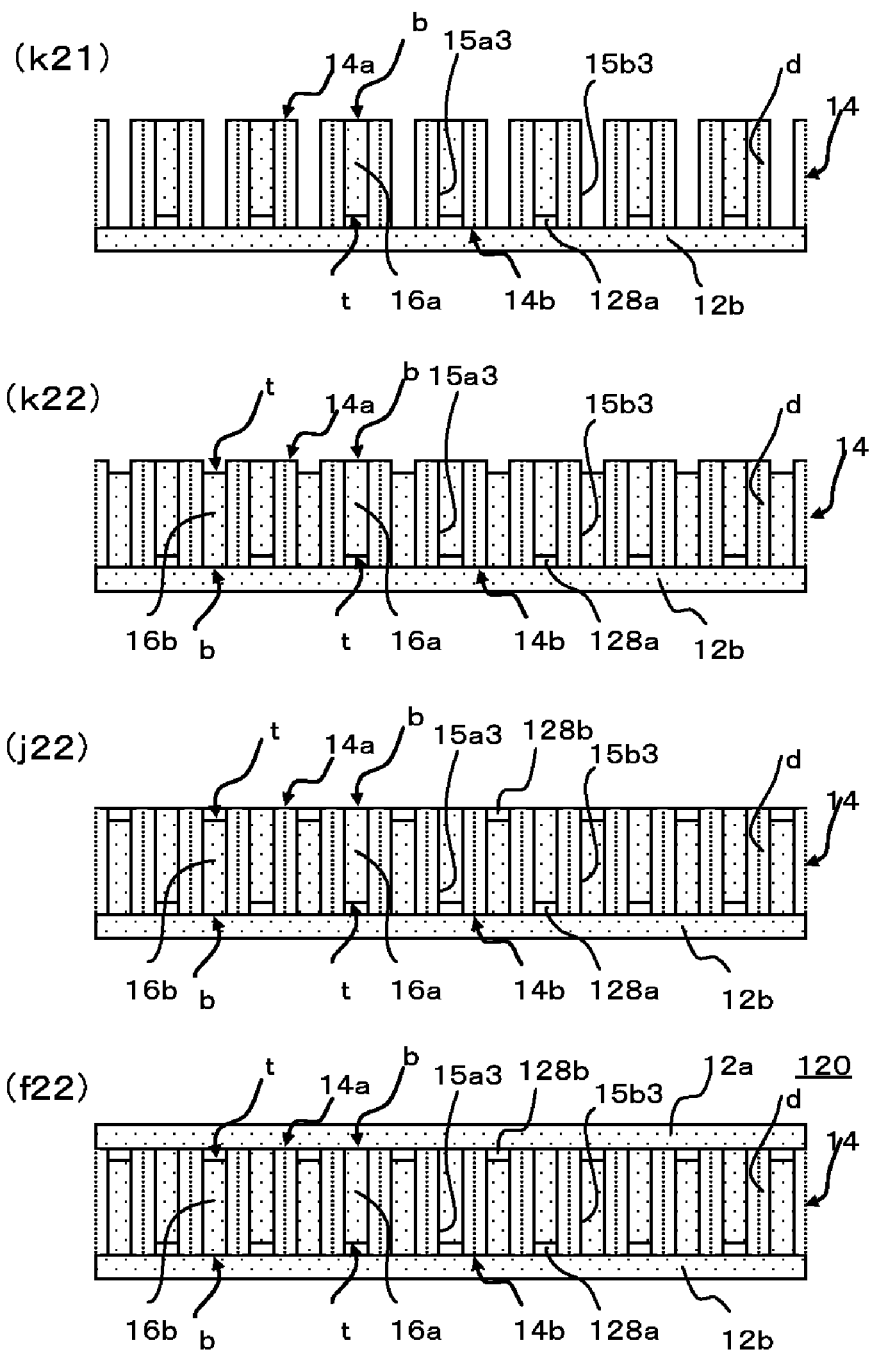

[Fig. 11]
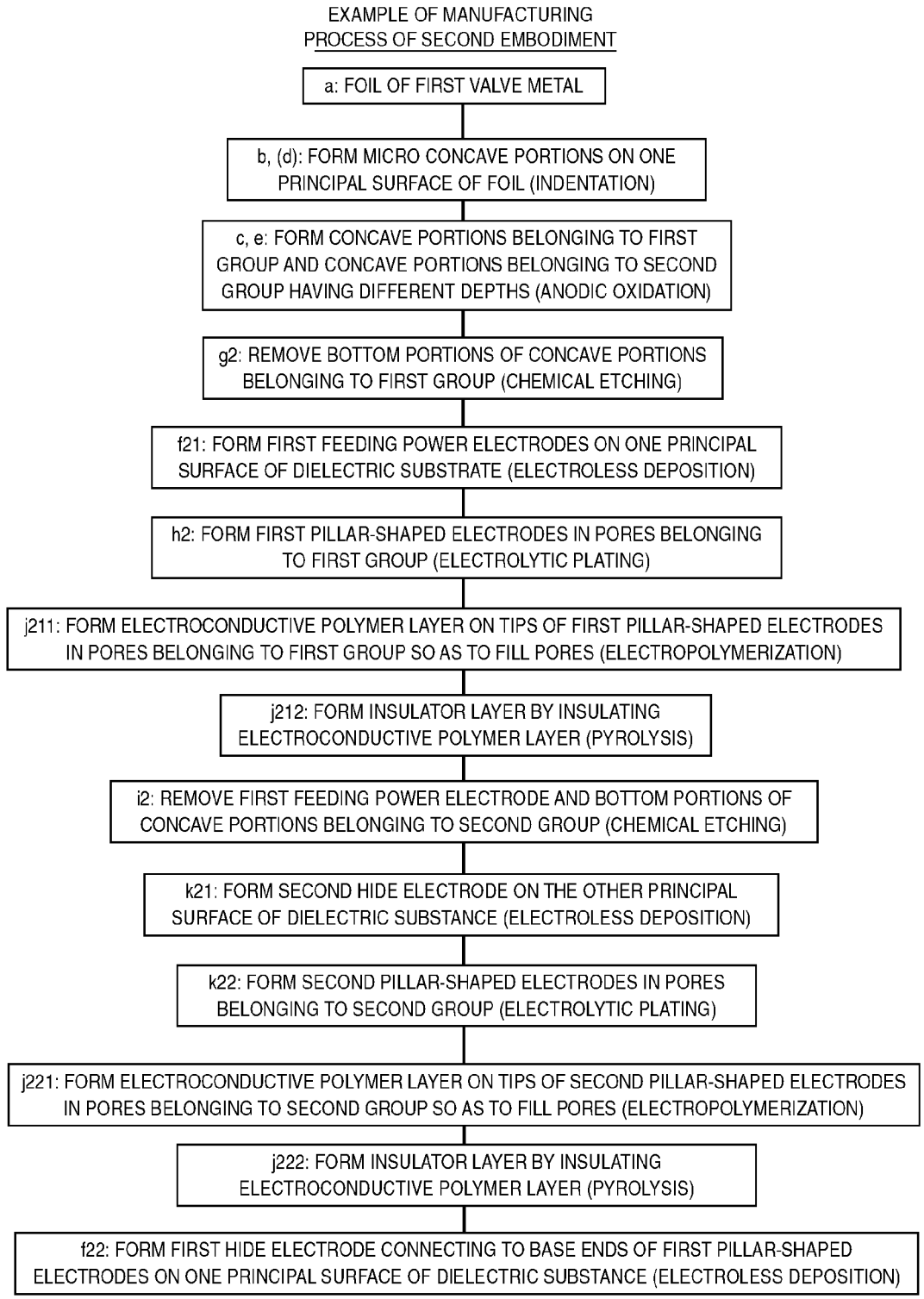

[Fig. 12]
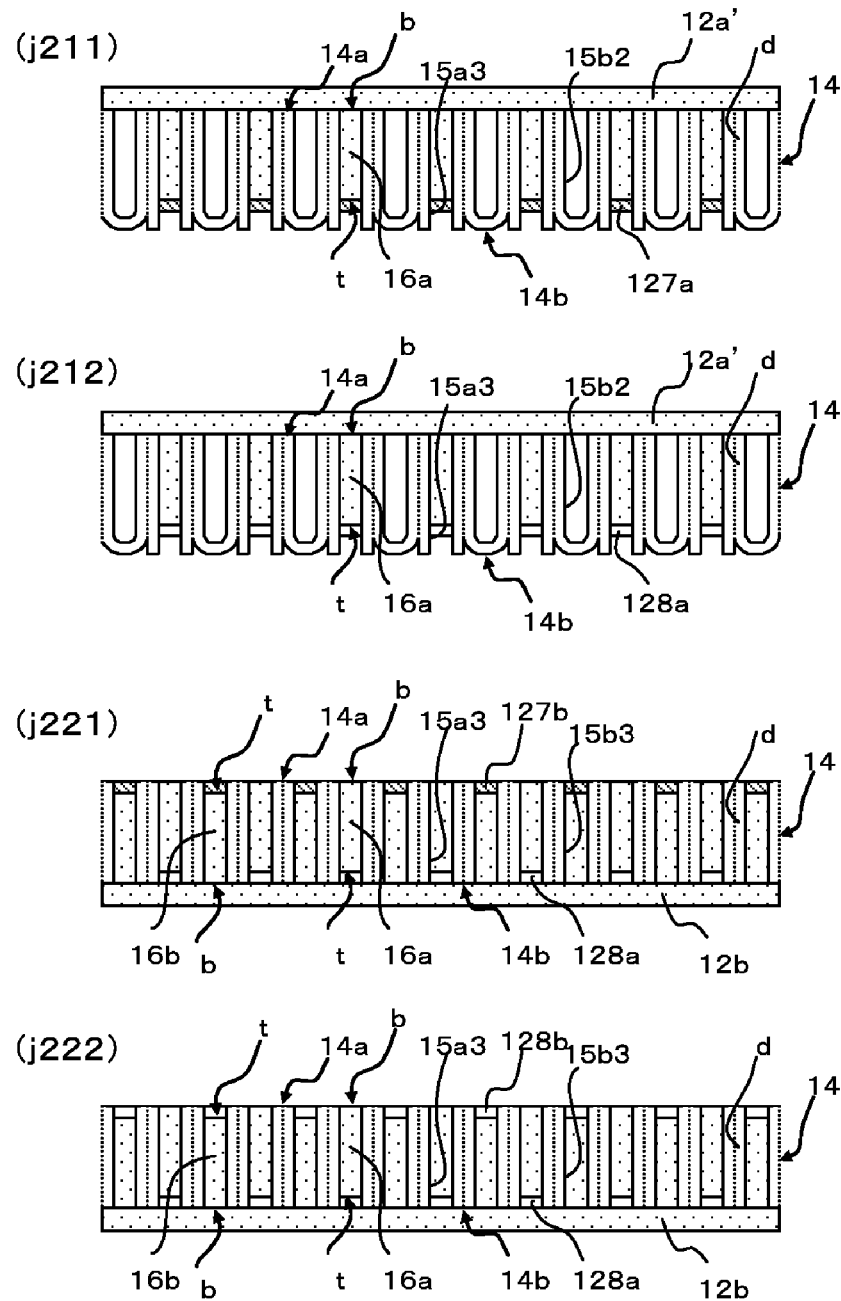

[Fig. 13]
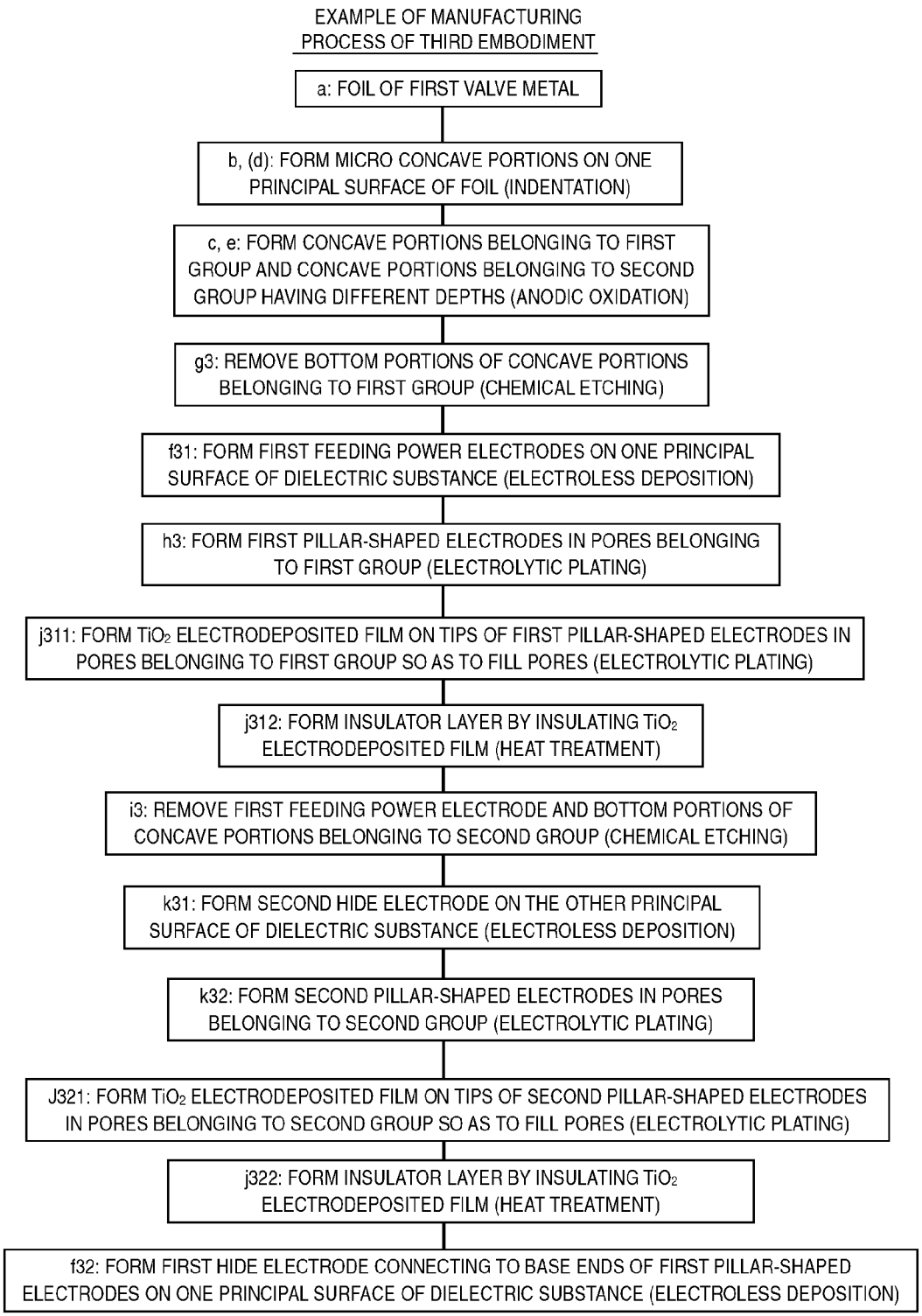

[Fig. 14]
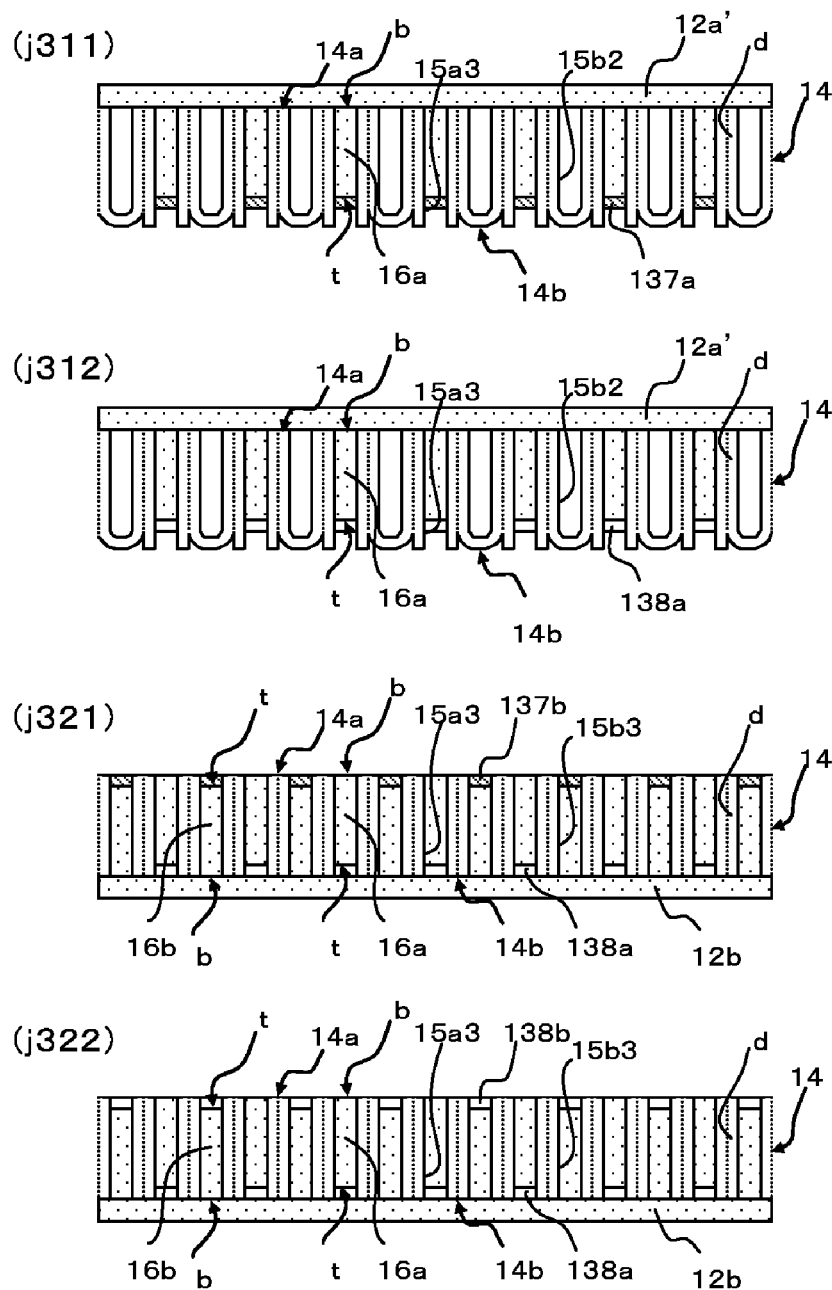

[Fig. 15]
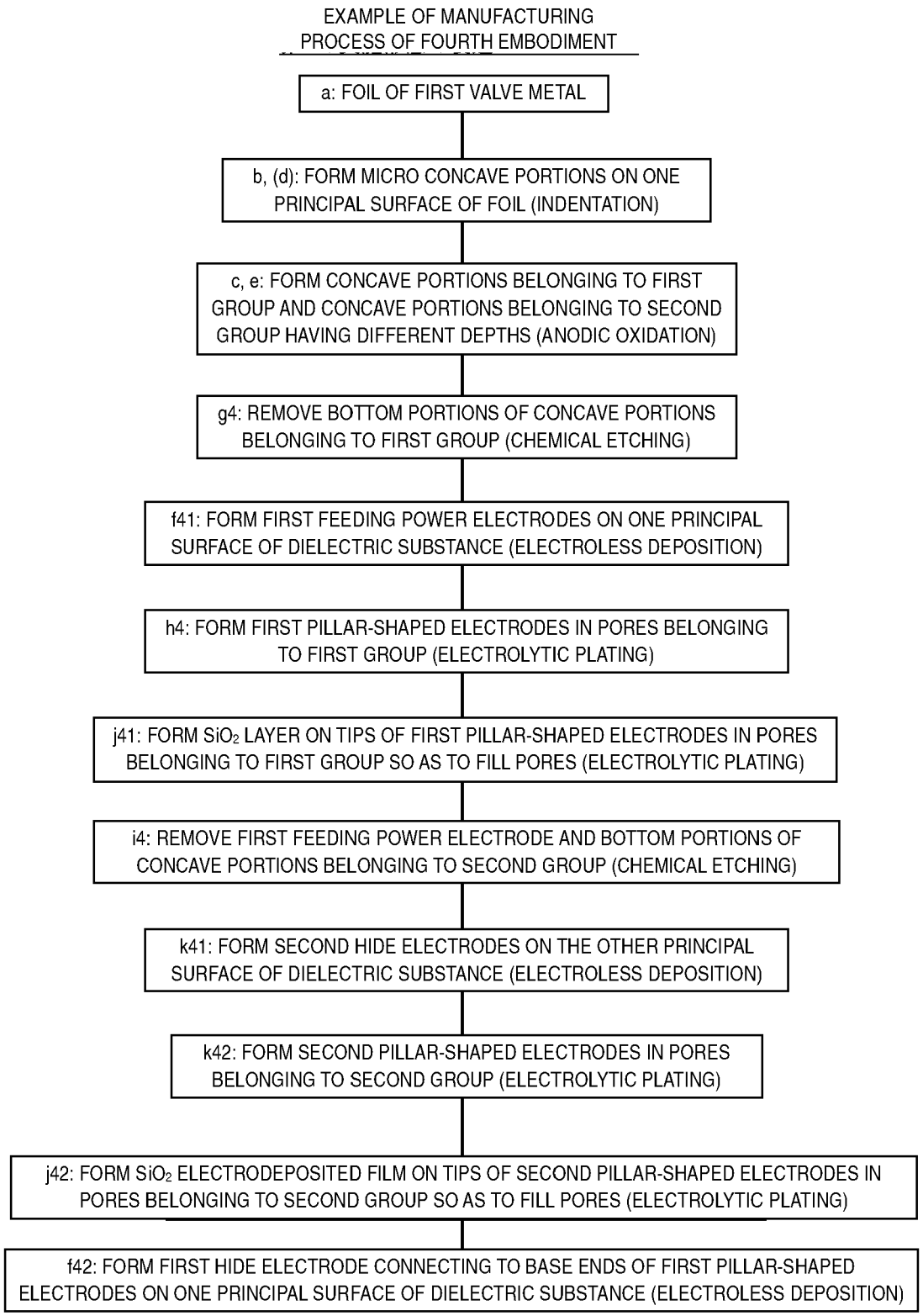

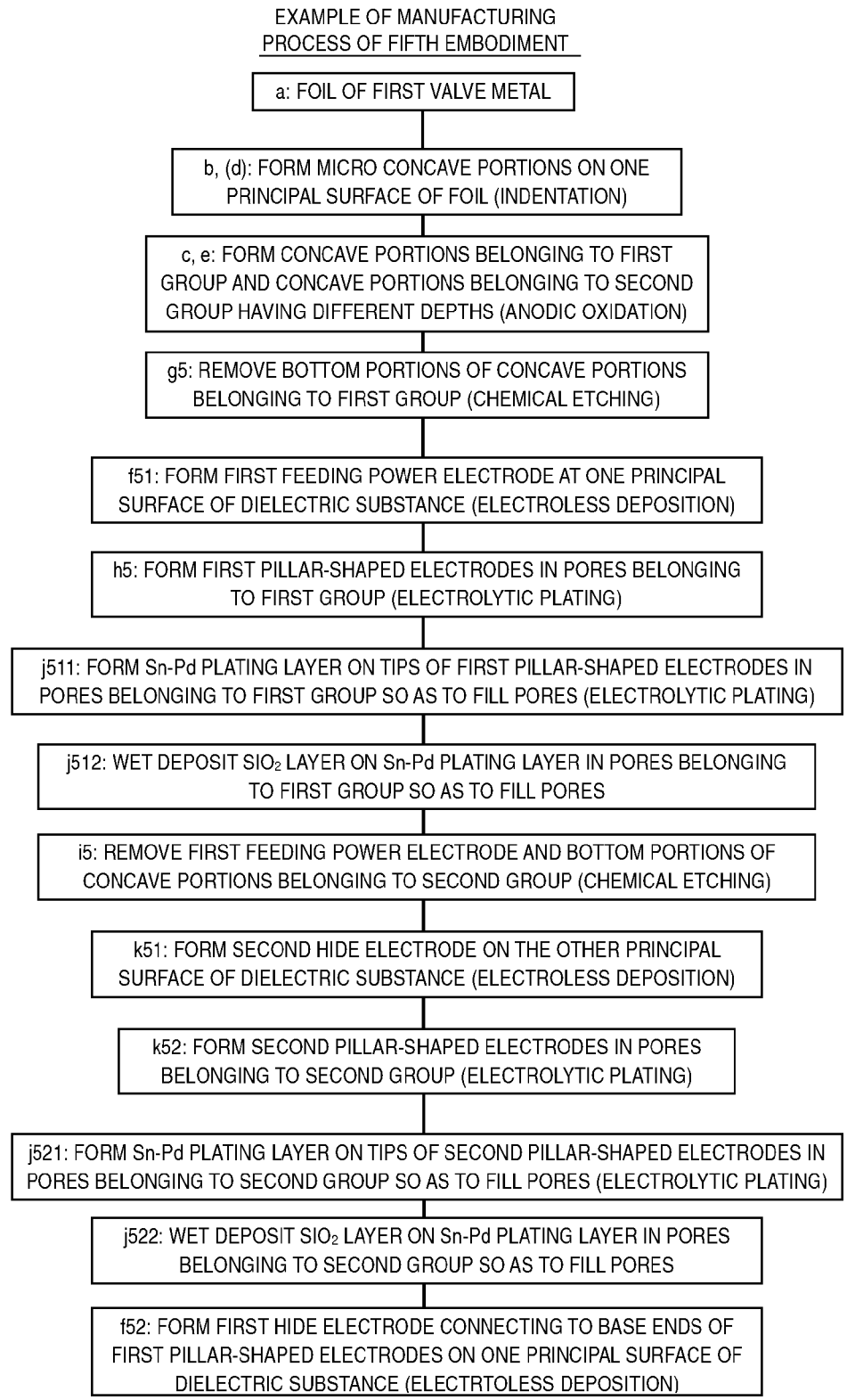

[Fig. 17]
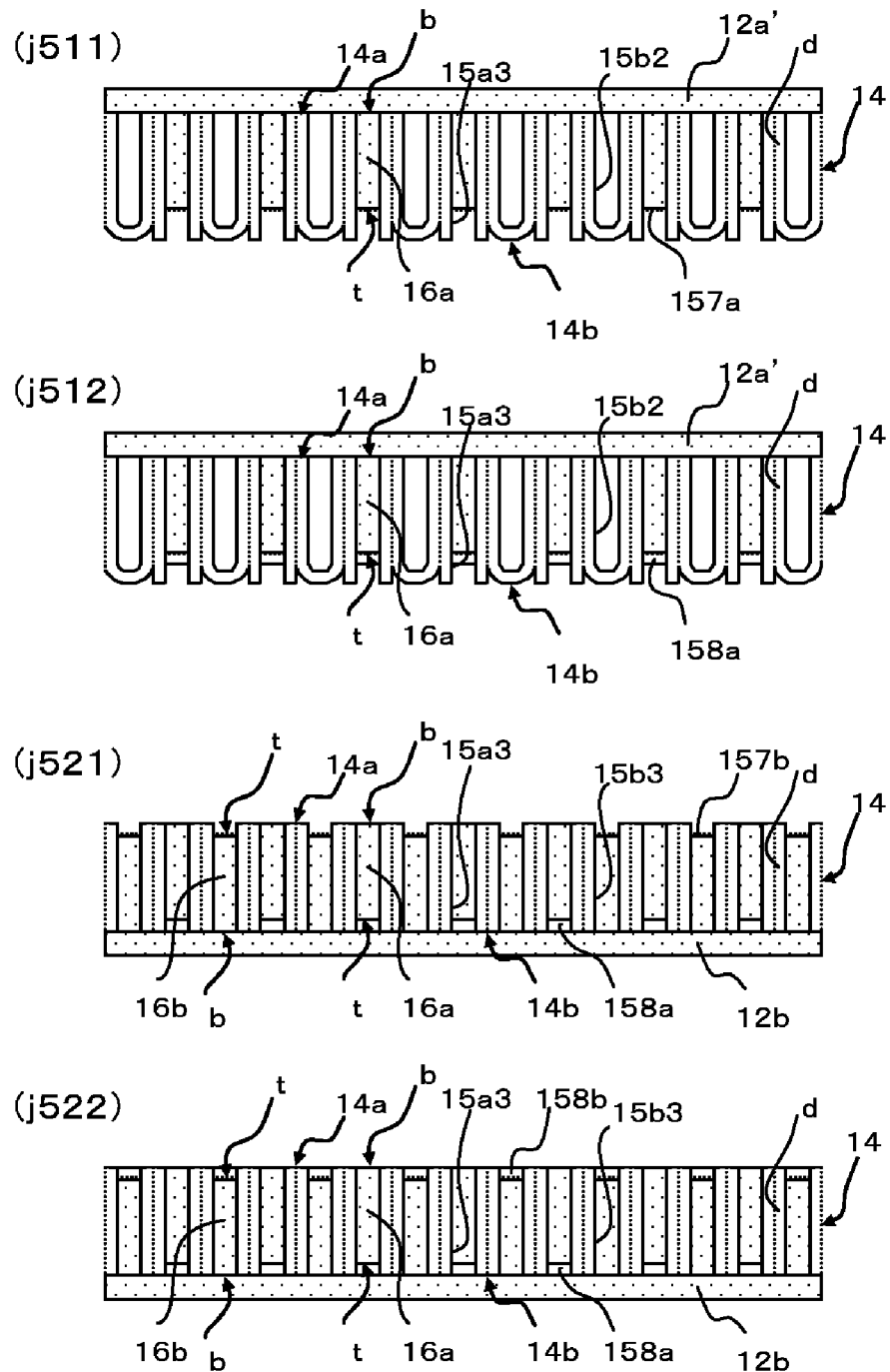

[Fig. 18]
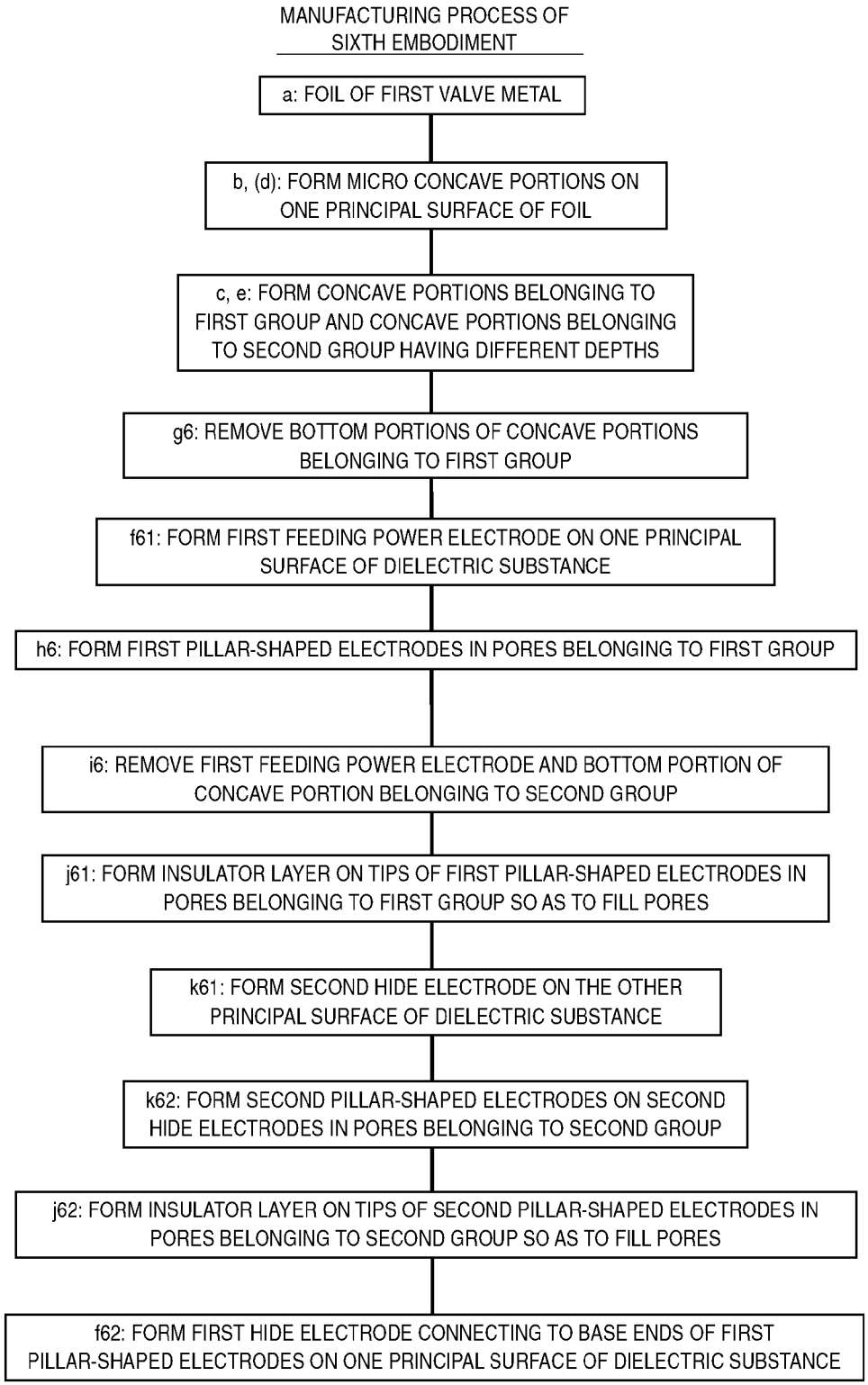

[Fig. 19]
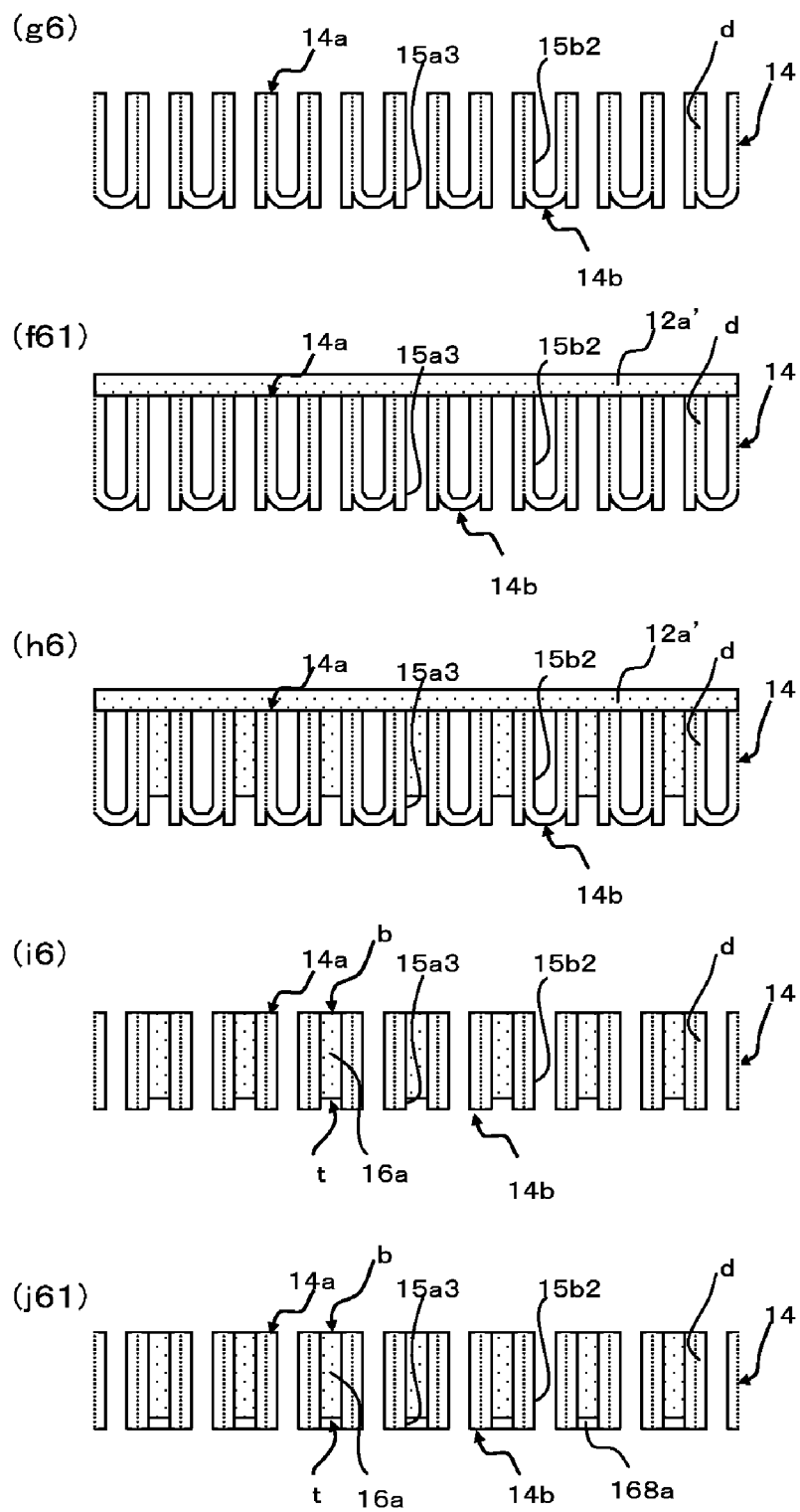

[Fig. 20]
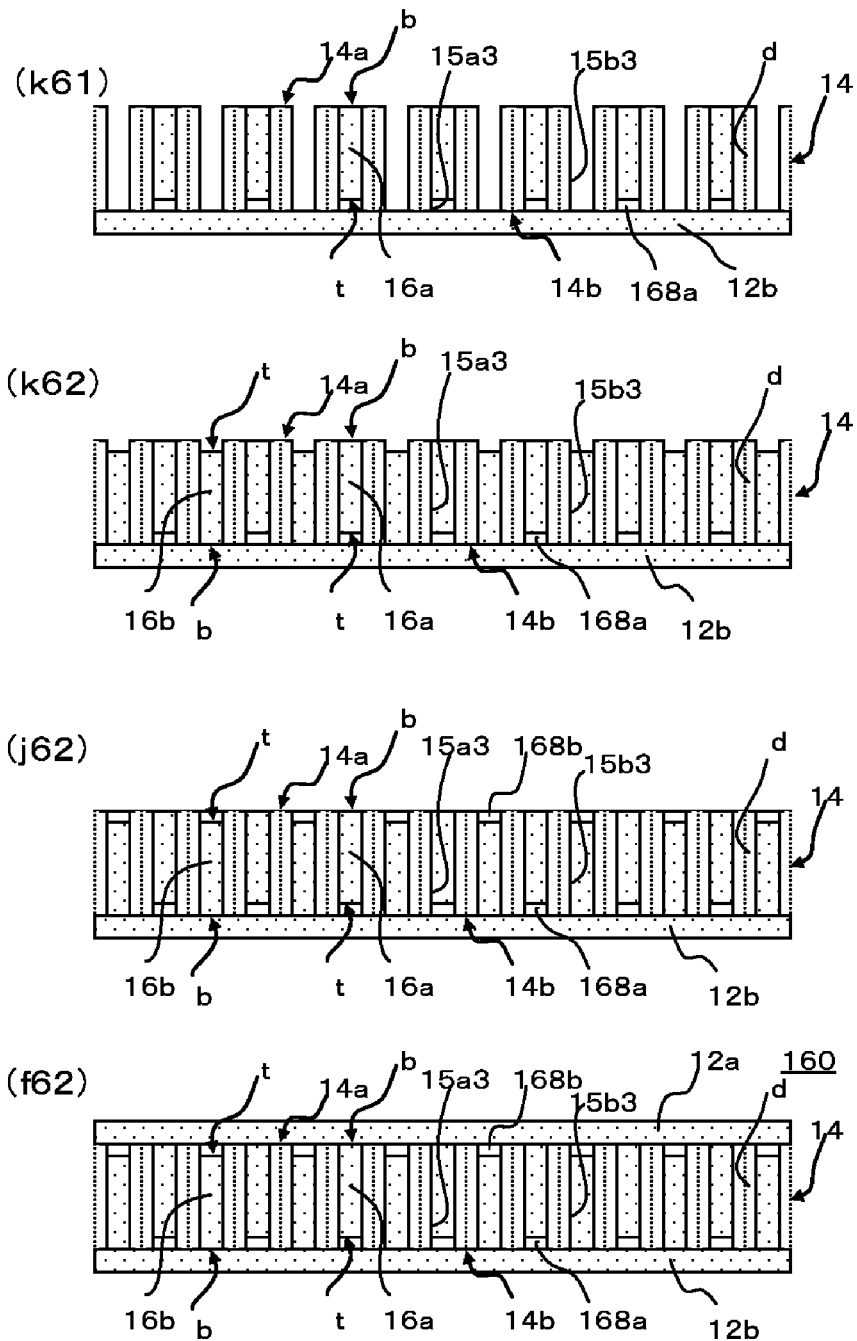

[Fig. 21]
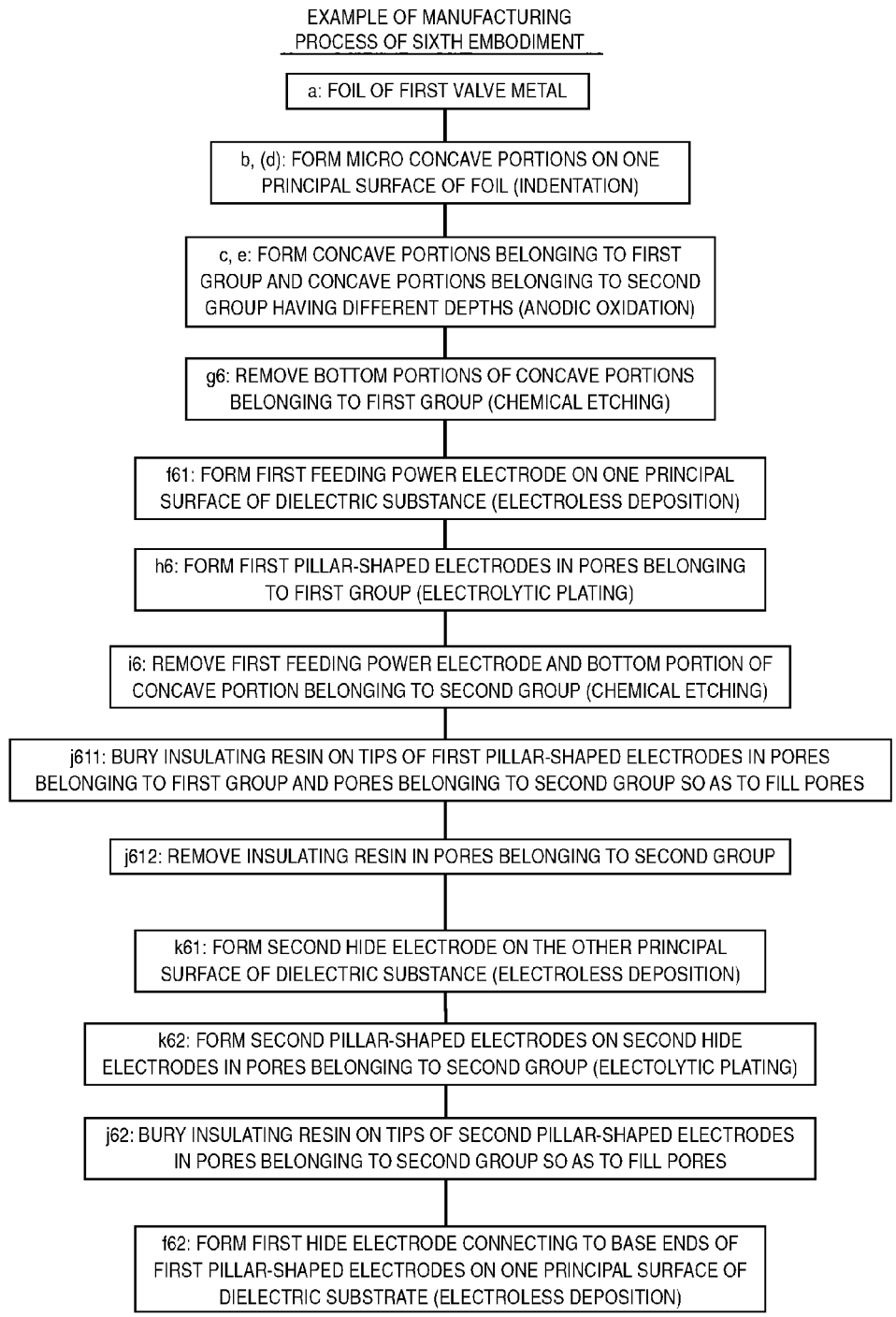

[Fig. 22]
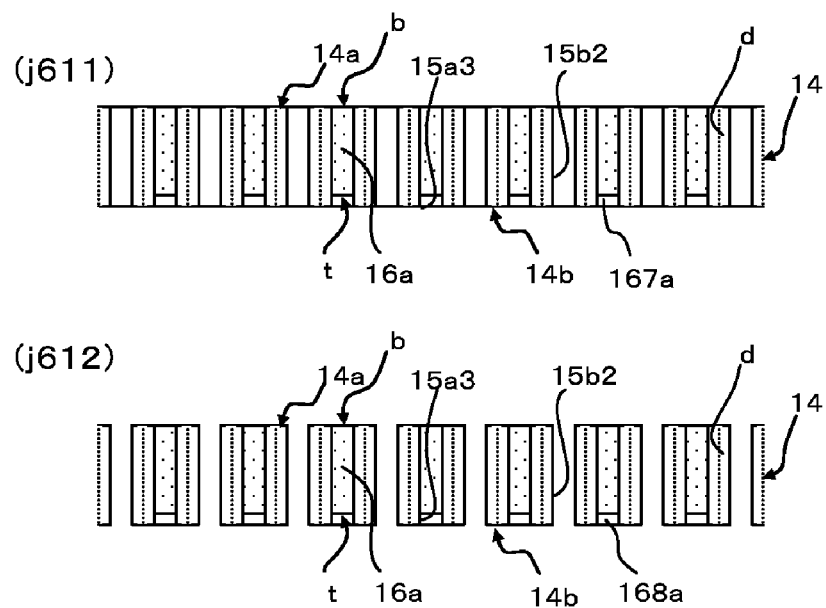

[Fig. 23]
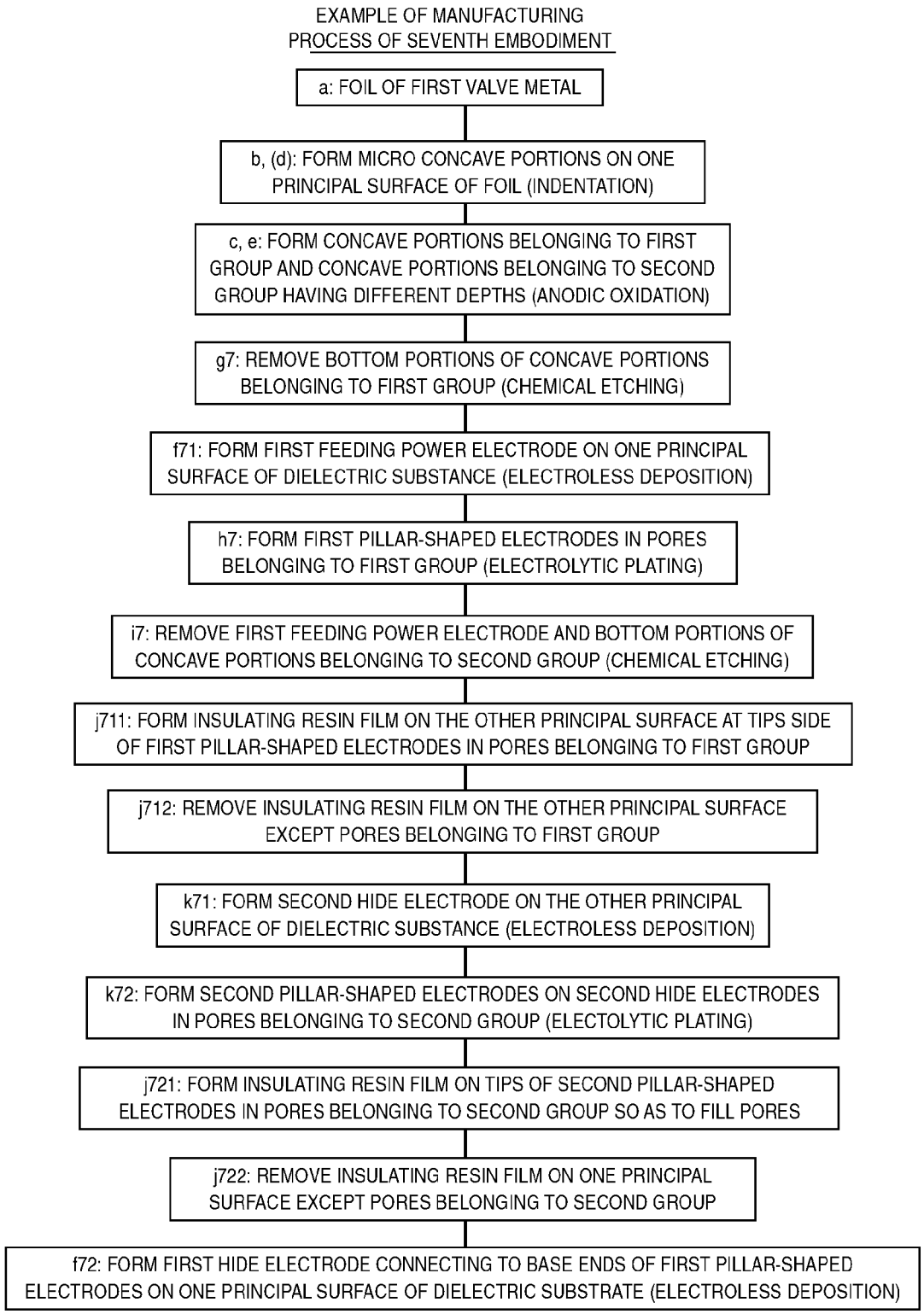

[Fig. 24]
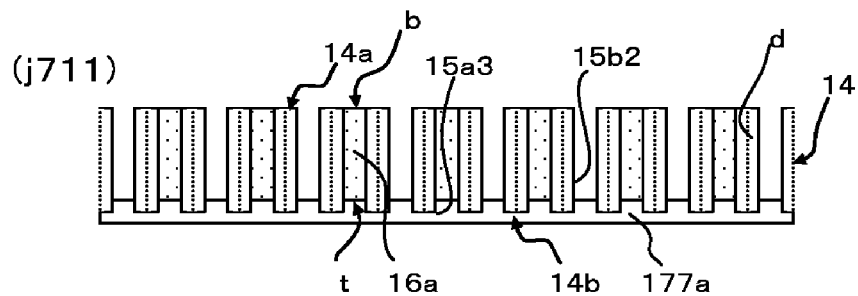
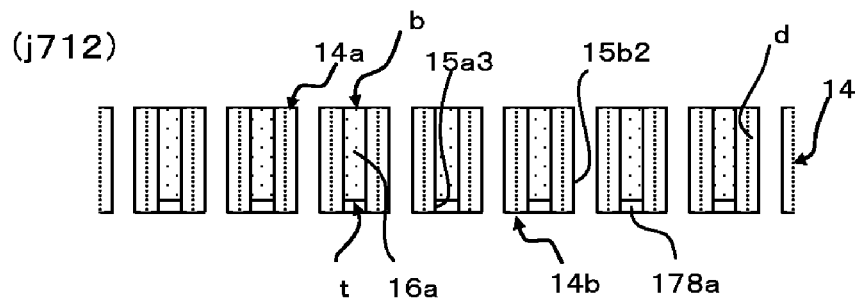
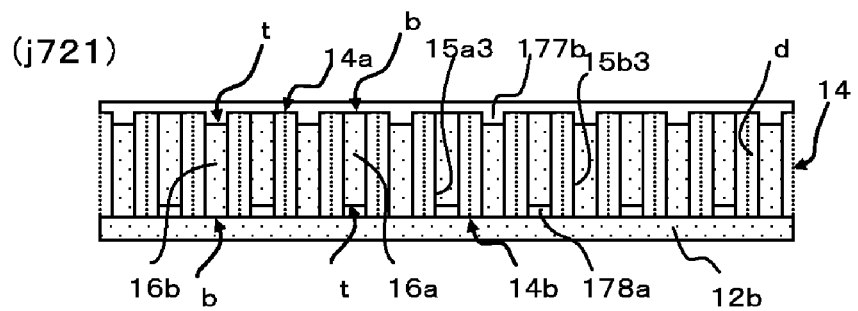
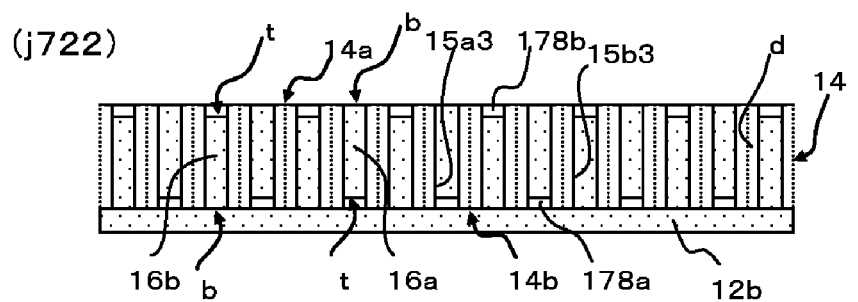

[Fig. 25]
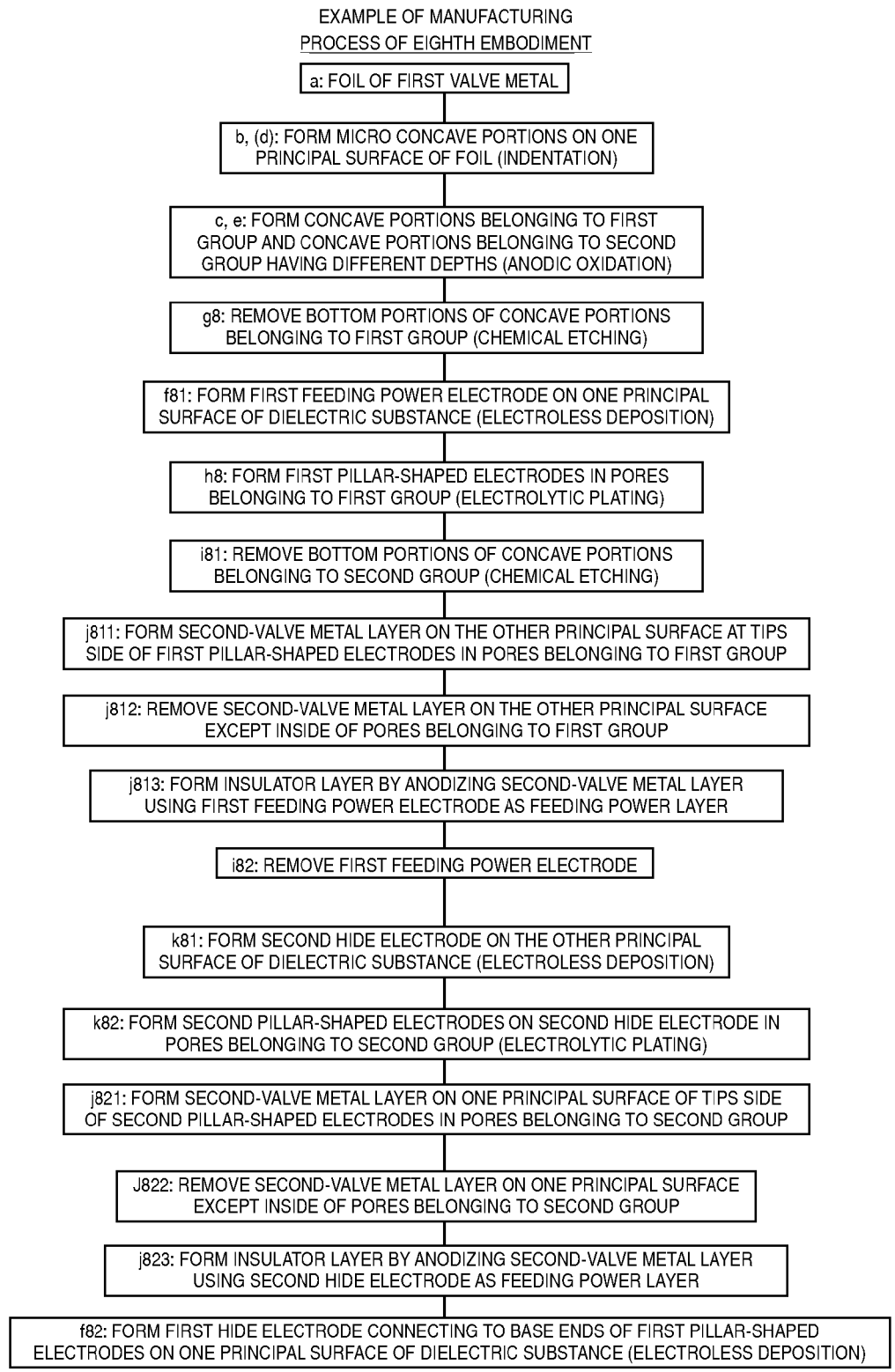

[Fig. 26]
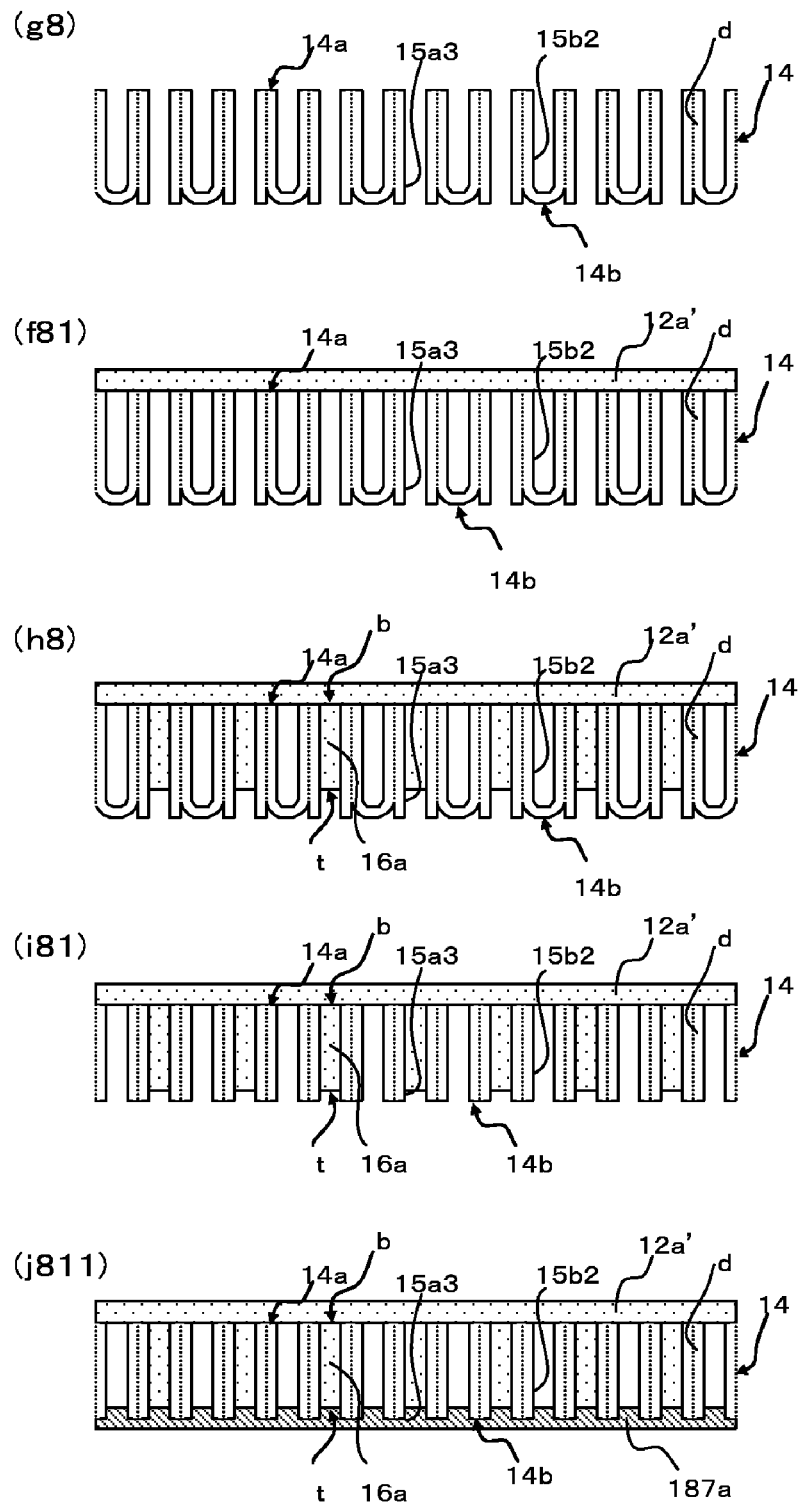

[Fig. 27]
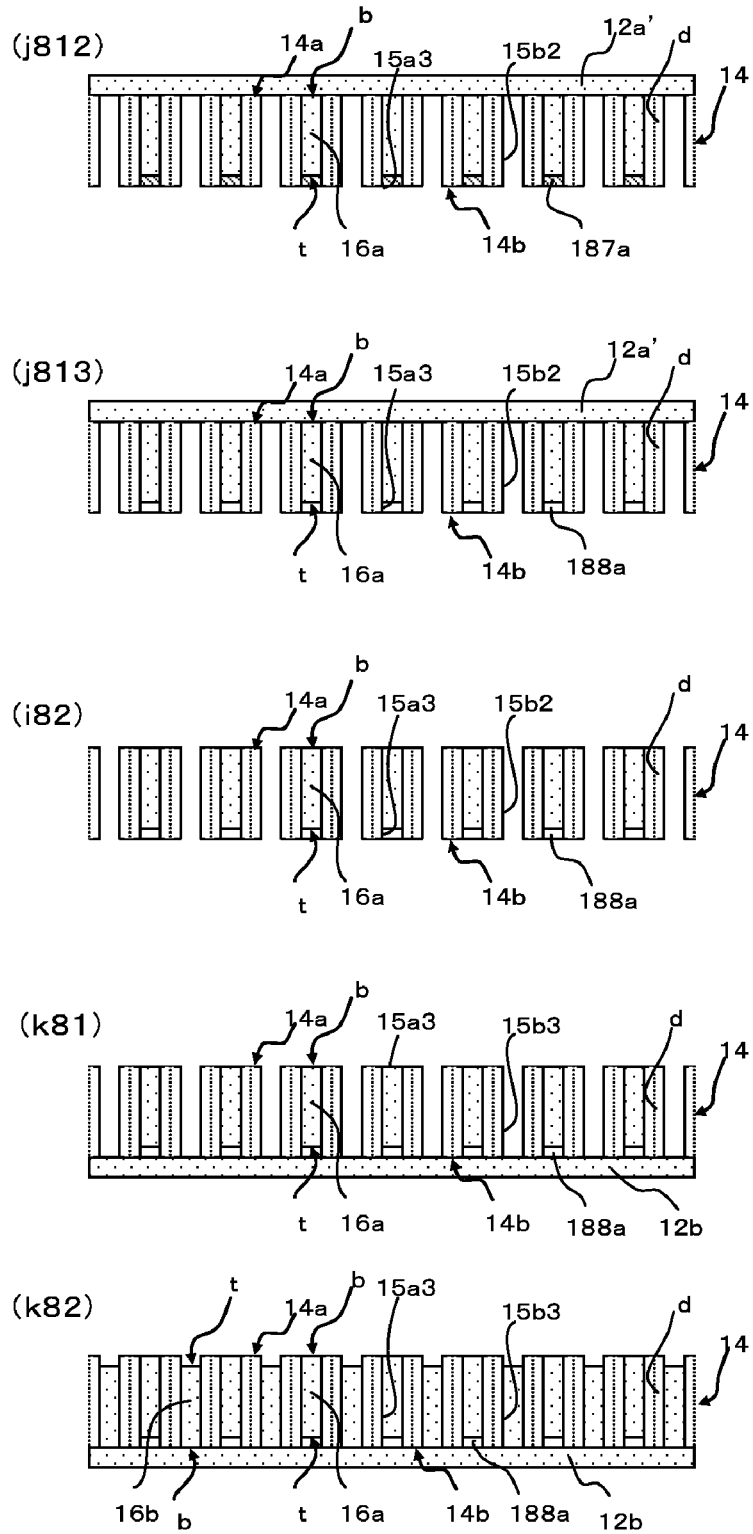

[Fig. 28]
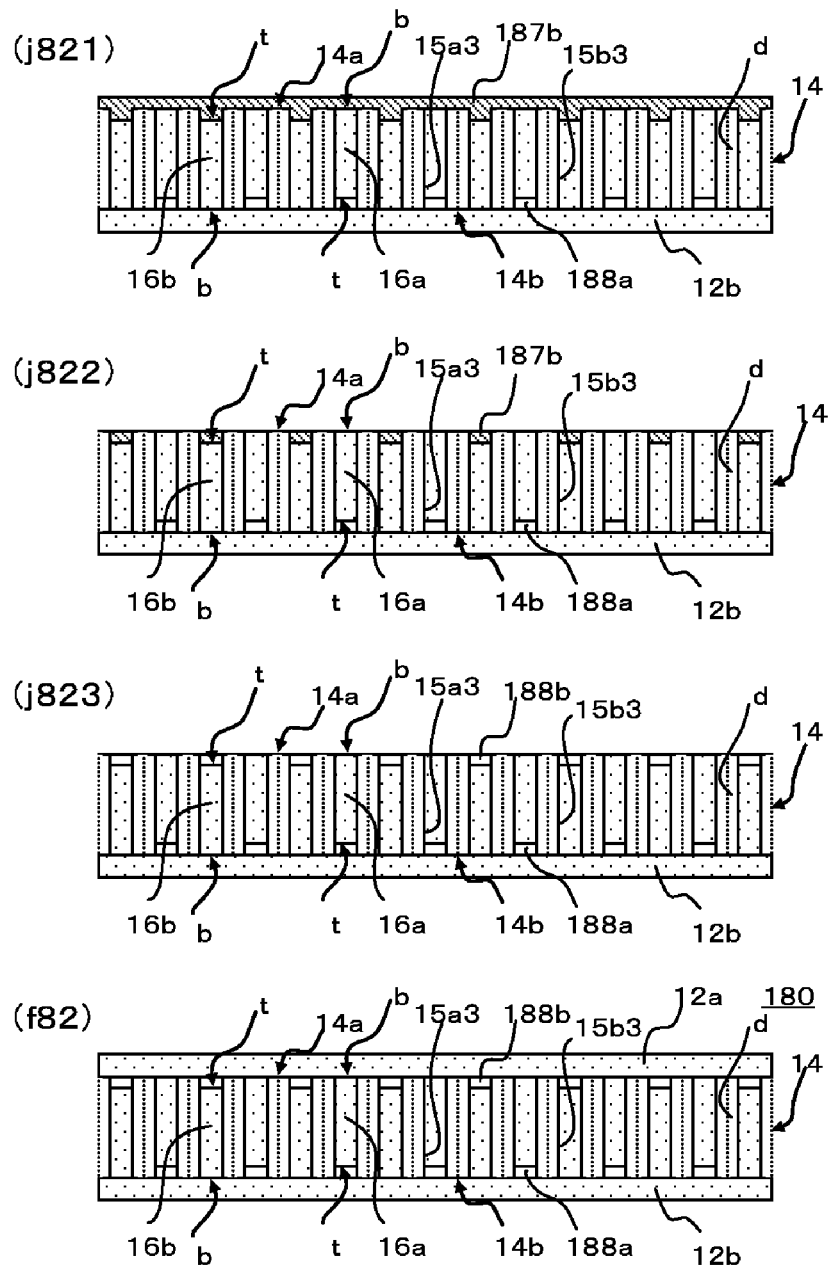

[Fig. 29]
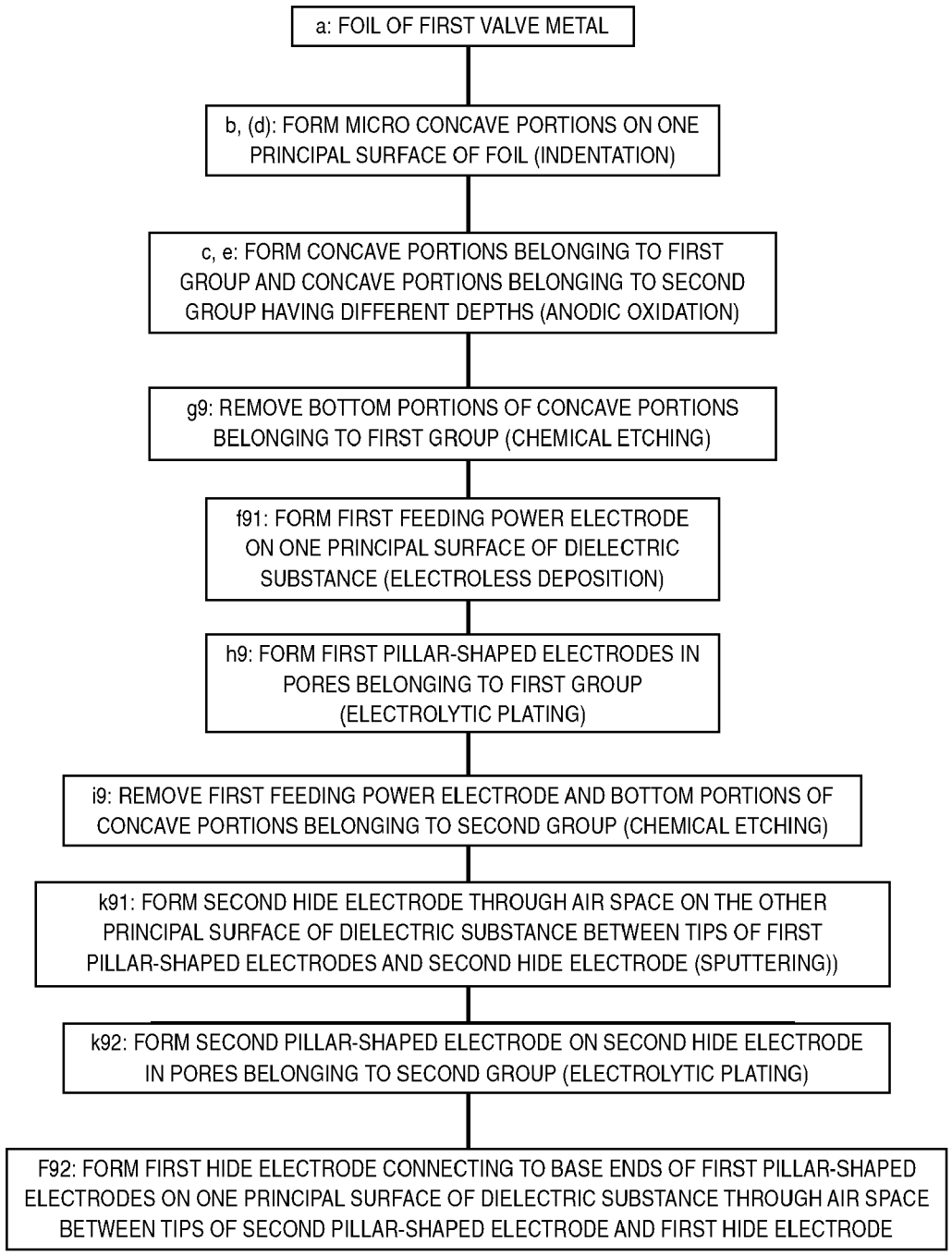

[Fig. 30]
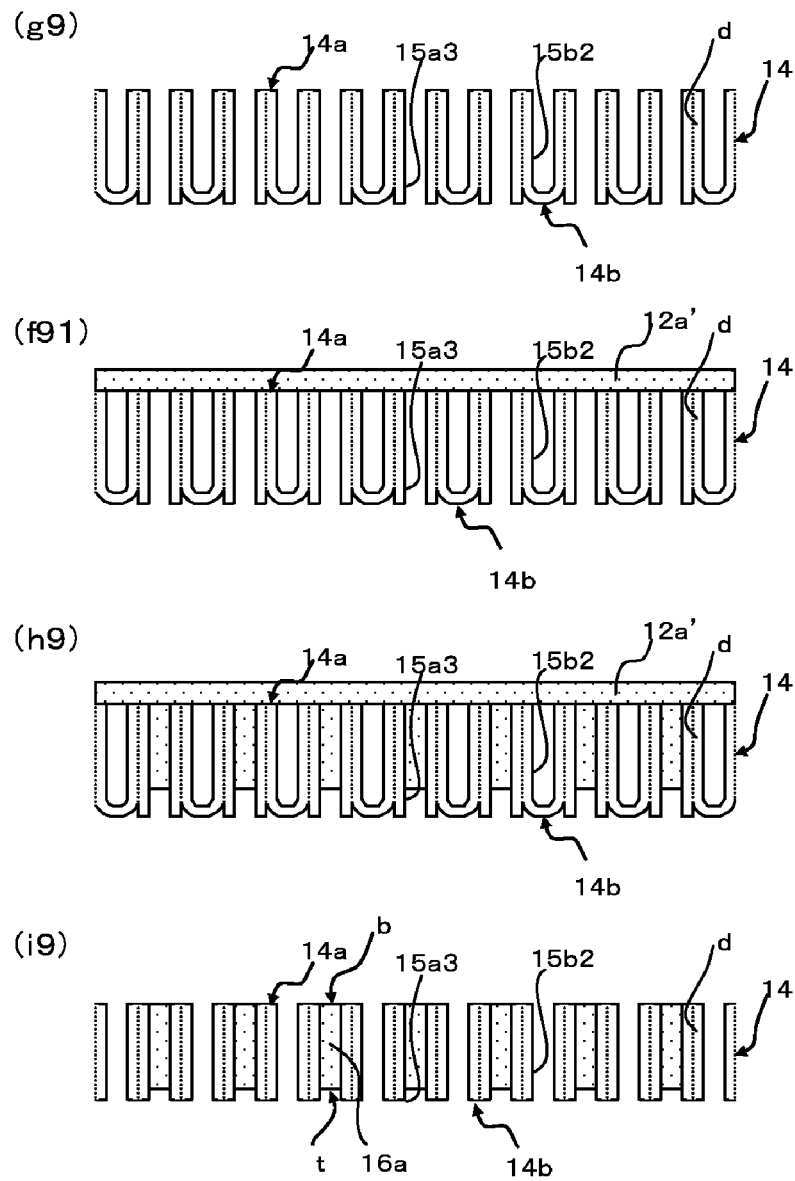

[Fig. 31]
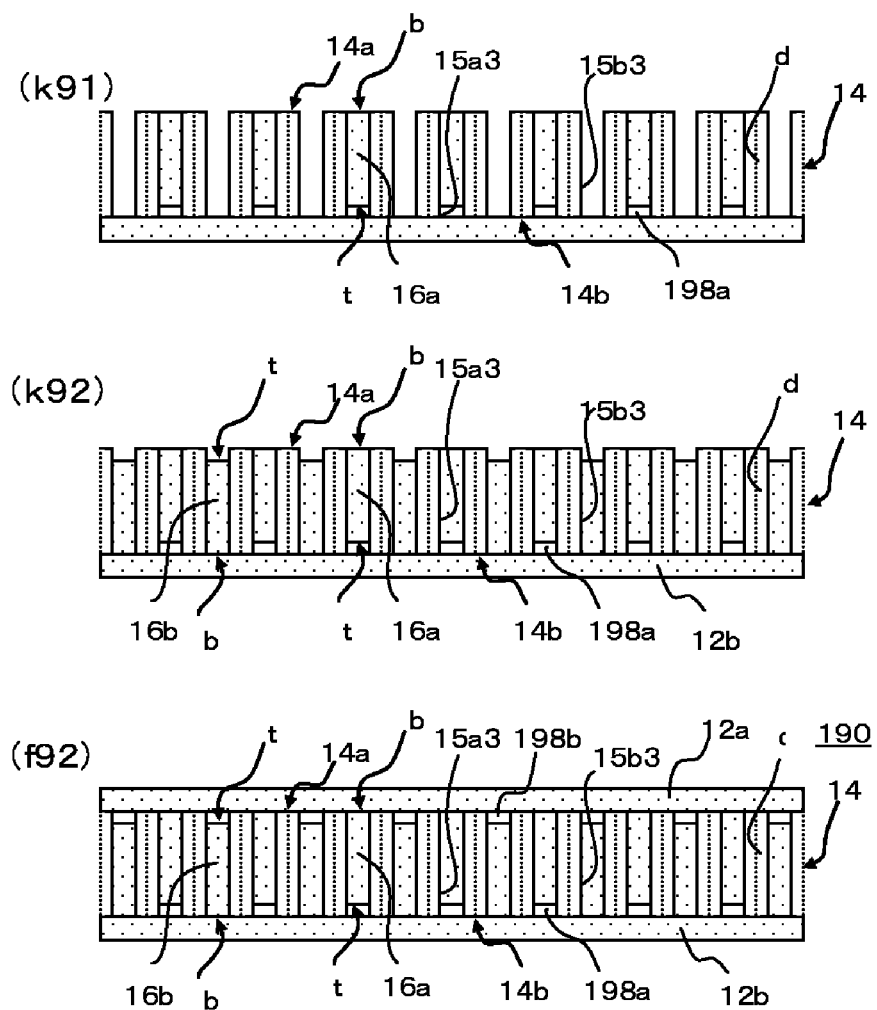

[Fig. 32]
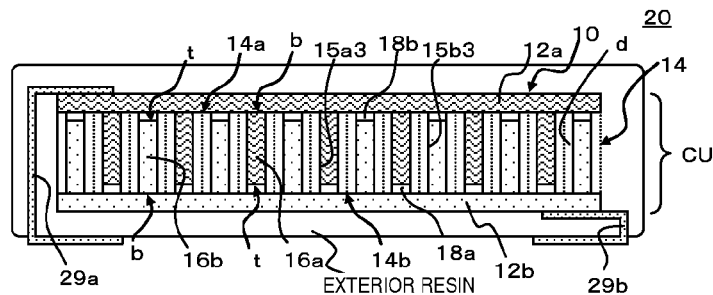
[Fig. 33]
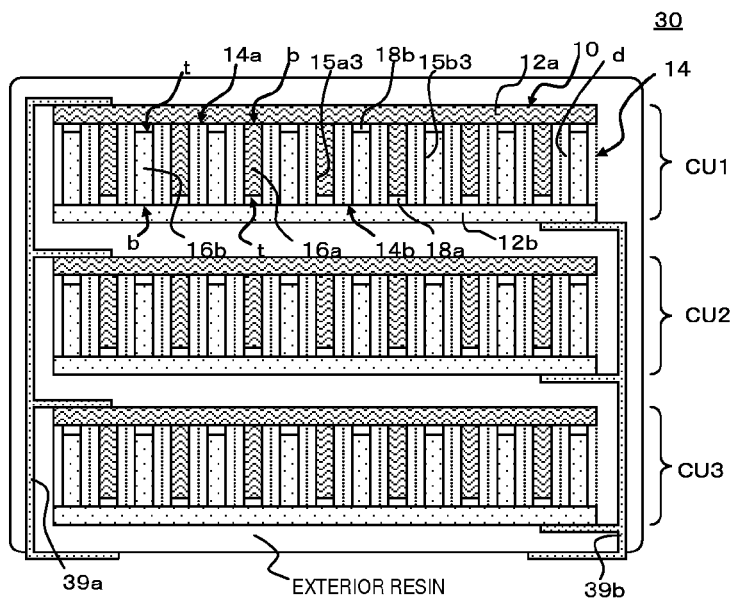
[Fig. 34]
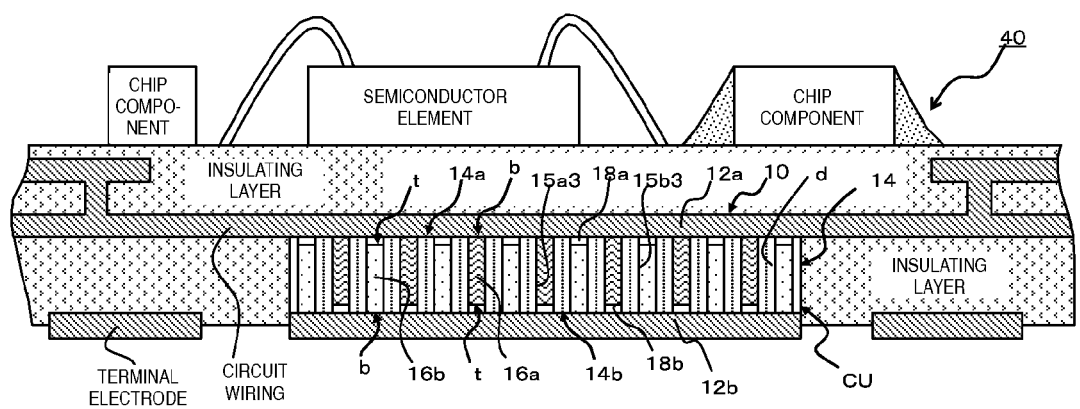

[Fig. 35] Background Art
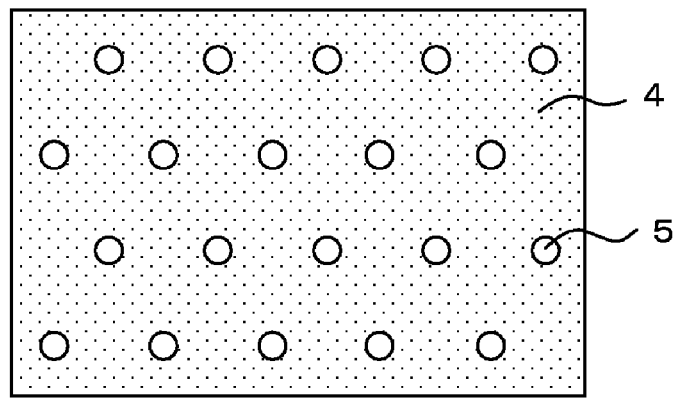
[Fig. 36] Background Art
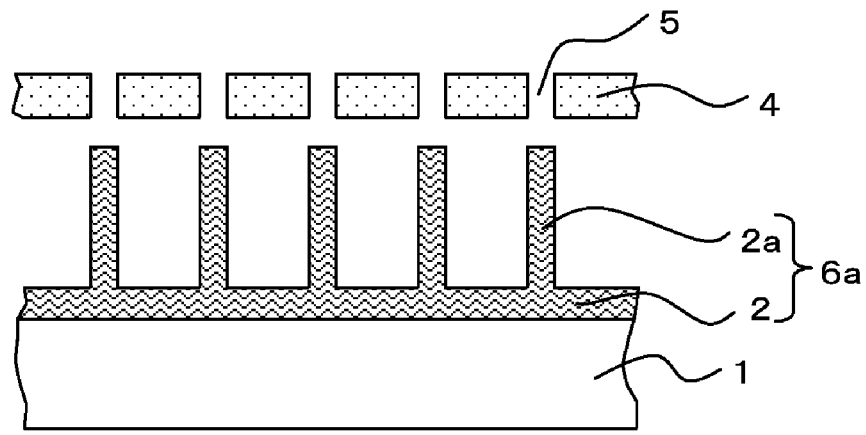
[Fig. 37] Background Art
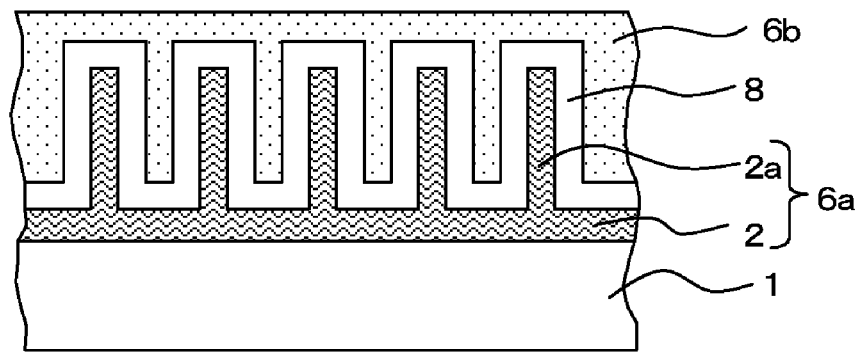

CAPACITOR ELEMENT AND METHOD OF MANUFACTURING CAPACITOR ELEMENT

BACKGROUND OF THE INVENTION

1. Field of the Invention

The invention relates to a capacitor element and a method of manufacturing the capacitor element in which a product of electrostatic capacity and voltage proof (CV product) per unit volume is higher as compared with electrolytic capacitors in related arts.

2. Background Art

An electrolytic capacitor using $Al_2O_3$ which is a kind of oxide of valve metal as a dielectric film is widely used from the past. The electrolytic capacitor is formed by combination of a dielectric film and an electrolyte component, being polarized. The area is intended to be expanded by roughening a surface of the $Al_2O_3$ film or some other ways, however, the attempt for higher capacity is reaching the limit. There is also a problem that applications are limited because the capacitor is polarized.

In order to solve the above problems and to allow the capacitor to have higher capacity, the following proposal is made. Specifically, in Patent Document 1, a method of obtaining a capacitor structure body is proposed, in which a porous substrate 4 having many pores 5 shown as a plan view in FIG. 35 is used as a mask, a first electrode 6a is formed by regularly arranging many pillar-shaped bodies 2a on a surface of a sheet electrode 2 on a capacitor substrate 1 by a thin-film deposition process or etching as shown in FIG. 36 as a cross-sectional view, next, a dielectric thin film 8 is formed by depositing a dielectric material having a permittivity of 100 or more on a surface of the first electrode 6a by using a MOCVD (organometallic vapor phase growing method), and further, a second electrode 6b is formed on a surface of the dielectric thin film 8 as shown in FIG. 37 as a cross-sectional view.

[Patent Document 1] JP-A-2003-249417

However, in the manufacturing method of the capacitor structure body as described in the above background art, the pillar-shaped bodies 2a are formed by using the porous substrate 4 as a mask, therefore, adhesion of the electrode material in the porous substrate 4 and inner walls of pores 5 of the porous substrate 4 and expansion of the pores 5 by the etching of the porous substrate 4 itself are liable to occur. Accordingly, there is a problem that it is difficult to obtain the pillar-shaped bodies 2a having an uniform cross-sectional shape and a desired linear dimension.

In addition, the dielectric thin film 8 is formed by depositing the dielectric material having the permittivity of 100 or more on the surface of the first electrode 6a on which the pillar-shaped bodies 2a stand by using the MOCVD, therefore, when the height of the pillar-shaped bodies 2a becomes high, the difference of film thickness in the dielectric thin film 8 is liable to occur at a region facing a source gas and directly coming into contact with the source gas and at a region not directly coming into contact with the source gas on the surface of the first electrode 6a. Therefore, there is a problem that it is difficult to stably obtain a capacitor in which a product of electrostatic capacity and voltage proof (CV product) per unit volume is high.

SUMMARY OF THE INVENTION

The invention has been made in view of at least one of the above problems, and in at least one embodiment, an object thereof is to provide a capacitor element in which the CV product per unit volume is higher as compared with electrolytic capacitors in related arts. In at least one embodiment, another object thereof is to provide a capacitor element which is not polarized.

Further in at least one embodiment, another object of thereof is to provide a method of stably manufacturing a large-capacity capacitor element which is not polarized.

In order to achieve one or more of the above objects, a capacitor element according to an embodiment of the invention includes (1) a porous plate dielectric substance made of an oxide of a first valve metal, in which plural pores belonging to a first group and pores belonging to a second group, which pierce through in the thickness direction, are arranged alternately, first pillar-shaped electrodes formed in plural pores belonging to the first group respectively and base ends thereof are exposed at one principal surface of the dielectric substance, and second pillar-shaped electrodes formed in plural pores belonging to the second group respectively and base ends thereof are exposed at the other principal surface of the dielectric substance. Further, insulator layers are included, which are provided respectively on tips of the first pillar-shaped electrodes in the pores belonging to the first group so as to fill the pores as well as on tips of the second pillar-shaped electrodes in the pores belonging to the second group so as to fill the pores. Additionally, there are provided a first hide electrode provided on one principal surface of the dielectric substance so as to connect to base ends of the first pillar-shaped electrodes and a second hide electrode provided on the other principal surface of the dielectric substance so as to connect to base ends of the second pillar-shaped electrodes.

Therefore, lowering of insulation performance of the capacitor can be suppressed even when voltage is applied and a CV product thereof is improved as well as the capacitor is not polarized like an electrolytic capacitor. Accordingly, voltage proof is improved, therefore, it is possible to provide a capacitor element in which the CV product per volume is higher than electrolytic capacitors of related arts as well as not polarized.

According to a primary aspect of the capacitor element according to an embodiment of the invention, (2) in addition to the above (1), further, the insulator layer is formed by pyrolyzing electroconductive polymer. Accordingly, insulation performance can be obtained stably even at positions in which filling of insulating resin is difficult such as the inside of pores belonging to the first group and the inside of pores belonging to the second group.

According to an aspect of the capacitor element according to an embodiment of the invention, (3) in addition to the above second means for solving problems, further, voltage is applied between the first hide electrode and the second hide electrode. According to this, short-circuit points between counter electrodes are burned off. Therefore, it is possible to provide a capacitor element in which leakage current is reduced.

According to another primary aspect of a capacitor element of an embodiment of the invention, (4) in addition to the above first means for solving problems, further, the insulator layer is made of a $TiO_2$ film. The $TiO_2$ film has higher permittivity as compared with an oxide (for example, $Al_2O_3$) of a first valve metal which forms a dielectric layer. Accordingly, when the thickness of the insulating layer is allowed to be thin to a degree that is contributes to the capacity of the capacitor element, a capacitor element having higher capacity can be obtained.

According to another primary aspect of a capacitor element of an embodiment of the invention, (5) in addition to the above first means for solving problems, further, the insulator layer is made of an SiO$_2$ film. Accordingly, a capacitor element having high insulation performance can be provided.

According to another primary aspect of a capacitor element of an embodiment of the invention, (6) in addition to the above first means for solving problems, further, the insulator layer is made of an insulating resin layer. Accordingly, a capacitor element having high insulation performance can be provided.

According to another primary aspect of a capacitor element of an embodiment of the invention, (7) in addition to the above first means for solving problems, further, the insulator layer is made of an oxide of a second valve metal. Accordingly, a capacitor element having high insulation performance can be provided.

According to another primary aspect of a capacitor element of an embodiment of the invention, (8) in addition to the above first means for solving problems, further, the insulator layer is made of air space. Accordingly, a capacitor element in which a resonance frequency in frequency impedance characteristics is high and high-frequency characteristics are excellent can be obtained.

A method of manufacturing a capacitor element according to an embodiment of the invention (9) includes a step of forming micro concave portions at plural positions in a predetermined arrangement on one principal surface of a foil of a first valve metal by indentation and a step of forming a porous plate dielectric substance by performing anodic oxidation to the foil of the valve metal and by forming concave portions belonging to a first group having a predetermined depth at positions in which the micro concave portions are formed and by forming concave portions belonging to a second group having the depth shallower than the concave portions belonging to the first group at positions between plural positions in which the micro concave portions are formed by anodic oxidation. The method further includes a step of forming a seed layer at inner surfaces of the concave portions belonging to the first group of the dielectric substance and at inner surfaces of the concave portions belonging to the second group by electroless deposition by electroless deposition as well as forming a first hide electrode on one principal surface of the dielectric substance and a step of forming plural pores belonging to the first group opening at the other principal surface side of the dielectric substance by removing bottom portions of the concave portions belonging to the first group of the dielectric substance by etching. The methods further includes a step of forming first pillar-shaped electrodes on the seed layer in the pores belonging to the first group by electrolytic plating, leaving tips of the pores of the other principal surface side of the dielectric substance and a step of forming plural pores belonging the second group opening at the other principal surface side of the dielectric substance by removing bottom portions of the concave portions belonging to the second group in the dielectric substance by etching. The methods further includes a step of forming electroconductive polymer layers on tips of the first pillar-shaped electrodes in the pores belonging to the first group and on the first hide electrode in the pores belonging to the second group so as to fill the pores respectively by electropolymerization and a step of forming second pillar-shaped electrodes on the seed layer at inner surfaces of the pores belonging to the second group by electrolytic plating as well as forming a second hide electrode on the other principal surface of the dielectric substance. The methods further includes a step of forming an insulator layer by pyrolyizing the electroconductive polymer layer to be insulated and a step of burning off short-circuit points between the tips of the first pillar-shaped electrodes and the second hide electrode and between the tips of the second pillar-shaped electrodes and the first electrodes by applying voltage.

Accordingly, it is possible to stably manufacture the capacitor element having the structure in which the first pillar-shaped electrodes are housed in the pores belonging to the first group of the porous plate dielectric substance made of the oxide of the first valve metal and the second pillar-shaped electrodes are housed in the pores belonging to the second group respectively, as well as insulator layers are respectively provided so as to fill the tips of the first pillar-shaped electrodes in the pores belonging to the first group in which the insulation performance is most liable to be reduced and so as to fill the tips of the second pillar-shaped electrodes in the pores belonging to the second group. Therefore, the capacitor element having large capacity which is not being polarized can be stably manufactured.

A method of manufacturing a capacitor element according to an embodiment of the invention (10) includes a step of forming micro concave portions at plural positions in a predetermined arrangement on one principal surface of a foil of a first valve metal by indentation and a step of forming a porous plate dielectric substance by performing anodic oxidation to the foil of the valve metal and by forming concave portions belonging to a first group having a predetermined depth at positions in which the micro concave portions are formed and by forming concave portions belonging to a second group having the depth shallower than the concave portions belonging to the first group at positions between the plural positions in which the micro concave portions are formed, a step of forming plural pores belonging to the first group opening at the other principal surface side of the dielectric substance by removing bottom portions of concave portions belonging to the first group of the dielectric substance by etching, a step of forming a first feeding power electrode on one principal surface on which concave portions belonging to the second group of the dielectric substance are formed, a step of forming first pillar-shaped electrodes in the pores belonging to the first group by electrolytic playing, leaving tips of the pores of the other principal surface side of the dielectric substance, a step of forming an insulator layer on the tips of the first pillar-shaped electrodes in the pores belonging to the first group so as to fill the pores respectively, a step of forming plural pores belonging to the second group opening at the other principal surface side of the dielectric substance by removing the first feeding power electrode on one principal surface of the dielectric substance and bottom portions of the concave portions belonging to the second group by etching, a step of forming a second hide electrode on the other principal surface of the dielectric substance, a step of forming second pillar-shaped electrodes on the second hide electrode in the pores belonging to the second group by electrolytic plating, leaving the tips of the hole of one principal surface side of the dielectric substance, a step of forming an insulator layer on tips of the second pillar-shaped electrodes in the pores belonging to the second group so as to fill the pores respectively, and a step of forming a first hide electrode on one principal surface of the dielectric substance so as to touch base ends of the first pillar-shaped electrodes. Accordingly, it is possible to stably manufacture the capacitor element having the structure in which the first pillar-shaped electrodes are housed in the pores belonging to the first group of the porous plate dielectric substance made of the oxide of the first valve metal and the second pillar-shaped electrodes are housed in the pores belonging to the second group respectively, as well as an insulator layer is provided between the tips of the first pillar-shaped electrodes and the second hide electrode so as to fill the pores belonging to the first group in which the insulation performance is most liable to be reduced and an insulator layer is provided between the tips of the second pillar-shaped electrodes and the first hide electrode so as to fill pores belonging to the second group.

According to another primary aspect of a method of manufacturing a capacitor element of an embodiment of the invention, (11) in addition to the above tenth means for solving problems, further, in the step of forming the insulator layer on the tips of the first pillar-shaped electrodes and the step of forming the insulator layer on the tips of the second pillar-shaped electrodes, electroconductive polymer films are formed by using the first feeding power electrode and the second feeding power electrode as feeding power layers respectively, then, the films are insulated by pyrolysis. Accordingly, the capacitor element having high insulation performance can be stably manufactured by the simple manufacturing process.

According to another primary aspect of a method of manufacturing a capacitor element of an embodiment of the invention, (12) in addition to the above tenth means for solving problems, further, in the step of forming the insulator layer on the tips of the first pillar-shaped electrodes and the step of forming the insulator layer on the tips of the second pillar-shaped electrodes, $TiO_2$ electrodeposited films are formed by using the first feeding power electrode and the second hide electrode as feeding power layers respectively, then, insulated by performing heat treatment. Accordingly, the capacitor element can be stably manufactured by the simple manufacturing process.

According to another primary aspect of a method of manufacturing a capacitor element of an embodiment of the invention, (13) in addition to the above tenth means for solving problems, further, in the step of forming the insulator layer on the tips of the first pillar-shaped electrodes and the step of forming the insulator layer on the tips of the second pillar-shaped electrodes, $SiO_2$ films are formed by electrolytic plating by using the first feeding power electrode and the second hide electrode as feeding power layers. Accordingly, the capacitor element having high insulation performance can be stable manufactured by the simple manufacturing process.

According to another primary aspect of a method of manufacturing a capacitor element of an embodiment of the invention, (14) in addition to the above tenth means for solving problems, further, in the step of forming the insulator layer on the tips of the first pillar-shaped electrodes and the step of forming the insulator layer on the tips of the second pillar-shaped electrodes, Sn—Pd plating layers are formed by using the first feeding power electrode and the second hide electrode as feeding power layers respectively, then, $SiO_2$ layers are wet-accumulated on the Sn—Pd plating layers. Accordingly, the capacitor element having high insulation performance can be stably manufactured by the relatively simple manufacturing process.

A method of manufacturing a capacitor element according to an embodiment of the invention (15) includes a step of forming micro concave portions at plural positions in a predetermined arrangement on one principal surface of a foil of a first valve metal by indentation and a step of forming a porous plate dielectric substance by performing anodic oxidation to the foil of the valve metal and by forming concave portions belonging to a first group having a predetermined depth at positions in which the micro concave portions are formed and by forming concave portions belonging to a second group having the depth shallower than the concave portions belonging to the first group at positions between the plural positions in which the micro concave portions are formed, a step of forming plural pores belonging to the first group opening at the other principal surface side of the dielectric substance by removing bottom portions of concave portions belonging to the first group of the dielectric substance by etching, a step of forming a first feeding power electrode on one principal surface on which concave portions belonging to the second group of the dielectric substance are formed, a step of forming first pillar-shaped electrodes on the feeding power electrode in pores belonging to the first group by electrolytic plating, leaving the tips of the pore of the other principal surface side of the dielectric substance, a step of forming plural pores belonging to the second group opening at the other principal surface side of the dielectric substance by removing the first feeding power electrode and bottom portions of the concave portions belonging to the second group of the dielectric substance by etching, a step of forming an insulator layer on the tips of the first pillar-shaped electrodes in the pores belonging to the first group and plural pores belonging to the second group so as to fill the pores respectively, a step of forming a second hide electrode on the other principal surface of the dielectric substance, a step of forming second pillar-shaped electrodes on the second hide electrode in the pores belonging to the second group by electrolytic plating, leaving tips of the pores of one principal surface side of the dielectric substance, a step of forming an insulator layer on the tips of the second pillar-shaped electrodes in the pores belonging to the second group so as to fill the pores respectively and a step of forming a first hide electrode on one principal surface of the dielectric substance so as to touch base ends of the first pillar-shaped electrodes. Accordingly, it is possible to stably manufacture the capacitor element having the structure in which the first pillar-shaped electrodes are housed in the pores belonging to the first group of the porous plate dielectric substance made of the oxide of the first valve metal and the second pillar-shaped electrodes are housed in the pores belonging to the second group respectively, as well as insulator layers are respectively provided so as to fill the tips of the first pillar-shaped electrodes in the pores belonging to the first group in which the insulation performance is most liable to be reduced and so as to fill the tips of the second pillar-shaped electrodes in the pores belonging to the second group.

According to another primary aspect of a method of manufacturing a capacitor element of an embodiment of the invention, (16) in addition to the above fifteenth means for solving problems, further, in the step of forming the insulator layer on the tips of the first electrodes, an insulating resin is buried on tips of the first pillar-shaped electrodes in the pores belonging to the first group and the pores belonging to the second group respectively, then, the insulating resin in the pores belonging to the second group is removed. In the step of forming the insulator layer on the tips of the second pillar-shaped electrodes, an insulating resin is buried on tips of the second pillar-shaped electrodes of the pores belonging to the second group. Accordingly, the capacitor element having high insulation performance can be stably manufactured by the relatively simple process.

According to another primary aspect of a method of manufacturing a capacitor element of an embodiment of the invention, (17) in addition to the above fifteenth means for solving problems, further, in the step of forming the insulator layer on the tips of the first electrodes, an insulating resin film is formed on the other principal surface of the tips side of the first pillar-shaped electrodes of the dielectric substance, then, the insulating resin film on the other principal surface except the inside of pores belonging to the first group is removed. In the step of forming the insulator layer on the tips of the second pillar-shaped electrodes, an insulating resin film is formed on one principal surface of tips side of the second pillar-shaped electrodes of the dielectric substance, then, the insulating resin film on one principal surface except the inside of the pores belonging to the second group is removed. Accordingly, the capacitor element having high insulation performance can be stably manufactured by the relatively simple process.

A method of manufacturing a capacitor element according to an embodiment of the invention (18) includes a step of forming micro concave portions at plural positions in a predetermined arrangement on one principal surface of a foil of a first valve metal by indentation and a step of forming a porous plate dielectric substance by performing anodic oxidation to the foil of the valve metal and by forming concave portions belonging to a first group having a predetermined depth at positions in which the micro concave portions are formed and by forming concave portions belonging to a second group having the depth shallower than the concave portions belonging to the first group at positions between the plural positions in which the micro concave portions are formed, a step of forming plural pores belonging to the first group opening at the other principal surface side of the dielectric substance by removing bottom portions of concave portions belonging to the first group of the dielectric substance by etching, a step of forming a first feeding power electrode on one principal surface on which concave portions belonging to the second group of the dielectric substance are formed, a step of forming first pillar-shaped on the feeding power electrode in pores belonging to the first group by electrolytic plating, leaving the tips of the pore of the other principal surface side of the dielectric substance, a step of forming plural pores belonging to the second group opening at the other principal surface of the dielectric substance by removing bottom portions of concave portions belonging to the second group of the dielectric substance by etching, a step of forming a second-valve metal layer on the other principal surface of the tips side of the first pillar-shaped electrodes of the dielectric substance, a step of removing the second-valve metal layer on the other principal surface except the inside of pores belonging to the first group, a step of forming an insulator layer on the tips of the first pillar-shaped electrode in pores belonging to the first group as well as into plural pores belonging to the second groups by performing anodic oxidation to the second-valve metal layer using the first feeding power electrode as a feeding power layer so as to fill the pores respectively, a step of removing the first feeding power electrode by etching, a step of forming a second hide electrode on the other principal surface of the dielectric substance, a step of forming second pillar-shaped electrodes on the second hide electrode in the pores belonging the second group by electrolytic plating, leaving tips of the pores of one principal surface side of the dielectric substance, a step of forming the second-valve metal layer on one principal surface of the tips side of the second pillar-shaped electrodes of the dielectric substance, a step of removing the second-valve metal layer on one principal surface except the inside of pores belonging to the second group, a step of forming an insulator layer on the tips of the second pillar-shaped electrodes in the pores belonging to the second group so as to fill the pores and a step of forming a first hide electrode on one principal surface of the dielectric substance so as to touch based ends of the first pillar-shaped electrodes by performing anodic oxidation to the second-valve metal layer by using the second hide electrode as a feeding power layer. Accordingly, it is possible to stably manufacture the capacitor element having the structure in which the first pillar-shaped electrodes are housed in the pores belonging to the first group of the porous plate dielectric substance made of the oxide of the first valve metal and the second pillar-shaped electrodes are housed in the pores belonging to the second group respectively, as well as insulator layers are respectively provided so as to fill the tips of the first pillar-shaped electrodes in the pores belonging to the first group in which the insulation performance is most liable to be reduced and so as to fill the tips of the second pillar-shaped electrodes in the pores belonging to the second group.

A method of manufacturing a capacitor element according to an embodiment of the invention (19) includes a step of forming micro concave portions at plural positions in a predetermined arrangement on one principal surface of a foil of a first valve metal by indentation and a step of forming a porous plate dielectric substance by performing anodic oxidation to the foil of the valve metal and by forming concave portions belonging to a first group having the predetermined depth at positions in which the micro concave portions are formed and by forming concave portions belonging to a second group having the depth shallower than the concave portions belonging to the first group at positions between the plural positions in which the micro concave portions are formed, a step of forming plural pores belonging to the first group opening at the other principal surface side of the dielectric substance by removing bottom portions of concave portions belonging to the first group of the dielectric substance by etching, a step of forming a first feeding power electrode on one principal surface on which concave portions belonging to the second group of the dielectric substance are formed, a step of forming first pillar-shaped electrodes on the feeding power electrode in pores belonging to the first group by electrolytic plating, leaving the tips of the pore of the other principal surface side of the dielectric substance, a step of forming plural pores belonging to the second group opening at the other principal surface of the dielectric substance by removing the first feeding power electrode and bottom portions of concave portions belonging to the second group of the dielectric substance by etching, a step of forming a second hide electrode on the other principal surface of the dielectric substance by sputtering through air space between the tips of the first pillar-shaped electrodes and the second hide electrode, a step of forming second pillar-shaped electrodes on the second hide electrode in the pores belonging to the second group by electrolytic plating, leaving tips of the pores of one principal surface side of the dielectric substance and a step of forming a first hide electrode connecting to base ends of the first pillar-shaped electrodes on one principal surface of the dielectric substance by sputtering through air space between the tips of the second pillar-shaped electrodes and the first hide electrode. Accordingly, it is possible to stably manufacture the capacitor element having the structure in which the first pillar-shaped electrodes are housed in the pores belonging to the first group of the porous plate dielectric substance made of the oxide of the first valve metal and the second pillar-shaped electrodes are housed in the pores belonging to the second group respectively, as well as a step of forming insulator layers on the tips of the first pillar-shaped electrodes and tips of the second pillar-shaped electrodes respectively can be omitted to manufacture the capacitor element by the simple manufacturing process.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

FIG. 1 is a cross-sectional view showing an internal structure of a capacitor element according to a first embodiment of the invention;

FIG. 2 is a cross-sectional view showing a modification example of a capacitor element according to the first embodiment;

FIG. 3 is a flowchart showing the sequence of manufacturing processes of an example of a first embodiment in a method of manufacturing the capacitor element according to the disclosed embodiments;

FIG. 4A to FIG. 4E are views showing respective processes of the example of the first embodiment;

FIG. 5F to FIG. 5I are views showing respective processes of the example of the first embodiment;

FIG. 6J to FIG. 6M are views showing respective processes of the example of the first embodiment;

FIG. 7 is a flowchart showing the sequence of manufacturing processes of another example of the first embodiment;

FIG. 8 is a flowchart showing the sequence of manufacturing processes of an embodiment of a second embodiment in a method of manufacturing the capacitor element according to the disclosed embodiments;

FIG. 9G2 to FIG. 9I2 are views showing respective processes of the second embodiment;

FIGS. 10K21, 10K22, 10J22 and 10F22 are views showing respective processes of the second embodiment;

FIG. 11 is a flowchart showing the sequence of manufacturing processes of an example of the second embodiment;

FIGS. 12J211, 12J212, 12J221, and 12J222 are views showing forming processes of insulator layers of the example of the second embodiment;

FIG. 13 is a flowchart showing the sequence of manufacturing processes of an example of a third embodiment in a method of manufacturing the capacitor element according to the disclosed embodiments;

FIGS. 14J311, 14J312, 14J321 and 14J322 are views showing forming processes of insulator layers of the example of the third embodiment;

FIG. 15 is a flowchart showing the sequence of manufacturing processes of an example of a fourth embodiment in a method of manufacturing the capacitor element according to the disclosed embodiments;

FIG. 16 is a flowchart showing the sequence of manufacturing processes of an example of a fifth embodiment in a method of manufacturing the capacitor element according to the disclosed embodiments;

FIGS. 17J511, 17J512, 17J521 and 17J522 are views showing forming processes of insulator layers of the example of the fifth embodiment;

FIG. 18 is a flowchart showing the sequence of manufacturing processes of an example of a sixth embodiment in a method of manufacturing the capacitor element according to the disclosed embodiments;

FIGS. 19G6, 19F61, 19H6, 19I6 and 19J61 are views showing respective processes of an example of the sixth embodiment;

FIGS. 20K61, 20K62, 20J62 and 20F62 are views showing respective processes of an example of the sixth embodiment;

FIG. 21 is a flowchart showing the sequence of manufacturing processes of the example of the sixth embodiment;

FIG. 22J611 and FIG. 22J612 are views showing forming processes of an insulator layer of the example of the sixth embodiment;

FIG. 23 is a flowchart showing the sequence of manufacturing processes of an example of a seventh embodiment in a method of manufacturing the capacitor element according to the disclosed embodiments;

FIGS. 24K711, 24J712, 24J721 and 24J722 are views showing forming processes of insulator layers of the example of the seventh embodiment;

FIG. 25 is a flowchart showing the sequence of manufacturing processes of an example of an eighth embodiment in a method of manufacturing the capacitor element according to the disclosed embodiments;

FIGS. 26G8, 26F81, 26H8, 26I81 and 26J811 are views showing respective processes of the example of the eight embodiment;

FIGS. 27J812, 27J813, 27I82, 27K81 and 27K82 are views showing respective processes of the example of the eight embodiment;

FIGS. 28J821, 28J822, 28J823 and 28F82 are views showing respective processes of an example of the eight embodiment;

FIG. 29 is a flowchart showing the sequence of manufacturing processes of an example of a ninth embodiment in a method of manufacturing the capacitor element according to the disclosed embodiments;

FIGS. 30G9, 30F91, 30H9 and 30I9 are views showing respective processes of the example of the ninth embodiment;

FIGS. 31K91, 31K92 and 31F92 are views showing respective processes of the example of the ninth embodiment;

FIG. 32 is a cross-sectional view showing an internal structure of a first embodiment of a capacitor using the capacitor element according to the disclosed embodiments;

FIG. 33 is a cross-sectional view showing an internal structure of a second embodiment of a capacitor using the capacitor element according to the disclosed embodiments;

FIG. 34 is a cross-sectional view showing an internal structure of an embodiment of a capacitor-buried multilayer interconnection substrate using the capacitor element according to the disclosed embodiments;

FIG. 35 is a view showing a method of manufacturing a capacitor element of a background art;

FIG. 36 is a view showing a method of manufacturing the capacitor element of the background art; and FIG. 37 is a cross-sectional view showing an internal structure of the capacitor element of the background art.

DESCRIPTION OF THE PREFERRED EMBODIMENTS

Next, a capacitor element according to a first embodiment of the invention will be explained with reference to FIG. 1A, FIG. 1B and FIG. 2C to FIG. 2E. FIG. 1A and FIG. 1B are expanded sectional views for explaining an internal structure of a capacitor element 10 of the first embodiment, in which FIG. 1A is a traverse cross-sectional view taken along A-A line and FIG. 1B is a longitudinal cross-sectional view taken along B-B line. FIG. 2C to FIG. 2E are transverse cross-sectional views showing an internal structure of a modification example of the capacitor element 10 of the first embodiment.

As shown in FIG. 1A and FIG. 1B, the capacitor element 10 of the first embodiment includes a porous plate dielectric substance 14 made of an oxide of a first valve metal, pillar-shaped electrodes 16a, 16b respectively formed in pores 15a3 belonging to a first group and pores 15b3 belonging to a second group, which are arranged alternately in the dielectric substance 14, insulator layers 18a, 18b made of an organic insulator layer formed on tips "t" of the pillar-shaped electrodes 16a in the pores 15a3 belonging to the first group and on tips "t" of the pillar-shaped electrodes 16b in the pores 15b3 belonging to the second group, and hide electrodes 12a, 12b provided on one and the other principal surfaces 14a, 14b of the dielectric substance 14 respectively and connected to the pillar-shaped electrodes 16a, 16b respectively.

The pillar-shaped electrodes 16a, 16b include first pillar-shaped electrodes 16a formed in the pores 15a3 belonging to the first group and second pillar-shaped electrodes 16b formed in the pores 15b3 belonging to the second group. As shown in FIG. 1A, the arrangement of the pores 15a3 belonging to the first group and the pores 15b3 belonging to the second group has a structure in which, when a specific pore is taken as a center and the periphery thereof is divided equally into six, pores belonging to the same group are adjacent only in two directions opposite to each other, sandwiching the specific pore, and pores belonging to the other group surround the specific pore in the other four directions. Further, in a longitudinal cross section taken along B-B line shown in FIG. 1A, as shown in FIG. 1B, the pores 15a3 belonging to the first group the pores 15b3 belonging to the second group are arranged alternately in the traverse direction. In other words, the alternate arrangement is linearly repeated continuously in lines adjacent in the upper direction and in lines adjacent in the lower direction. In this case, since symmetric property for a magnet field is excellent, a capacitor element is suitable for applications of a high-frequency circuit, in which equivalent series inductance (ESL) is low.

More specifically, the capacitor element 10 according to the embodiment includes the porous plate dielectric substance 14 made of an oxide of a first valve metal in which plural pores 15a3 belonging to the first group and pores 15b3 belonging to the second group which pierce through in the thickness direction alternately, the first pillar-shaped electrodes 16a formed in the plural pores 15a3 belonging to the first group respectively, in which base ends "b" thereof are exposed at one principal surface of the dielectric substance 14 and the second pillar-shaped electrodes 16b formed in the plural pores 15b3 belonging the second group respectively, in which base ends "b" thereof are exposed at the other principal surface of the dielectric substance 14. Further, the capacitor element 10 includes the insulator layers 18a, 18b made of an organic insulator layer respectively provided in the pores 15a3 belonging to the first group so as to fill the tips "t" of the first pillar-shaped electrodes 16a and in the pores 15b3 belonging to the second group so as to fill tips "t" of the second pillar-shaped electrodes 16b, the first hide electrode 12a provided on one principal surface 14a of the dielectric substance 14 and connected to the base ends "b" of the first pillar-shaped electrodes 16a and the second hide electrode 12b provided on the other principal surface 14b of the dielectric substance 14 and connected to the base ends "b" of the second pillar-shaped electrodes 16b.

The arrangement of the pores 15a3 belonging to the first group and the pores 15b3 belonging to the second group in the dielectric substance 14 is not limited to the above, and it is also preferable to apply various modifications as shown, for example, in FIG. 2C to FIG. 2E below.

A capacitor element 10' whose traverse cross-section is shown in FIG. 2C has the same longitudinal cross-section as the FIG. 1B in A'-A' line, in which pores 15a3' belonging to a first group and pores 15b3' belonging to a second group are alternately arranged in the transverse direction. The alternate arrangement is repeated in a herringbone shape continuously in lines adjacent in the upper direction and lines adjacent in the lower direction. In this case, orientation property of the magnetic field tends to be reduced to some degree and the ESL tends to be increased to some degree as compared with the former capacitor element 10.

A capacitor element 10" whose transverse cross-section is shown in FIG. 2D has the same longitudinal cross-section in A"-A" line as the FIG. 1B, in which pores 15a3" belonging to a first group and pores 15b3" belonging to a second group are alternately arranged in the transverse direction. The alternate arrangement is repeated in a herringbone shape in the upper direction and the lower direction on alternate lines. In this case, the number of the first pillar-shaped electrodes is different from the number of the second pillar-shaped electrodes, therefore, electric current proof (ripple proof) property is reduced to some degree as compared with the previous capacitor element 10. The ESL tends to be increased as compared with the above.

Further, a capacitor element 10''' whose transverse cross-section is shown in FIG. 2E has the same longitudinal cross-section in A'''-A''' line as the FIG. 1B, in which pores 15a3''' belonging to a first group and pores 15b3''' belonging to a second group are alternately arranged in the transverse direction. The alternate arrangement is linearly repeated in the upper direction and the lower direction on alternate lines. In this case, the number of the first pillar-shaped electrodes is different from the number of the second pillar-shaped electrodes in the same manner as the case of the capacitor element 10", therefore, electric current proof (ripple proof) property is reduced to some degree as compared with the previous capacitor element 10. The ESL tends to be increased as compared with the above.

In addition to the above configuration, the capacitor element 10 according to the embodiment has the organic insulator layers in which electroconductive polymer layers 17a, 17b are thermally decomposed.

In addition to the above configuration, the capacitor element 10 according to the embodiment further has a configuration in which voltage is applied between the first hide electrode 12a and the second hide electrode 12b and short-circuit points between the tip "t" of the first pillar-shaped electrode 16a and the second hide electrode 12b and short-circuit points between the tip "t" of the second pillar-shaped electrode 16b and the first hide electrode 12a are burned off.

Next, a method of manufacturing the capacitor element according to a first embodiment of the invention will be explained with reference to FIG. 3 to FIG. 6. FIG. 3 is a flowchart showing an outline of an example of manufacturing process in the method of manufacturing the capacitor element 10 of the embodiment. FIG. 4 to FIG. 6 are longitudinal cross-sectional views corresponding to FIG. 1B for explaining respective processes of the manufacturing process in the order of FIG. 4A to FIG. 4E, FIG. 5F to FIG. 5I, and FIG. 6J to FIG. 6M. Note that signs put to respective processes in FIG. 3 correspond to signs in parentheses of FIG. 4 to FIG. 6.

First, an outline of the method of manufacturing the capacitor element according to the embodiment is as follows as shown in FIG. 3, a: a foil of a first valve metal is prepared, b, (d): micro concave portions are formed on one principal surface of the foil by, for example, indentation. Next, c, e: a dielectric substance including concave portions belonging to a first group and concave portions belonging to a second group having different depths on the one principal surface of the foil is formed by, for example, anodic oxidation. Next, f: a seed-layer is formed at inner surfaces of the concave portions by, for example, electroless deposition. Next, g: bottom portions of the concave portions belonging to the first group are removed by, for example, a chemical etching to form pores belonging to the first group. Next, h: first pillar-shaped electrodes are formed in the pores belonging to the first group, leaving tips of pores of the other principal surface side of the dielectric substance by, for example, electrolytic plating as well as a first hide electrode is formed at one principal surface of the porous plate dielectric substance. Next, i: bottom portions of the concave portions belonging to the second group are removed by, for example, chemical etching to form pores belonging to the second group. Next, j: electroconductive polymer layers are formed so as to fill the pores belonging to the first group and the pores belonging to the second group by, for example, electropolymerization. Next, k: second pillar-shaped electrodes are formed in the pores belonging to the second group, leaving tips of pores of one principal surface side of the dielectric substance by, for example, electrolytic plating as well as a second hide electrode is formed at the other principal surface of the porous plate dielectric substance. Next, l: the electroconductive polymer layers are insulated by, for example, pyrolysis. Next, m: short-circuit points between counter electrodes are burned off by, for example, applying voltage.

More specifically, first, as shown in FIG. 4A, a foil 13 made of a first valve metal such as Al is prepared.

Next, as shown in FIG. 4B, the foil 13 of the first valve metal is placed on a support 11, and so-called indentation is performed, which presses a die 11a in which micro bumps 11a1 are formed at plural positions on one principal surface in a predetermined arrangement on one principal surface 13a of the foil 13, thereby forming micro concave portions 15a1 at plural positions on one principal surface 13a of the foil 13 in the predetermined arrangement.

Next, as shown in FIG. 4C, concave portions 15a2 belonging to the first group are formed at positions in which the micro concave portions 15a1 are formed by performing anodic oxidation to the foil 13 of the first valve metal. If necessary, as shown in FIG. 4D, the so-called indentation is performed, which presses a die 11b in which micro bumps 11b1 are formed at plural positions on one principal surface in a predetermined arrangement in the same manner as the above on one principal surface 13a of the foil 13 at positions between plural positions in which the micro concave portions 15a1 are formed, thereby forming micro concave portions 15b1 at plural positions on one principal surface 13a of the foil 13 in the predetermined arrangement. Further anodic oxidation is performed to the foil 13.

Accordingly, as shown in FIG. 4E, concave portions 15a2 belonging to the first group having a predetermined depth are formed at positions in which the micro concave portions 15a1 are formed, and concave portions 15b2 belonging to the second group having a depth shallower than the concave portions 15a2 belonging to the first group are formed at positions between plural positions in which the micro concave portions 15a1 are formed respectively to thereby form the porous-plate dielectric substance 14.

Next, as shown in FIG. 5F, a seed-layer S is formed at inner surfaces of the concave portions 15a2 belonging to the first group of the dielectric substance 14 as well as inner surfaces of the concave portions 15b2 belonging to the second group by electroless deposition, and a first hide electrode 12a is formed on one principal surface 14a of the dielectric substance 14.

Next, as shown in FIG. 5G, bottom portions of the concave portions 15a2 belonging to the first group of the dielectric substance 14 are removed by chemical etching to form plural pores 15a3 belonging to the first group opening in the other principal surface 14b side of the dielectric substance 14.

Next, as shown in FIG. 5H, first pillar-shaped electrodes 16a whose base ends "b" are connected to the first hide electrode 12a are formed, by electrolytic plating, on the seed-layer S in pores 15a3 belonging to the first group of the dielectric substance 14, leaving tips of the pores 15a3 of the other principal surface 14b side of the dielectric substance 14. At this time, it is preferable that tips "t" of the pillar-shaped electrodes 16a have the length not reaching the other principal surface 14b of the dielectric substance 14.

Next, as shown in FIG. 5I, bottom portions of the concave portions 15b2 belonging to the second group of the dielectric substance 14 are removed by chemical etching to form plural pores 15b3 belonging to the second group opening at the other principal surface 14b side of the dielectric substance 14.

Next, as shown in FIG. 6J, electroconductive polymer layers 17a, 17b are formed on the tips "t" of the first pillar-shaped electrodes 16a in the pores 15a3 belonging to the first group of the dielectric substance 14 as well as on the first hide electrode 12a in the pores 15b3 belonging to the second group so as to fill the pores 15a3, 15b3 respectively by electropolymerization.

Next, as shown in FIG. 6K, the second electrodes 16b are formed on the seed-layer S at inner surfaces of the pores 15b3 belonging to the second group of the dielectric substance 14 as the electrolytic plating as well as a second hide electrode 12b is formed on the other principal surface 14b of the dielectric substance 14.

Next, as shown in FIG. 6L, the electroconductive polymer layers 17a, 17b are pyrolyzed and insulated by heating the dielectric substance 14 obtained as the above at 300° C. to form insulator layers 18a, 18b made of an organic insulator layer. The whole resistance value of leakage current of the electroconductive polymer layers 17a, 17b before the above pyrolysis is, for example, 0.8 mΩ. The whole resistance value of leakage current of the insulator layers 18a, 18b made of the organic insulator layer after the pyrolysis is, for example, 50 kΩ.

Next, short-circuit points between the tips "t" of the first pillar-shaped electrodes 16a and the second hide electrode 12b and between the tips "t" of the second pillar-shaped electrodes 16b and the first hide electrode 12a are burned off by applying voltage to obtain the capacitor element 10 according to the embodiment as shown in FIG. 6M.

Next, a preferred embodiment of the foil 13 of the first valve metal is as follows. Specifically, it is preferable to apply Al as the first valve metal, however, it is not limited to this, and it is also preferable to apply elemental substances of Ta, Nb, Ti, Hf, W and V or alloys thereof. As the foil 13 of the first valve metal, it is preferable that one capacitor element is formed from a sheet of foil or that plural capacitor elements are formed from a sheet of foil. When one capacitor element is formed from a sheet of foil, it is preferable, for example, to apply the length 10 mm×the width 10 mm to the length 1 mm×the width 1 mm and the thickness of 20 μm to 500 μm. When plural capacitor elements are formed from a sheet of foil, it is preferable, for example, to apply the length 500 mm×the width 500 mm to the length 10 mm×the width 10 mm, and the thickness of 20 μm to 500 μm.

In addition, a preferred embodiment of the indentation is as follows. Specifically, as the above indentation, when the Al foil is used as the foil 13 of the first valve metal, it is preferable, for example, a die made of SiC in which plural micro bumps are formed is pressed on the surface of the Al foil at a lattice constant 70 nm of bumps forming triangular lattices in a two-dimensional triangular lattice shape, however, it is not limited to this, and it is also preferable that, for example, a die having a circular-cone shape having a single micro bump is used and pressed at plural times so as to be a predetermined arrangement.

A preferred embodiment of the anodic oxidation is as follows. Specifically, it is preferable that, for example, the anodic oxidation is performed in a condition that oxidation voltage is fixed to 25V in an anodic oxidation bath ($H_2SO_4$ of 0.3M, temperature 10° C.) so that the concave portions 15a2 belonging to the first group have a predetermined depth respectively.

Next, a preferred embodiment of the dielectric layer "d" is as follows. Specifically, it is preferable that the dielectric layer "d" is formed in a porous-plate state by performing anodic oxidation to the foil 13 of the first valve metal 1. It is preferable that the layer is an oxide of the first valve metal 1 as in the dielectric substance 14, for example, $Al_2O_3$ which is an oxide of Al. In this case, the permittivity of the dielectric layer "d" is approximately 10. It is not limited to this, and it is also preferable to apply oxides of the above other valve metals such as Ta, Nb, Ti, Hf, W, and V.

Next, a preferred embodiment of the dielectric substance 14 is as follows. Specifically, it is preferable that the dielectric substance 14 is formed in a porous-plate state by performing anodic oxidation to the foil 13 of the first valve metal. It is preferable that the dielectric substance is an oxide of the first valve metal, for example, $Al_2O_3$ which is an oxide of Al, however, it is not limited to this, and it is also preferable to apply oxides of other valve metals such as Ta, Nb, Ti, Hf, W, and V.

Next, a preferred embodiment of the seed-layers is as follows. Specifically, it is preferable that the seed-layer S is Cu, however, it is not limited to this, and it is also preferable to apply elemental substances of Sn, Ag, Au, Zn, Cr, Pt, Ni or alloys thereof. It is preferable that the seed-layers is formed by electroless deposition at inner surfaces of the concave portions 15a2 belonging to the first group and inner surfaces of the concave portions 15b2 belonging to the second group from one principal surface 14a side of the porous-plate dielectric substance 14. The thickness thereof is preferable to be 1 nm to 10 nm.

A preferred embodiment of etching performed to the other principal surface 14b side of the dielectric substance 14 is as follows. Specifically, it is preferable to apply chemical etching as the etching, in which the other principal surface 14b side of the dielectric substance 14 is allowed to be dipped into, for example, an HgC12 solution.

Next, preferred embodiments of the first pillar-shaped electrodes 16a and the second pillar-shaped electrode 16b are as follows. Specifically, it is preferable that the pillar-shaped electrodes 16a, 16b are Cu as same as the hide electrodes 12a, 12b, however, it is not limited to this, and it is also preferable to apply elemental substances of Sn, Ag, Au, Zn, Cr, Pt, and Ni or alloys thereof. Additionally, the pillar-shaped electrodes 16a, 16b are preferable to be formed on the seed-layer S of the pores 15a3, 15b3 belonging to the first and second groups by electrolytic plating. The diameter of the pillar-shaped electrodes 16a, 16b is preferable to be several nm to several hundred nm. The height of the pillar-shaped electrodes 16a, 16b are not particularly limited and preferable to be several nm to several μm, more preferably to be several ten nm to several μm.

A preferred embodiment of the first hide electrode 12a and the second hide electrode 12b is as follows. Specifically, it is preferable that the hide electrodes 12a, 12b are Cu, however, it is not limited to this, and it is also preferable to apply elemental substances of Sn, Ag, Au, Zn, Cr, Pt and Ni or alloys thereof. The hide electrodes 12a, 12b are preferable to be formed in a planar shape so as to fill one principal surface 14a and the other principal surface 14b of the porous-plate dielectric substance 14 respectively by means such as electroless deposition, electolytic plating or vacuum deposition, and the thickness thereof is preferably 1 μm to 100 μm.

Next, a preferred embodiment of the electroconductive polymer layers 17a, 17b are as follows. Specifically, it is preferable that the electroconductive polymer layers 17a, 17b are formed by electropolymerization by feeding power to the dielectric substance 14 in a water solution including a monomer and an electrolyte so as to fill the pores 15a3 belonging to the first group and the pores 15b3 belonging to the second group.

As the monomer, for example, pyrrole (concentration 0.2 mol/l) is preferable, however, it is not limited to this, and for example, polyaniline, polyethylene dioxy thiophene, triazine thiol, poly (thienyl pyrrole) and the like are preferable.

As the electrolyte, for example, a water solution of p-sodium sulfonate (PTS) (concentration 0.3 mol/l) is preferable.

The thickness of the electroconductive polymer layers 17a, 17b are preferably, for example, 100 nm to 10 μm.

Additionally, the formation of the second pillar-shaped electrode 16b and the second hide electrode 12b are not limited to the electrolytic plating method, and the electroless deposition is also preferable, and further, a vacuum deposition method and the like can be used.

A preferred embodiment of the organic insulator layers 18a, 18b is as follows. Specifically, it is preferable to pyrolyze and insulate the electroconductive polymer layers 17a, 17b by increasing temperature of the dielectric substance 14 in which the electroconductive polymer layers 17a, 17b are formed to a decomposition temperature of the monomer in the electroconductive polymer layers 17a, 17b (approximately 300° C. in the case of pyrrole), for example, in the air and holding the temperature for an hour.

Next, a preferred embodiment of the insulator layer 18 is as follows. Specifically, it is preferable that the insulator layer 18 is an organic insulator obtained by pyrolyzing the electroconductive polymer layer, a $TiO_2$ film obtained by pyrolyzing a $TiO_2$ electrodeposited film, an $SiO_2$ electrodeposited film, an $SiO_2$ layer which is wet-accumulated on an Sn—Pd plated layer, an insulating resin layer and the like, and an oxide layer of the second valve metal and air space are also preferable.

Furthermore, a preferred embodiment of the voltage application is as follows. Specifically, it is preferable that, for example, voltage of 25V is applied as the voltage application between the first hide electrode 12 and the second hide electrode 12b, and for example, current is allowed to flow at short-circuit points such as the seed-layer remaining in the organic insulator layers 18a, 18b, then, accordingly the short-circuit points are burned off to thereby reduce leakage current.

In the present disclosure where conditions and/or structures are not specified, the skilled artisan in the art can readily provide such conditions and/or structures, in view of the present disclosure, as a matter of routine experimentation. Further, the anodic oxidation technology disclosed in U.S. patent application Ser. No. 12/139,444, filed Jun. 13, 2008, and U.S. patent application Ser. No. 12/139,450, filed Jun. 13, 2008, by the same assignee as in the present application can be used and modified, the disclosure of which is herein incorporated by reference in their entirety.

The present invention will be explained in detail with reference to specific examples which are not intended to limit the present invention. The numerical numbers applied in specific examples may be modified by a range of at least ±50%, wherein the endpoints of the ranges may be included or excluded.

EXAMPLE 1

First, the foil 13 made of Al having the length of 3.0 mm, the width of 1.5 mm and the thickness of 200 μm was prepared, the indentation was performed at plural positions by using the die 11a made of SiC which was 10 nm in diameter to form micro concave portions at a lattice constant 105 nm of bumps forming triangular lattices in a two-dimensional triangular lattice shape on one principal surface of the foil 13.

Next, anodic oxidation was performed in a condition that oxidation voltage was fixed to 25V, allowing one principal surface of the foil 13 to be dipped into an anodic oxidation bath ($H_2SO_4$ of 0.3 M, temperature 10° C.) to thereby form the porous dielectric substance 14 including concave portions 15a2 belonging to the first group and concave portions 15b2 belonging to the second group having an inside diameter 30 nm respectively and different depths. Next, the seed-layer S was formed at inner surfaces of concave portion 15a2, 15b2 belonging to the first and second groups by electroless deposition. Next, bottom portions of the concave portions 15a2 belonging to the first group was removed by chemical etching by using the $HgCl_2$ solution to form pores 15a3 belonging to the first group. Next, the first pillar-shaped electrodes 16a were formed in the pores 15a3 belonging to the first group by Cu electrolytic plating by feeding power to the seed-layer S at inner surfaces of the pores 15a3 belonging to the first group, leaving tips of the pores 15a3 of the other principal surface 14b side of the dielectric substance 14 as well as the first hide electrode 12a was formed on one principal surface 14a of the porous plate dielectric substance 14. Next, bottom portions of the concave portions 15b2 belonging to the second group of the dielectric substance 14 were removed by chemical etching in the same manner as the above to form pores 15b3 belonging to the second group. Next, power was fed again in the water solution of pyrrole (concentration 0.2 mol/l) as a monomer and sodium p-toluenesulfonate (PTS) (concentration 0.3 mol/l) as an electrolyte to form the electroconductive polymer layers 17a, 17b made of polypyrrole so as to fill pores belonging to the first and second groups by electropolymerization. Next, the second pillar-shaped electrodes 16b were formed inside the second pores 15b3 by the Cu electrolytic plating again as well as the second hide electrode 12b was formed on the other principal surface 14b of the porous plate dielectric substance 14. Next, the temperature was allowed to be increased to 300° C. which is a decomposition temperature of polypyrrole in the atmosphere, held for one hour to allow the electroconductive polymer layers 17a, 17b made of polypyrrole to be pyrolyzed to lose conductivity to form the organic insulator layers 18a, 18b having the thickness of 3 μm respectively. Next, voltage (alternating current/direct current) of 25V was applied between the first hide electrodes 12a and the second hide electrode 12b and short-circuit points between the counter electrodes such as the seed-layer S remaining in the organic insulator layer 18a, 18b were burned off to obtain the capacitor element 10 having the length of 1.5 mm, the width of 1.5 mm and the thickness of 0.2 mm, in which leakage current was reduced. In the capacitor element 10, the first pillar-shaped electrode 16a and the second pillar-shaped electrodes 16b respectively had a diameter of 30 nm, the pitch between the first pillar-shaped electrodes 16a and the second pillar-shaped electrodes 16b was 70 nm, and the linear dimension of a portion in which the first pillar-shaped electrode 16a and the second pillar-shaped electrode 16b were opposed to each other was 100 μm.

Concerning the obtained capacitor element 10, electrostatic capacity was measured by using an LCR meter 4263B manufactured by Agilent as well as voltage proof was measured by using high-resistance meter R8340 manufactured by ADVANTEST CORPORATION. As a result, the capacitor had initial performance in which electrostatic capacity was 0.25 mF and voltage proof was 30V, which had high CV product as compared with the conventional electrolytic capacitor having the same size in which electrostatic capacity was 47 μF and voltage proof was 4V.

The first embodiment of the method of manufacturing the capacitor element included in the invention is not limited to one example as described above, and for example, can be modified as follows.

FIG. 7 is a flowchart showing an outline of another example of manufacturing process in the method of manufacturing the capacitor element according to the first embodiment of the invention.

Specifically, the above example includes the process of m: burning off short-circuit points between the counter electrodes by, for example, applying voltage after the process of l: insulating the electroconductive polymer layers by, for example, pyrolysis. Whereas, in the modification example, it is also preferable that l': the electroconductive polymer layers are insulated and the short-circuit points are burned off at the same time by, for example, applying voltage under high temperature. The method of manufacturing the capacitor element according to the embodiment can be all performed by wet processes, which can provide a reasonable capacitor element.

Additionally, the example has a characteristic that the leakage current can be controlled by burning-off.

Next, a second embodiment of the capacitor element included in the invention will be explained. An insulator layer of a capacitor element 120 of the embodiment is made of an organic insulator layer obtained by insulating, for example, an electroconductive polymer layer by pyrolysis in the same way as the above first embodiment, therefore, explanation thereof will be omitted.

Next, a second embodiment of a method of manufacturing the capacitor element included in the invention will be explained with reference to FIG. 8 to FIG. 12. FIG. 8 is a flowchart showing an outline of one example of manufacturing process in a method of manufacturing the capacitor element 120 according to the embodiment. FIG. 9 and FIG. 10 are longitudinal cross-sectional views corresponding to FIG. 1B for explaining respective processes of the manufacturing process, which is continued from FIG. 4A to FIG. 4E of the above first embodiment to FIG. 9G2 to FIG. 9I2, FIG. 10K21 to FIG. 10F22 in order. Note that signs put to respective processes in FIG. 8 correspond to signs in parentheses of FIG. 9 G2 to FIG. 9I2 and FIG. 10 K21 to FIG. 10F22.

The outline of the method of manufacturing the capacitor element according to the embodiment is as follows as shown in FIG. 8, a: a foil 13 of a first valve metal is prepared, b, (d): micro concave portions 15a1, (15b1) are formed on one principal surface of the foil 13 by, for example, indentation. Next, c, e: a dielectric substance 14 including concave portions 15a2 belonging to a first group and concave portions 15b2 belonging to a second group which are different depths in the one principal surface 13a of the foil 13 is formed by, for example, anodic oxidation. Next, g2: bottom portions of concave portions 15a2 belonging to the first group of the dielectric substance 14 are removed by, for example, chemical etching to form pores 15a3 belonging to the first group. Next, f21: a first feeding power electrode 12a' is formed on one principal surface 14a of the dielectric substance 14 by, for example, electroless deposition. Next, h2: first pillar-shaped electrodes 16a are formed in the pores 15a3 belonging to the first group, leaving tips of the pores 15a3 of the other principal surface 14b side of the dielectric substance 14 by, for example, electrolytic plating. Next, j21: an insulator layer 128a is formed in the pores 15a3 belonging to the first group so as to fill tips "t" of the first pillar-shaped electrodes 16a. Next, i2: the first feeding power electrode 12a' and bottom portions of concave portions 15b2 belonging to the second group are removed by, for example, chemical etching to form pores 15b3 belonging to the second group. Next, k21: a second hide electrode 12b is formed on the other principal surface 14b of the dielectric substance 14 by, for example, electroless deposition. Next, k22: second pillar-shaped electrodes 16b are formed in the pores 15b3 belonging to the second group, leaving tips of the pores 15b3 of one principal surface 14a side of the dielectric substance 14. Next, j22: an insulator layer 128b is formed in the pores 15b3 belonging to the second group so as to fill the tips "t" of the second pillar-shaped electrodes 16b, Next, f22: a first hide electrode 12a connecting to base ends "b" of the first pillar-shaped electrode 16a on one principal surface 14a of the dielectric substance 14 is formed.

Next, points in which the method of manufacturing the capacitor element 120 according to the embodiment is different from the method of manufacturing the capacitor element 10 of the previous first embodiment will be described. In the previous embodiment, the insulator layer 18 is formed at the same time on the tips "t" of the first pillar-shaped electrodes 16a in the pores 15a3 belonging to the first group and bottom portions of the pores 15b3 belonging to the second group, however, in the present embodiment, the insulator layer 128a on the tips "t" of the first pillar-shaped electrodes 16a in the pores 15a3 belonging to the first group and the insulator layer 128b on the tips "t" of the second pillar-shaped electrodes 16b in the pores 15b3 belonging to the second group are formed in processes which are independent from each other in the manufacturing process. The method of manufacturing the capacitor element according to the embodiment can be all performed by wet processes, which enables a reasonable capacitor element to be provided.

Next, one example of the method of manufacturing the capacitor element 120 according to the embodiment will be shown in FIG. 11 and FIG. 12. FIG. 11 is a flowchart showing an outline of one example of manufacturing process according to the embodiment. FIG. 12J211 to FIG. 12J222 are longitudinal cross-sectional views for explaining forming processes of the insulating layer 18 in the manufacturing process. Note that signs put to respective processes in FIG. 11 correspond to signs in parentheses of FIG. 12J211 to FIG. 12J222.

Specifically, the process j21: the insulating layer 128a is formed on tips "t" of the first pillar-shaped electrodes 16a according to the embodiment corresponds to a process J211: an electroconductive layer 127a is formed on the tips "t" of the first pillar-shaped electrodes 16a by, for example, electropolymerization, using the first feeding power electrode 12a' as a feeding power layer, then, a process j212: the insulator layer 128a is formed by insulating an electroconductive polymer layer 127a by, for example, pyrolysis. Similarly, the process j22: the insulator layer 128b is formed on tips 't' of the second pillar-shaped electrodes 16b in the embodiment corresponds to a process J221: an electroconductive polymer layer 127b is formed on tips "t" of the second pillar-shaped electrodes 16b by, for example, electropolymerization, using the second hide electrode 12b as a feeding power layer, then, a process J222; the insulator layer 128b is formed by insulating the electroconductive polymer layer 127b.

Next, a preferred embodiment of the first feeding power electrode 12a' will be explained. Specifically, as materials for the first feeding power electrode 12a', metals (for example, at least one kind selected from Cu, Ni, Cr, Ag, Au, Pd, Fe, Sn, Pt, Ir, Rh, Ru, Al) can be used. The thickness of the first feeding power electrode 12a' is preferably several ten nm to several μm. As a method of forming the first feeding power electrode 12a', PVD, CVD and the like can be used in addition to electroless deposition.

EXAMPLE 2

First, the foil 13 made of Al having the length of 3.0 mm, the width of 1.5 mm and the thickness of 200 μm was prepared, and the porous plate dielectric substance 14 including the concave portions 15a2 belonging to the first group and the concave portions 15b2 belonging to the second group having different depths was formed in the same manner as the previous Example 1.

Next, bottoms of the concave portions 15a2 belonging to the first group were removed by chemical etching using an $HgCl_2$ solution to form pores 15a3 belonging to the first group. Next, the first feeding power electrode 12a' made of Ni was formed on one principal surface 14a by electroless deposition. Next, the first pillar-shaped electrodes 16a were formed in pores 15a3 belonging to the first group by Cu electrolytic plating by feeding the first feeding power electrodes 12a', leaving tips of the pores 15a3 of the other principal surface 14b side of the dielectric substance 14. Next, the electroconductive polymer layer 127a made of electrodeposition polyimide resin was formed on tips "t" of the first pillar-shaped electrodes 16a in the pores 15a3 belonging to the first group so as to fill the pores 15a3, then, heat treatment was performed at 300° C. for 1 hour to lose conductivity by pyrolysis, thereby forming an insulator layer 128a made of an organic insulator having the thickness of 3 μm. Next, pores 15b3 belonging to the second group were formed by removing the first feeding power electrode 12a' and bottoms of concave portions 15b2 belonging to the second group by chemical etching using the $HgCl_2$ solution. Next, the second hide electrode 12b made of Ni was formed on the other principal surface 14b of the dielectric substance 14 by electroless deposition. Next, the second pillar-shaped electrodes 16b were formed in the pores 15b3 belonging to the second group by Cu electrolytic plating, using the hide electrode 12b as a feeding power layer, leaving tips of the pores 15b3 of one principal surface 14a side of the dielectric substance 14. Next, in the same manner as described above, the electroconductive polymer layer 127b made of electrodeposition polyimide resin was formed on tips "t" of the second pillar-shaped electrodes 16b in the pores 15b3 belonging to the second group so as to fill the pores 15b3, then, heat treatment was performed to lose conductivity by pyrolysis, thereby forming an insulator layer 128b made of an organic insulator having the thickness of 3 μm. Next, a first hide electrode 12a was formed on one principal surface 14a of the dielectric substance 14 by Cu electrolytic plating so as to touch base ends "b" of the first pillar-shaped electrodes 16a to obtain the capacitor element 120. In the capacitor element 120, as in the capacitor element 10 of the Example 1, the first pillar-shaped electrode 16a and the second pillar-shaped electrode 16b respectively had 30 nm in diameter, the pitch between the first pillar-shaped electrode 16a and the second pillar-shaped electrode 16b was 70 nm, the linear dimension of a portion in which the first pillar-shaped electrode 16a and the second pillar-shaped electrode 16b were opposed to each other was 100 μm.

Concerning the obtained capacitor element 120, electrostatic capacity was measured by using an LCR meter 4263B manufactured by Agilent as well as voltage poof was measured by using high-resistance meter R8340 manufactured by ADVANTEST CORPORATION. As a result, the capacitor had initial performance in which electrostatic capacity was 0.25 mF and voltage proof was 30V in the same manner as the Example 1.

Next, a third embodiment of the capacitor element included in the invention will be explained. A capacitor element 130 of the embodiment is different from the capacitor elements of the previous first and second embodiments in a point that the insulator layer is made of a $TiO_2$ film. Since other configurations are same as the previous first embodiment, explanation thereof is omitted. Note that the capacitor element of the present embodiment has a characteristic that insulation performance is excellent.

Next, a third embodiment of a method of manufacturing the capacitor element included in the invention will be explained with reference of FIG. 13 and FIG. 14. FIG. 13 is a flowchart showing an outline of one example of manufacturing process in the method of manufacturing the capacitor element 130 according to the embodiment. FIG. 14J311 to FIG. 14J322 are longitudinal cross-sectional views for explaining forming processes of insulator layers in the manufacturing process. Signs put to respective processes in FIG. 13 correspond to signs in parentheses of FIG. 14J311 to FIG. 14J322.

The outline of the method of manufacturing the capacitor element 130 of the present embodiment is as follows as shown in FIG. 13, a: a foil 13 of a first valve metal is prepared, b, (d): micro concave portions 15a1 (15b1) are formed on one principal surface of the foil 13 by, for example, indentation. Next, c, e: a dielectric substance 14 including concave portions 15a2 belonging to a first group and concave portions 15b2 belonging to a second group having different depths in the one principal surface 13a of the foil 13 is formed by, for example, anodic oxidation. Next, g3: bottom portions of the concave portions 15a2 belonging to the first group of the dielectric substance 14 are removed by, for example, chemical etching to form pores 15a3 belonging to the first group. Next, f31: a first feeding power electrode 12a' is formed on one principal surface 14a of the dielectric substance 14 by, for example, electroless deposition. Next, h3: first pillar-shaped electrodes 16a are formed in the pores 15a3 belonging to the first group by, for example, electrolytic plating, leaving tips of the pores 15a3 of the other principal surface 14b side of the dielectric substance 14. Next, as a process corresponding to the former insulating layer forming process j21 in the previous second embodiment, j311: a $TiO_2$ electrodeposited film 137a is formed by, for example, electrolytic plating on the tips "t" of the first pillar-shaped electrodes 16a in the pores 15a3 belonging to the first group so as to fill the pores 15a3, then, j312: the $TiO_2$ electrodeposited film 137a is insulated by, for example, heat treatment to form an insulator layer 138a made of the $TiO_2$ film. Next, i3: the first feeding power electrode 12a' and bottom portions of the concave portions 15b2 belonging to the second group are removed by chemical etching to form pores 15b3 belonging to the second group.

Next, k31: a second hide electrode 12b is formed on the other principal surface 14b of the dielectric substance 14 by, for example, electroless deposition. Next, k32: second pillar-shaped electrodes 16b are formed in the pores 15b3 belonging to the second group, leaving tips of the pores 15b3 of one principal surface 14a side of the dielectric substance 14. Next, as a process corresponding to the latter insulating layer forming process j22 of the previous second embodiment, j321: a TiOs electrodeposited film 137b is formed on the tips "t" of the second pillar-shaped electrodes 16b in the pores 15b3 belonging to the second group so as to fill the pores 15b3, then, j322: the $TiO_2$ electrodeposited film 137a is insulated to form an insulator layer 138b made of the $TiO_2$ film. Next, f32: the first hide electrode 12a connected to the base ends "b" of the first pillar-shaped electrodes 16a on one principal surface 14a of the dielectric substance 14 is formed.

In the method of manufacturing the capacitor element according the embodiment, in the same manner as the previous second embodiment, the insulator layer 138a on the tips "t" of the first pillar-shaped electrodes 16a in the pores 15a3 belonging to the first group and the insulator layer 138b on the tips "t" of the second pillar-shaped electrodes 16b in the pores 15b3 belonging to the second group are formed in processes which are independent from each other in the manufacturing process.

Next, a preferred embodiment of the $TiO_2$ electrodeposited film is explained. Specifically, as the $TiO_2$ electrodeposited film, a titanium oxide film obtained by performing electrolytic plating in a titanium chloride solution can be used. It is preferable that the thickness of the $TiO_2$ electrodeposited film is approximately several ten nm to several μm.

Next, a preferred embodiment of the $TiO_2$ film is explained. Specifically, it is preferable that the thickness of the $TiO_2$ film is several ten nm to several μm. In the method of manufacturing the capacitor element according to the embodiment has a characteristic that the insulating film can be easily formed.

Next, a preferred embodiment of the heat treatment is explained. Specifically, it is preferable that the heat treatment is performed in the oxygen atomosphere, for example, at 450° C. for approximately 30 minutes.

EXAMPLE 3

First, the foil 13 made of Al having the length of 3.0 mm, the width of 1.5 mm and the thickness of 200 μm was prepared, and the porous plate dielectric substance 14 including concave portions 15a2 belonging to the first group and concave portions 15b2 belonging to the second group having different depths was formed in the same manner as the previous Example 1.

Next, in the same manner as the Example 2, the pores 15a3 belonging to the first group, the first feeding power electrode 12a' and first pillar-shaped electrodes 16a were formed. Next, the electrodeposited $TiO_2$ film 137a was formed on tips "t" of the first pillar-shaped electrodes 16a in the pores 15a3 belonging to the first group so as to fill the pores 15a3 by performing the electrolytic plating in a titanium chloride solution, then, the insulator layer 138a made of $TiO_2$ having the thickness of 7.5 μm was formed by performing heat treatment at 450° C. for 30 minutes. Next, in the same manner as the Example 2, pores 15b3 belonging to the second group, a second hide electrode 12b and second pillar-shaped electrodes 16b were formed. Next, the insulating layer 138b made of $TiO_2$ having the thickness of 7.5 μm was formed in the same manner as described above. Next, the first hide electrode 12a was formed on one principal surface 14a of the dielectric substance 14 by Cu electrolytic plating so as to touch base ends "b" of the first pillar-shaped electrodes 16a to obtain the capacitor element 130. In the capacitor element 130, as in the capacitor element 10 of the Example 1, the first pillar-shaped electrode 16a and the second pillar-shaped electrode 16b respectively had 30 nm in diameter, the pitch between the first pillar-shaped electrode 16a and the second pillar-shaped electrode 16b was 70 nm, the linear dimension of a portion in which the first pillar-shaped electrode 16a and the second pillar-shaped electrode 16b were opposed to each other was 100 μm.

Concerning the obtained capacitor element 130, electrostatic capacity was measured by using an LCR meter 4263B manufactured by Agilent as well as voltage poof was measured by using high-resistance meter R8340 manufactured by ADVANTEST CORPORATION. As a result, the capacitor had initial performance in which electrostatic capacity was 0.25 mF and voltage proof was 30V in the same manner as the Example 1.

Next, a fourth embodiment of the capacitor element included in the invention will be explained. A capacitor element 140 of the embodiment is different from the capacitor elements of the previous first to third embodiments in a point that the insulator layer is made of $SiO_2$ film. Since other configurations are the same as the previous first embodiment, explanation thereof is omitted. Note that the capacitor element 140 of the present embodiment has a characteristic that thermal stability is excellent.

Next, a fourth embodiment of a method of manufacturing the capacitor element included in the invention will be explained with reference to FIG. 15. FIG. 15 is a flowchart showing an outline of one example in manufacturing process of the method of manufacturing the capacitor element 140 according to the embodiment.

The outline of the method of manufacturing the capacitor element 140 of the present embodiment is as follows as shown in FIG. 15, a: a foil 13 of a first valve metal is prepared, b, (d): micro concave portions 15a1 (15b1) are formed on one principal surface 13a of the foil 13 by, for example, indentation. Next, c, e: a dielectric substance 14 including concave portions 15a2 belonging to a first group and concave portions 15b2 belonging to a second group having different depths in the one principal surface 13a of the foil 13 is formed by, for example, anodic oxidation. Next, g4: bottom portions of the concave portions 15a2 belonging to the first group of the dielectric substance 14 are removed by, for example, chemical etching to form pores 15a3 belonging to the first group. Next, f41: a first feeding power electrode 12a' is formed on one principal surface 14a of the dielectric substance 14 by, for example, electroless deposition. Next, h4: first pillar-shaped electrodes 16a are formed in the pores 15a3 belonging to the first group by, for example, electrolytic plating, leaving tips of the pores 15a3 of the other principal surface 14b side of the dielectric substance 14. Next, as a process corresponding to the former insulating layer forming process j21 in the previous second embodiment, j41: an insulator layer 148a made of an $SiO_2$ layer is formed by, for example, electrolytic plating on the tips "t" of the first pillar-shaped electrodes 16a in the pores 15a3 belonging to the first group so as to fill the pores 15a3. Next, i4: the first feeding power electrode 12a' and bottom portions of concave portions 15b2 belonging to the second group are removed by, for example, chemical etching to form pores 15b3 belonging to the second group. Next, k41: a second hide electrode 12b is formed on the other principal surface 14b of the dielectric substance 14 by, for example, electroless deposition. Next, k42: second pillar-shaped electrodes 16b are formed in the pores 15b3 belonging to the second group, leaving tips of the pores 15b3 of one principal surface 14a side of the dielectric substance 14. Next, as a process corresponding to the latter insulating film forming process j22 of the previous second embodiment, j42: an insulator layer 148b made of an $SiO_2$ layer is formed on the tips "t" of the second pillar-shaped electrodes 16b in the pores 15b3 belonging to the second group so as to fill the pores 15b3. Next, f42: a first hide electrode 12a touching base ends "b" of the first pillar-shaped electrodes 16a on one principal surface 14a of the dielectric substance 14 is formed.

In the method of manufacturing the capacitor element 140 according the embodiment, in the same manner as the previous second embodiment, the insulator layer 148a on the tips "t" of the first pillar-shaped electrodes 16a in the pores 15a3 belonging to the first group and the insulator layer 148b on the tips "t" of the second pillar-shaped electrodes 16b in the pores 15b3 belonging to the second group are formed in processes which are independent from each other in the manufacturing process.

Next, a preferred embodiment of the $SiO_2$ layer is explained. Specifically, as the $SiO_2$ layer, a silicon oxide film obtained by performing electrolytic plating processing in an ammonium fluorosilicate solution can be used. The thickness of the $SiO_2$ layer is preferably several ten nm to several μm. The method of manufacturing the capacitor element according to the embodiment has a characteristic that the process is simple.

EXAMPLE 4

First, the foil 13 made of Al having the length of 3.0 mm, the width of 1.5 mm and the thickness of 200 μm was prepared, and the porous plate dielectric substance 14 including concave portions 15a2 belonging to the first group and concave portions 15b2 belonging to the second group having different depths was formed in the same manner as the previous Example 1.

Next, in the same manner as the Example 2, the pores 15a3 belonging to the first group, a first feeding power electrode 12a' and first pillar-shaped electrodes 16a were formed. Next, the insulator film 148a made of an $SiO_2$ film having the thickness of 1.5 μm was formed on tips "t" of the first pillar-shaped electrodes 16a in the pores 15a3 belonging to the first group so as to fill the pores 15a3 by performing electrolytic plating in an ammonium fluorosilicate solution. Next, in the same manner as the Example 2, the pores 15b3 belonging to the second group, the second hide electrode 12b and the second pillar-shaped electrodes 16b were formed. Next, in the same manner as described above, the insulator film 148b made of a $SiO_2$ film having the thickness of 1.5 μm was formed. Next, the first hide electrode 12a was formed on one principal surface 14a of the dielectric substance 14 so as to touch base ends "b" of the first pillar-shaped electrodes 16a by Cu electrolytic plating to obtain the capacitor element 140. In the capacitor element 140, as in the capacitor element 10 of the Example 1, the first pillar-shaped electrode 16a and the second pillar-shaped electrode 16b respectively had 30 nm in diameter, the pitch between the first pillar-shaped electrode 16a and the second pillar-shaped electrode 16b was 70 nm, the linear dimension of a portion in which the first pillar-shaped electrode 16a and the second pillar-shaped electrode 16b were opposed to each other was 100 μm.

Concerning the obtained capacitor element 140, electrostatic capacity was measured by using an LCR meter 4263B manufactured by Agilent as well as voltage proof was measured by using high-resistance meter R8340 manufactured by ADVANTEST CORPORATION. As a result, the capacitor had initial performance in which electrostatic capacity was 0.25 mF and voltage proof was 30V in the same manner as the Example 1.

Next, a fifth embodiment of the capacitor element included in the invention will be explained. A capacitor element 150 of the embodiment is the same as the capacitor element of the previous fourth embodiment in a point that the insulator layer is made of an $SiO_2$ film. Since other configurations are the same as the capacitor element 10 of the previous first embodiment, explanation thereof is omitted. Note that the capacitor element 150 of the present embodiment has a characteristic that thermal stability is excellent as in the capacitor element 140 of the fourth embodiment.

Next, a fifth embodiment of a method of manufacturing the capacitor element included in the invention will be explained with reference of FIG. 16 and FIG. 17. FIG. 16 is a flowchart showing an outline of one example of manufacturing process of the method of manufacturing the capacitor element 150 according to the embodiment. FIG. 17J511 to FIG. 17J522 are longitudinal cross-sectional views for explaining forming processes of insulator layers in the manufacturing process. Signs put to respective processes in FIG. 16 correspond to signs in parentheses of FIG. 17J511 to FIG. 17J522.

The outline of the method of manufacturing the capacitor element 150 of the present embodiment is as follows as shown in FIG. 16, a: a foil 13 of a first valve metal is prepared, b, (d): micro concave portions 15a1 (15b1) are formed on one principal surface 13a of the foil 13 by, for example, indentation. Next, c, e: a dielectric substance 14 including concave portions 15a2 belonging to a first group and concave portions 15b2 belonging to a second group having different depths in the one principal surface 13a of the foil 13 is formed by, for example, anodic oxidation. Next, g5: bottom portions of the concave portions 15a2 belonging to the first group of the dielectric substance 14 are removed by, for example, chemical etching to form pores 15a3 belonging to the first group. Next, f51: a first feeding power electrode 12a' is formed on one principal surface 14a of the dielectric substance 14 by, for example, electroless deposition. Next, h5: first pillar-shaped electrodes 16a are formed in the pores 15a3 belonging to the first group by, for example, electrolytic plating, leaving tips of the pores 15a3 of the other principal surface 14b side of the dielectric substance 14. Next, as a process corresponding to the former insulating layer forming process j21 in the previous second embodiment, j511: an Sn—Pd plating layer 157a is formed by, for example, electrolytic plating on the tips "t" of the first pillar-shaped electrodes 16a in the pores 15a3 belonging to the first group so as to fill the pores 15a3, then, j512: an insulator layer 158a made of an $SiO_2$ layer is formed on the Sn—Pd plating layer 157a by wet accumulation so as to fill the pores 15a3. Next, i5: the first feeding power electrode 12a' and bottom portions of the concave portions 15b2 belonging to the second group are removed by, for example, chemical etching to form pores 15b3 belonging to the second group. Next, k51: a second hide electrode 12b is formed on the other principal surface 14b of the dielectric substance 14 by, for example, electroless deposition. Next, k52: second pillar-shaped electrodes 16b are formed in the pores 15b3 belonging to the second group, leaving tips of the pores 15b3 of one principal surface 14a side of the dielectric substance 14. Next, as a process corresponding to the latter insulating film forming process j22 of the previous second embodiment, J521: an Sn—Pd plating layer 157b is formed on tips "t" of the second pillar-shaped electrodes 16b in the pores 15b3 belonging to the second group so as to fill the pores 15b3, then, j522: an insulator layer 158b made of an $SiO_2$ layer is formed on the Sn—Pd plating layer 157b by wet accumulation. Next, f52: a first hide electrode 12a touching base ends "b" of the first pillar-shaped electrodes 16a is formed on one principal surface 14a of the dielectric substance 14.

In the method of manufacturing the capacitor element 150 according to the embodiment, in the same manner in the previous second embodiment, the insulator layer 158a on the tips "t" of the first pillar-shaped electrodes 16a in the pores 15a3 belonging to the first group and the insulator layer 158b on the tips "t" of the second pillar-shaped electrodes 16b in the pores 15b3 belonging to the second group are formed in processes which are independent from each other in the manufacturing process.

Next, a preferred embodiment of the Sn—Pd plating layer is explained. Specifically, the Sn—Pd plating layer can be obtained by performing electrolytic plating in an $SnCl_2$ solution and a $PdCl_2$ solution, respectively. The thickness of the plating layer is preferably several ten nm to several μm.

Next, a preferred embodiment of the wet accumulation of the $SiO_2$ film is explained. Specifically, as the wet accumulation of the $SiO_2$ film, a silicon oxide film obtained by electroless deposition processing in an ammonium fluorosilicate solution can be used. The thickness of the layer is preferably several ten nm to several μm. The method of manufacturing the capacitor element of the embodiment has a characteristic that the process is simple. The wet accumulation of the $SiO_2$ film is not limited to the electroless deposition processing but the $SiO_2$ film can be formed by using, for example, a slurry build method.

EXAMPLE 5

First, the foil 13 made of Al having the length of 3.0 mm, the width of 1.5 mm and the thickness of 200 μm was prepared, and the porous plate dielectric substance 14 including concave portions 15a2 belonging to the first group and concave portions 15b2 belonging to the second group having different depths was formed in the same manner as the previous Example 1.

Next, in the same manner as the Example 2, the pores 15a3 belonging to the first group, the first feeding power electrode 12a' and the first pillar-shaped electrodes 16a are formed. Next, the Sn—Pd plating layer 157a is formed on tips "t" of the first pillar-shaped electrodes 16a in the pores 15a3 belonging to the first group so as to fill the pores 15a3 by performing electrolytic plating in the $SnCl_2$ solution and the $PdCl_2$ solution, respectively. Next, the insulator layer 158a made of the $SiO_2$ film having the thickness of 1.5 μm is formed on the Sn—Pd plating layer so as to fill the pores 15a3 by electroless deposition in an ammonium fluorosilicate solution. Next, in the same manner as the Example 2, pores 15b3 belonging to the second group, the second hide electrode 12b and the second pillar-shaped electrodes 16b were formed. Next, in the same manner as described above, an insulator film 158b made of an $SiO_2$ film having the thickness of 1.5 μm was formed on the Sn—Pd plating layer 157b. Next, the first hide electrode 12a was formed on one principal surface 14a of the dielectric substance 14 so as to touch base ends "b" of the first pillar-shaped electrodes 16a by Cu electrolytic plating to obtain the capacitor element 150. In the capacitor element 150, as in the capacitor element 10 of the Example 1, the first pillar-shaped electrode 16a and the second pillar-shaped electrode 16b respectively had 30 nm in diameter, the pitch between the first pillar-shaped electrode 16a and the second pillar-shaped electrode 16b was 70 nm, the linear dimension of a portion in which the first pillar-shaped electrode 16a and the second pillar-shaped electrode 16b were opposed to each other was 100 μm.

Concerning the obtained capacitor element 150, electrostatic capacity was measured by using an LCR meter 4263B manufactured by Agilent as well as voltage proof was measured by using high-resistance meter R8340 manufactured by ADVANTEST CORPORATION. As a result, the capacitor had initial performance in which electrostatic capacity was 0.25 mF and voltage proof was 30V in the same manner as the Example 1.

Next, a sixth embodiment of the capacitor element included in the invention will be explained. A capacitor element 160 of the embodiment is different from the capacitor elements of the previous first to fifth embodiments in a point that the insulator layer is made of an insulating resin layer. Since other configurations are the same as the capacitor element 10 of the previous first embodiment, explanation thereof is omitted.

Next, a sixth embodiment of a method of manufacturing the capacitor element included in the invention will be explained with reference of FIG. 18 to FIG. 20. FIG. 18 is a flowchart showing an outline of one example of manufacturing process of the method of manufacturing the capacitor element 160 according to the embodiment. FIG. 19 and FIG. 20 are longitudinal cross-sectional views corresponding to FIG. 1B for explaining respective processes in the manufacturing process, which is continued from FIG. 4A to FIG. 4E of the above first embodiment to FIG. 19G6 to FIG. 19J61, FIG. 20K61 to FIG. 20F62 in order. Signs put to respective processes in FIG. 18 correspond to signs in parentheses of FIG. 19 and FIG. 20.

The outline of the method of manufacturing the capacitor element 160 of the present embodiment is as follows as shown in FIG. 18, a: a foil 13 of a first valve metal is prepared, b, (d): micro concave portions 15a1 (15b1) are formed on one principal surface 13a of the foil 13 by, for example, indentation. Next, c, e: a dielectric substance 14 including concave portions 15a2 belonging to a first group and concave portions 15b2 belonging to a second group having different depths in the one principal surface 13a of the foil 13 is formed by, for example, anodic oxidation. Next, g6: bottom portions of the concave portions 15a2 belonging to the first group of the dielectric substance 14 are removed by, for example, chemical etching to form pores 15a3 belonging to the first group. Next, f61: a first feeding power electrode 12a' is formed on one principal surface 14a of the dielectric substance 14 by, for example, electroless deposition. Next, h6: first pillar-shaped electrodes 16a are formed in the pores 15a3 belonging to the first group by, for example, electrolytic plating, leaving tips of the pores 15a3 of the other principal surface 14b side of the dielectric substance 14. Next, i6: the first feeding power electrode 12a' and bottom portions of the concave portions 15b2 belonging to the second group are removed by, for example, chemical etching to form pores 15b3 belonging to the second group. Next, j61: an insulator layer 168a is formed on tips "t" of the first pillar-shaped electrodes 16a in the pores 15a3 belonging to the first group so as to fill the pores 15a3. Next, k61: a second hide electrode 12b is formed on the other principal surface 14b of the dielectric substance 14, for example, electroless deposition. Next, k62: second pillar-shaped electrodes 16b are formed on the second hide electrode 12b in the pores 15b3 belonging to the second group, leaving tips of the pores 15b3 of one principal surface 14a side of the dielectric substance 14. Next, j62: an insulator layer 168b is formed on tips "t" of the second pillar-shaped electrodes 16b in the pores 15b3 belonging to the second group so as to fill the pores 15b3. Next, f62: a first hide electrode 12a touching base ends "b" of the first pillar-shaped electrodes 16a is formed on one principal surface 14a of the dielectric substance 14.

In the method of manufacturing the capacitor element 160 according to the embodiment, in the same manner as the method of manufacturing the capacitor element in the previous second embodiment, the insulator layer 168a on the tips "t" of the first pillar-shaped electrodes 16a in the pores 15a3 belonging to the first group and the insulator layer 168b on the tips "t" of the second pillar-shaped electrodes 16b in the pores 15b3 belonging to the second group are formed in processes which are independent from each other in the manufacturing process.

Next, one example of the method of manufacturing the capacitor element 160 according to the embodiment is shown in FIG. 21 and FIG. 22. FIG. 21 is a flowchart showing an outline of one example of manufacturing process of the embodiment. FIG. 22J611 and FIG. 22J612 are longitudinal cross-sectional views for explaining forming processes of an insulator layer in the manufacturing process.

Specifically, in j61 of the embodiment: a process of forming the insulator layer 168a is formed on tips "t" of the first pillar-shaped electrodes 16a, first, for example, the pressure in a chamber is reduced in a state in which the dielectric substance 14 is dipped into a resin solution in the chamber, j611: an insulating resin solution 167a are buried on tips "t" of the first pillar-shaped electrodes 16a in the pores 15a3 belonging to the first group and into the pores 15b3 belonging to the second group so as to fill the pores 15b3. Next, for example, reduced suction is performed from one principal surface 14a side of the dielectric substance 14, j612: the resin solution 167a in the pores 15b3 belonging to the second group is removed. After that, heat treatment in the atmosphere at 150° C. for 30 minutes is performed and the resin solution 167a selectively remaining only on tips "t" of the first pillar-shaped electrodes 16a in the pores 15a3 belonging to the first group is cured to form the insulator layer 168a.

Next, a preferred embodiment of the insulating resin is explained. Specifically, as the insulating resin, a polyimide resin, an epoxy resin and the like are preferable. The thickness of the insulating resin is preferably several ten nm to several μm. In the case of using the polyimide resin as the insulating resin layer, the layer has a characteristic that the dielectric breakdown potential frequency is high such as 400,000V/m. In the case of using the epoxy resin as the insulating resin layer, the layer has a characteristic that moisture absorption is low and durability for a reflow solder heat test is high.

EXAMPLE 6

First, the foil 13 made of Al having the length of 3.0 mm, the width of 1.5 mm and the thickness of 200 μm was prepared, and the porous plate dielectric substance 14 including concave portions 15a2 belonging to the first group and concave portions 15b2 belonging to the second group having different depths was formed in the same manner as the previous Example 1.

Next, bottoms of concave portion 15a2 belonging to the first group was removed by chemical etching using an $HgCl_2$ solution to form pores 15a3 belonging to the first group. Next, the first feeding power electrode 12a' made of Ni was formed on one principal surface 14a by electroless deposition. Next, the first pillar-shaped electrodes 16a were formed in the pores 15a3 belonging to the first group by Cu electrolytic plating by feeding power to the first feeding power electrode 12a', leaving tips of the pores 15a3 of the other principal surface 14b side of the dielectric substance 14. Next, the first feeding power electrode 12a' and bottoms of concave portions 15b2 belonging to the second group were removed by chemical etching using the HgCl$_2$ solution to form pores 15b3 belonging to the second group. Next, the dielectric substance 14 was accommodated in a chamber in which polyimide resin solution was stored, then, the pressure in the chamber was reduced to fill the polyimide resin solution on tips "t" of the first pillar-shaped electrode 16a in the pores 15a3 belonging to the first group and the pores 15b3 belonging to the second group. Next, the resin solution in the pores 15b3 belonging to the second group was removed by performing reduced suction from one principal surface 14a side of the dielectric substance, then, heat treatment in the atmosphere at 150° C. for 30 minutes was performed and the resin solution 167a selectively remaining only on tips "t" of the first pillar-shaped electrodes 16a in the pores 15a3 belonging to the first group was cured to form the insulator layer 168a made of the insulating resin having the thickness of 75 nm. Next, the second hide electrode 12b made of Ni was formed on the other principal surface 14b of the dielectric substance 14 by electroless deposition. Next, the second pillar-shaped electrodes 16b were formed in the pores 15b3 belonging to the second group by Cu electrolytic plating using the hide electrode 12b as a feeding power layer, leaving tips of the pores 15b3 of one principal surface 14a side of the dielectric substance 14. Next, a solution of polyimide resin 167b was filled on tips "t" of the second pillar-shaped electrodes 16b in the pores 15b3 belonging to the second group so as to fill the pores 15b3 in the same manner as described above, and heat treatment was performed as described above to form the insulator layer 168b made of the insulating resin having the thickness of 75 nm which fills the tips "t" of the second pillar-shaped electrodes 16b in the pores 15b3 belonging to the second group. Next, the first hide electrode 12a was formed by Cu electrolytic plating in one principal surface 14a of the dielectric substance 14 so as to touch base ends "b" of the first pillar-shaped electrodes 16a to obtain a capacitor element 160. In the capacitor element 160, as in the capacitor element 10 of the Example 1, the first pillar-shaped electrode 16a and the second pillar-shaped electrode 16b respectively had 30 nm in diameter, the pitch between the first pillar-shaped electrode 16a and the second pillar-shaped electrode 16b was 70 nm, the linear dimension of a portion in which the first pillar-shaped electrode 16a and the second pillar-shaped electrode 16b were opposed to each other was 100 μm.

Concerning the obtained capacitor element 160, electrostatic capacity was measured by using an LCR meter 4263B manufactured by Agilent as well as voltage proof was measured by using high-resistance meter R8340 manufactured by ADVANTEST CORPORATION. As a result, the capacitor had initial performance in which electrostatic capacity was 0.25 mF and voltage proof was 30V in the same manner as the Example 1.

Next, a seventh embodiment of the capacitor element included in the invention will be explained. A capacitor element 170 of the embodiment is the same as the capacitor element of the previous sixth embodiment in a point that the insulator layer is made of an insulating resin layer, therefore, the explanation is omitted.

Next, a seventh embodiment of a method of manufacturing the capacitor element included in the invention will be explained with reference of FIG. 23 and FIG. 24. FIG. 23 is a flowchart showing an outline of one example of manufacturing process of the method of manufacturing the capacitor element 170 according to the embodiment. FIG. 24J711 to FIG. 24J722 are longitudinal cross-sectional views for explaining forming processes of insulator layers in the manufacturing process. Signs put to respective processes in FIG. 23 correspond to signs in parentheses of FIG. 24.

The outline of the method of manufacturing the capacitor element 170 of the present embodiment is as follows as shown in FIG. 23, a: a foil 13 of a first valve metal is prepared, b, (d): micro concave portions 15a1 (15b1) are formed on one principal surface 13a of the foil 13 by, for example, indentation. Next, c, e: a dielectric substance 14 including concave portions 15a2 belonging to a first group and concave portions 15b2 belonging to a second group having different depths in the one principal surface 13a of the foil 13 is formed by, for example, anodic oxidation. Next, g7: bottom portions of the concave portions 15a2 belonging to the first group of the dielectric substance 14 are removed by, for example, chemical etching to form pores 15a3 belonging to the first group. Next, f71: a first feeding power electrode 12a' is formed on one principal surface 14a of the dielectric substance 14 by, for example, electroless deposition. Next, h7: first pillar-shaped electrodes 16a are formed in the pores 15a3 belonging to the first group by, for example, electrolytic plating, leaving tips of the pores 15a3 of the other principal surface 14b side of the dielectric substance 14. Next, i7: the first feeding power electrode 12a' and bottom portions of the concave portions 15b2 belonging to the second group are removed by, for example, chemical etching to form pores 15b3 belonging to the second group. Next, as a process corresponding to the former insulating layer forming process j61 of the sixth embodiment, j711: an insulating resin film 177a is formed on the other principal surface 14b of tips "t" side of the first pillar-shaped electrodes 16a in the pores 15a3 belonging to the first group, then, j712: an insulator layer 178a is formed on the tips "t" of the first pillar-shaped electrodes 16a in the pores 15a3 belonging to the first group so as to fill the pores 15a3 by removing the insulating resin film 177a on the other principal surface 14b except the inside of the pores 15a3 belonging to the first group. Next, k71: a second hide electrode 12b is formed on the other principal surface 14b of the dielectric substance 14 by, for example, electroless deposition. Next, k72: second pillar-shaped electrodes 16b are formed in pores 15b3 belonging to the second group, leaving tips of the pores 15b3 of one principal surface 14a side of the dielectric substance 14. Next, as the latter insulating layer forming process j62 of the previous sixth embodiment, j721: an insulating resin film 177b is formed on tips "t" of the second pillar-shaped electrodes 16b in the pores 15b3 belonging to the second group so as to fill the pores 15b3, then, j722: an insulator layer 178b is formed on the tips "t" of the second pillar-shaped electrodes 16b in the pores 15b3 belonging to the second group so as to fill the pores 15b3 by removing the insulating resin film 177b on one principal surface 14a except the pores 15b3 belonging to the second group. Next, f72: a first hide electrode 12a is formed on one principal surface 14a of the dielectric substance 14, which touches base ends "b" of the first pillar-shaped electrodes 16a.

In the method of manufacturing the capacitor element 170 according to the embodiment, in the same manner in the previous second embodiment, the insulator layer 178a on the tips "t" of the first pillar-shaped electrodes 16a in the pores 15a3 belonging to the first group and the insulator layer 178b on the tips "t" of the second pillar-shaped electrodes 16b in the pores 15b3 belonging to the second group are formed in processes which are independent from each other in the manufacturing process.

A preferred embodiment of the insulating resin film is explained. Specifically, as materials for the insulating resin film, a polyimide resin, an epoxy resin and the like are preferable. The thickness of the insulating resin film is preferably from several ten nm to several μm. As a forming method of the insulating resin film, well-known coat methods such as a spin coat method, spraying method and the like can be used.

EXAMPLE 7

First, the foil 13 made of Al having the length of 3.0 mm, the width of 1.5 mm and the thickness of 200 μm was prepared, and the porous plate dielectric substance 14 including concave portions 15a2 belonging to the first group and concave portions 15b2 belonging to the second group having different depths was formed in the same manner as the previous Example 1.

Next, in the same manner as the Example 6, the pores 15a3 belonging to the first group, the first pillar-shaped electrodes 16a and the pores 15b3 belonging to the second group were formed. Next, a solution of polyimide resin was filled so as to fill tips "t" of first pillar-shaped electrodes 16a in the pores 15a3 belonging to the first group and the pores 15b3 belonging to the second group of the other principal surface 14b side by coating the solution of polyimide resin by the spin coat method to form the insulating resin film 177a on the other principal surface 14b of the dielectric substance 14. Next, the insulating resin film 177a inside the pores 15b3 belonging to the second group and on the other principal surface 14b were removed by photolithography, then, heat treatment was performed in an atmosphere at 150° C. for 30 minutes, curing the insulating resin film 177a selectively remaining only on the tips "t" of the first pillar-shaped electrodes 16a in the pores 15a3 belonging to the first group to form the insulator layer 178a made of insulating resin having the thickness of 75 nm. Next, a second hide electrode 12b made of Ni was formed on the other principal surface 14b of the dielectric substance 14 by electroless deposition. Next, second pillar-shaped electrodes 16b were formed in the pores 15b3 belonging to the second group by Cu electrolytic plating, using the hide electrode 12b as a feeding power layer, leaving tips of the pores 15b3 of one principal surface 14a side of the dielectric substance 14. Next, the insulating resin film 177b was formed on tips "t" of the second pillar-shaped electrodes 16b in the pores 15b3 belonging to the second group in the same manner as described above so as to fill the pores 15b3 by coating the solution of polyimide resin in the same manner as described above. Next, the insulating resin film 177b on one principal surface 14a was removed by etchback, then, heat treatment was performed in the same manner as described above to form the insulator layer 178b made of the insulating resin film having the thickness of 75 nm which fills the tips "t" of the second pillar-shaped electrodes 16b in the pores 15b3 belonging to the second group. Next, the first hide electrode 12a was formed on one principal surface 14a of the dielectric substance 14 so as to touch base ends "b" of the first pillar-shaped electrodes 16a by Cu electrolytic plating to obtain the capacitor element 170. In the capacitor element 170, as in the capacitor element 10 of the Example 1, the first pillar-shaped electrode 16a and the second pillar-shaped electrode 16b respectively had 30 nm in diameter, the pitch between the first pillar-shaped electrode 16a and the second pillar-shaped electrode 16b was 70 nm, the linear dimension of a portion in which the first pillar-shaped electrode 16a and the second pillar-shaped electrode 16b were opposed to each other was 100 μm.

Concerning the obtained capacitor element 170, electrostatic capacity was measured by using an LCR meter 4263B manufactured by Agilent as well as voltage proof was measured by using high-resistance meter R8340 manufactured by ADVANTEST CORPORATION. As a result, the capacitor had initial performance in which electrostatic capacity was 0.25 mF and voltage proof was 30V in the same manner as the Example 1.

Next, an eighth embodiment of a capacitor element included in the invention will be explained. A capacitor element 180 according to the embodiment is different from the capacitor elements of previous first to seventh embodiments in a point that the insulator layer is made of an oxide of a second valve metal. Since the other configurations are the same as the previous first embodiment, the explanation thereof is omitted. The capacitor element 180 of the embodiment has a characteristic that compatibility between an insulator layer and a dielectric layer is high when the insulator layer are the same material as the dielectric layer.

Next, an eighth embodiment of a method of manufacturing the capacitor element included in the invention will be explained with reference of FIG. 25 to FIG. 28. FIG. 25 is a flowchart showing an outline of one example of manufacturing process of the method of manufacturing the capacitor element 180 according to the embodiment. FIG. 26 and FIG. 28 are longitudinal cross-sectional views corresponding to FIG. 1B for explaining respective processes in the manufacturing process, continued from FIG. 4A to FIG. 4E of the above first embodiment to FIG. 26G8 to FIG. J811, FIG. 27J812 to FIG. 27K82, and FIG. 28J821 to FIG. 28F82 in order. Signs put to respective processes in FIG. 25 correspond to signs in parentheses of FIG. 26 to FIG. 28.

The outline of the method of manufacturing the capacitor element 180 of the present embodiment is as follows as shown in FIG. 25, a: a foil 13 of a first valve metal is prepared, b, (d): micro concave portions 15a1 (15b1) are formed on one principal surface 13a of the foil 13 by, for example, indentation. Next, c, e: a dielectric substance 14 including concave portions 15a2 belonging to a first group and concave portions 15b2 belonging to a second group having different depths in the one principal surface 13a of the foil 13 is formed by, for example, anodic oxidation. Next, g8: bottom portions of the concave portions 15a2 belonging to the first group of the dielectric substance 14 are removed by, for example, chemical etching to form pores 15a3 belonging to the first group. Next, f81: a first feeding power electrode 12a' is formed on one principal surface 14a of the dielectric substance 14 by, for example, electroless deposition. Next, h8: first pillar-shaped electrodes 16a are formed in the pores 15a3 belonging to the first group by, for example, electrolytic plating, leaving tips of the pores 15a3 of the other principal surface 14b side of the dielectric substance 14. Next, i81: bottom portions of the concave portions 15b2 belonging to the second group are removed by, for example, chemical etching to form pores 15b3 belonging to the second group. Next, j811: a second-valve metal layer 187a is formed on the other principal surface 14b of tips "t" side of the first pillar-shaped electrodes 16a in the pores 15a3 belonging to the first group. Next, j812: the second-valve metal layer 187a on the other principal surface 14b except the inside of the pores 15a3 belonging to the first group is removed. Next, j813: the second-valve metal layer 187a is anodized to form an insulator layer 188a made of an oxide of the second valve metal, using the first feeding power electrode 12a' as a feeding power layer. Next, i82: the first feeding power electrode 12a' is removed by, for example, chemical etching. Next, k81: a second hide electrode 12b is formed on the other principal surface 14b of the dielectric substance 14, for example, by electroless deposition. Next, k82: second pillar-shaped electrodes 16b are formed on the second hide electrode 12b in the pores 15b3 belonging to the second group, leaving tips of the pores 15b3 of one principal surface 14a side of the dielectric substance 14. Next, j821: a second-valve metal layer 187b is formed on one principal surface 14a of tips "t" side of the second pillar-shaped electrodes 16b in the pores 15b3 belonging to the second group. Next, j822: the second-valve metal layer 187b on one principal surface 14a except the inside the pores 15b3 belonging to the second group is removed. Next, j823: the second-valve metal layer 187b is anodized, using the second hide electrode 12b as a feeding power layer to form an insulator layer 188b made of an oxide of the second valve metal. Next, f82: a first hide electrode 12a touching base ends "b" of the first pillar-shaped electrodes 16a is formed on one principal surface 14a of the dielectric substance 14.

In the method of manufacturing the capacitor element 180 according the embodiment, in the same manner in the previous second embodiment, the insulator layer 188a on the tips "t" of the first pillar-shaped electrodes 16a in the pores 15a3 belonging to the first group and the insulator layer 188b on the tips "t" of the second pillar-shaped electrodes 16b in the pores 15b3 belonging to the second group are formed in processes which are independent from each other in the manufacturing process.

Next, a preferred embodiment of the second valve metal is explained. Specifically, as a second valve metal, Al, Ta, Nb, Ti, Zr, Hf, Zn, W, Sb and the like can be used. The thickness of the insulator layer made of an oxide of the second valve metal is preferably several nm to several hundred nm. Additionally, the second valve metal may the same as the first valve metal.

EXAMPLE 8

First, the foil 13 made of Al having the length of 3.0 mm, the width of 1.5 mm and the thickness of 200 μm was prepared, and the porous plate dielectric substance 14 including the concave portions 15a2 belonging to the first group and the concave portions 15b2 belonging to the second group having different depths was formed in the same manner as the previous Example 1.

Next, bottoms of concave portion 15a2 belonging to the first group was removed by chemical etching using an $HgCl_2$ solution to form the pores 15a3 belonging to the first group. Next, the first feeding power electrode 12a' made of Ni was formed on one principal surface 14a by electroless deposition. Next, first pillar-shaped electrodes 16a were formed in the pores 15a3 belonging to the first group by Cu electrolytic plating by feeding power to the first feeding power electrode 12a', leaving tips of the pores 15a3 of the other principal surface 14b side of the dielectric substance 14. Next, bottoms of concave portions 15b2 belonging to the second group were removed by chemical etching using the $HgCl_2$ solution to form the pores 15b3 belonging to the second group. Next, Al was sputtered on the other principal surface 14b side of the dielectric substance 14 to form the second-valve metal layer 187a made of Al on tips "t" of the first pillar-shaped electrodes 16a in the pores 15a3 belonging to the first group. Next, the second-valve metal layer 187a on the other principal surface 14b except the inside of the pores 15a3 belonging to the first group was removed by etchback. Next, the second-valve metal layer 187a was anodized, using the first feeding power electrode 12a' as a feeding power layer to form the insulator layer 188a made of an oxide of the second valve metal ($Al_2O_3$) having the thickness of 3 μm. Next, the first feeding power electrode 12a' was removed by chemical etching. Next, the second hide electrode 12b made of Ni was formed on the other principal surface 14b of the dielectric substance 14 by electroless deposition. Next, second pillar-shaped electrodes 16b were formed in pores 15b3 belonging to the second group by Cu electrolytic plating, using the hide electrode 12b as a feeding power layer, leaving tips of the pores 15b3 of one principal surface 14a side of the dielectric substance 14. Next, in the same manner as described above, the insulator layer 188b made of the oxide of the second valve metal ($Al_2O_3$) having the thickness of 3 μm is formed, which fills tips "t" of the second pillar-shaped electrodes 16b in the pores 15b3 belonging to the second group. Next, the first hide electrode 12a was formed on one principal surface 14a of the dielectric substance 14 by Cu electrolytic plating so as to touch base ends "b" of the first pillar-shaped electrodes 16a to form the capacitor element 180. In the capacitor element 180, as in the capacitor element 10 of the Example 1, the first pillar-shaped electrode 16a and the second pillar-shaped electrode 16b respectively had 30 nm in diameter, the pitch between the first pillar-shaped electrode 16a and the second pillar-shaped electrode 16b was 70 nm, the linear dimension of a portion in which the first pillar-shaped electrode 16a and the second pillar-shaped electrode 16b were opposed to each other was 100 μm.

Concerning the obtained capacitor element 180, electrostatic capacity was measured by using an LCR meter 4263B manufactured by Agilent as well as voltage proof was measured by using high-resistance meter R8340 manufactured by ADVANTEST CORPORATION. As a result, the capacitor had initial performance in which electrostatic capacity was 0.25 mF and voltage proof was 30V in the same manner as the Example 1.

Next, a ninth embodiment of a capacitor element included in the invention will be explained. A capacitor element 190 according to the embodiment is different from the capacitor elements of previous first to eighth embodiments in a point that the insulator layer is made of air space. Since the other configurations are the same as the previous first embodiment, the explanation thereof is omitted. The capacitor element 190 of the embodiment has a characteristic that leakage current is small.

Next, a ninth embodiment of a method of manufacturing the capacitor element included in the invention will be explained with reference of FIG. 29 to FIG. 31. FIG. 29 is a flowchart showing an outline of one example of manufacturing process of the method of manufacturing the capacitor element 190 according to the embodiment. FIG. 30 and FIG. 31 are longitudinal cross-sectional views corresponding to FIG. 1B for explaining respective processes in the manufacturing process, continued from FIG. 4A to FIG. 4E of the above first embodiment to FIG. 30G9 to FIG. 30I9, FIG. 31K91 to FIG. 31F92 in order. Signs put to respective processes in FIG. 29 correspond to signs in parentheses of FIG. 30 and FIG. 31.

The outline of the method of manufacturing the capacitor element 190 of the present embodiment is as follows as shown in FIG. 29, a: a foil 13 of a first valve metal is prepared, b, (d): micro concave portions 15a1 (15b1) are formed on one principal surface 13a of the foil 13 by, for example, indentation. Next, c, e: a dielectric substance 14 including concave portions 15a2 belonging to a first group and concave portions 15b2 belonging to a second group having different depths in the one principal surface 13a of the foil 13 is formed by, for example, anodic oxidation. Next, g9: bottom portions of the concave portions 15a2 belonging to the first group of the dielectric substance 14 are removed by, for example, chemical etching to form pores 15a3 belonging to the first group. Next, f91: a first feeding power electrode 12a' is formed on one principal surface 14a of the dielectric substance 14 by, for example, electroless deposition. Next, h9: first pillar-shaped electrodes 16a are formed in the pores 15a3 belonging to the first group by, for example, electrolytic plating, leaving tips of the pores 15a3 of the other principal surface 14b side of the dielectric substance 14. Next, i9: a first feeding power electrode 12a' and bottom portions of the concave portions 15b2 belonging to the second group are removed by, for example, chemical etching to form pores 15b3 belonging to the second group. Next, k91: a second hide electrode 12b is formed through an insulator layer 198a made of air space between tips "t" of the first pillar-shaped electrodes 16a and the second hide electrode 12b on the other principal surface 14b of the dielectric substance 14 by, for example, sputtering. Next, k92: second pillar-shaped electrodes 16b are formed on the second hide electrode 12b in the pores 15b3 belonging to the second group, leaving tips of the pores 15b3 of the one principal surface 14a side of the dielectric substance 14. Next, f92: a first hide electrode 12a connecting to base ends "b" of the first pillar-shaped electrodes 16a through an insulator layer 198b made of air space between the tips of the second pillar-shaped electrodes 16b and the first hide electrode 12a is formed on one principal surface 14a of the dielectric substance 14.

In the method of manufacturing the capacitor element 190 according to the embodiment, in the same manner in the previous second embodiment, the insulator layer 198a on the tips "t" of the first pillar-shaped electrodes 16a in the pores 15a3 belonging to the first group and the insulator layer 198b on the tips "t" of the second pillar-shaped electrodes 16b in the pores 15b3 belonging to the second group are formed in processes which are independent from each other in the manufacturing process.

A preferred embodiment of the air space is explained. Specifically, the thickness diameter of the air space is preferably several ten nm to several μm. The method of manufacturing the capacitor element 190 according to the embodiment has a characteristic that the process is simple.

EXAMPLE 9

First, the foil 13 made of Al having the length of 3.0 mm, the width of 1.5 mm and the thickness of 200 μm was prepared, and the porous plate dielectric substance 14 including concave portions 15a2 belonging to the first group and concave portions 15b2 belonging to the second group having different depths was formed in the same manner as the previous Example 1.

Next, in the same manner as the Example 6, the pores 15a3 belonging to the first group, the first pillar-shaped electrodes 16a and the pores 15b3 belonging to the second group were formed. Next, the second hide electrode 12b was formed on the other principal surface 14b of the dielectric substance 14 by Ni-sputtering through an insulating layer 198a made of air space whose space size is 8.5 μm between the tips "t" of the first pillar-shaped electrodes 16a and the second hide electrode 12b. Next, the second pillar-shaped electrodes 16b were formed in the pores 15b3 belonging to the second group, using the hide electrode 12b as a feeding power layer by Cu electrolytic plating. Next, in the same manner as described above, the first hide electrode 12a was formed on one principal surface 14a of the dielectric substance 14 by Ni-sputtering so as to connect to base ends "b" of the first pillar-shaped electrodes 16a through an insulator layer 198b made of air space whose space size is 8.5 μm between the tips "t" of the second pillar-shaped electrodes 16b in the pores 15b3 belonging to the second group and the first hide electrode 12a to obtain the capacitor element 190. In the capacitor element 190, the first pillar-shaped electrode 16a and the second pillar-shaped electrode 16b respectively had 30 nm in diameter, the pitch between the first pillar-shaped electrode 16a and the second pillar-shaped electrode 16b was 70 nm, the linear dimension of a portion in which the first pillar-shaped electrode 16a and the second pillar-shaped electrode 16b were opposed to each other was 100 μm.

Concerning the obtained capacitor element 190, electrostatic capacity was measured by using an LCR meter 4263B manufactured by Agilent as well as voltage proof was measured by using high-resistance meter R8340 manufactured by ADVANTEST CORPORATION. As a result, the capacitor had initial performance in which electrostatic capacity was 0.25 mF and voltage proof was 30V in the same manner as the Example 1.

In all methods of manufacturing the capacitor element according to the second to the ninth embodiment, the insulator layer on tips of the first pillar-shaped electrodes in pores belonging to the first group and the insulator layer on tips of the second pillar-shaped electrodes in pores belonging to the second group are formed in processes which are independent from each other in the manufacturing process as described above.

Accordingly, the invention is not limited to the above respective embodiments, and for example, the insulator layer on the tips of the first pillar-shaped electrodes and the insulator layer on tips of the second pillar-shaped electrodes are formed by insulator layers of materials different from each other. Also, when the length of the first pillar-shaped electrodes and the length of the second pillar-shaped electrodes are different, for example, insulator layers having thicknesses different from each other can be formed.

Next, a first embodiment of a capacitor using the capacitor element included in the invention will be explained with reference to FIG. 32. FIG. 32 shows a capacitor 20 including the capacitor element 10 of the first embodiment as a capacitor unit CU. In the capacitor 20, terminal portions 29a, 29b respectively made of, for example, a conductive metallic plate are connected to the first hide electrode 12a and the second hide electrode 12b as well as an exterior resin covering the capacitor unit CU is included.

It is preferable to apply Cu, phosphorous bronze, various types of stainless steels, Ni42-Fe alloy and the like as the terminal portions 29a, 29b. The connection between the hide electrodes 12a, 12b and the terminal portions 29a, 29b are preferably performed by resistance-welding, diffused junction, adhesion by conductive adhesives such as a carbon paste and the like, though not shown.

Next, a second embodiment of a capacitor using the capacitor element included in the invention will be explained with reference to FIG. 33. FIG. 33 shows a capacitor 30 including the capacitor elements 10 of the first embodiment as capacitor units CU1, CU2 and CU3. Respective capacitor units CU1, CU2 and CU3 are connected in parallel with terminal portions 39a, 39b, respectively, which have large electrostatic capacity.

Next, an embodiment of a capacitor-embedded multilayer interconnection substrate using the capacitor element included in the invention will be explained with reference to FIG. 34. FIG. 34 shows a capacitor-embedded multilayer interconnection substrate 40 including the capacitor element 10 of the first embodiment as a capacitor unit.

In the capacitor-embedded multilayer interconnection substrate 40, the capacitor unit CU is embedded at the bottom thereof, in which the first hide electrode 12a is connected to an internal conductor of the capacitor-embedded multilayer interconnection substrate 40. Additionally, the second hide electrode 12b is exposed at the bottom of the multilayer interconnection substrate with other terminal electrodes.

The invention is suitable to be applied to various electronic devices which are light, thin, short and small, using a small-sized and large-capacity capacitor.

The present application claims priority to Japanese Patent Application No. 2007-197039, filed Jul. 30, 2007, and No. 2007-329326, filed Dec. 12, 2007, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A capacitor element comprising:
   a porous plate dielectric substance made of an anodic oxide of a first valve metal, in which plural pores belonging to a first group and plural pores belonging to a second group, which pierce through in the thickness direction, are formed, wherein single pores belonging to the first group and single pores belonging to the second group are arranged alternately in a direction perpendicular to the thickness direction, each pore being a nano-sized pore having a diameter of several nm to several hundred nm;
   first pillar-shaped electrodes formed in the plural pores belonging to the first group respectively wherein base ends thereof are exposed at one principal surface of the dielectric substance;
   second pillar-shaped electrodes formed in the plural pores belonging to the second group respectively wherein base ends thereof are exposed at another principal surface of the dielectric substance;
   insulator layers provided respectively on tips of the first pillar-shaped electrodes in the pores belonging to the first group so as to fill the pores as well as on tips of the second pillar-shaped electrodes in the pores belonging to the second group so as to fill the pores;
   a first hide electrode provided on the one principal surface of the dielectric substance so as to connect to the base ends of the first pillar-shaped electrodes; and
   a second hide electrode provided on the another principal surface of the dielectric substance so as to connect to the base ends of the second pillar-shaped electrodes.

2. The capacitor element according to claim 1, wherein the insulator layer is formed by pyrolyzing an electroconductive polymer.

3. The capacitor element according to claim 2, wherein voltage is applied between the first hide electrode and the second hide electrode.

4. The capacitor element according to claim 2, wherein the insulator layer is formed by pyrolzying pyrrole, polyaniline, polyethylene dioxythiophene, triazinethiol, or poly(thienyl pyrrole).

5. The capacitor element according to claim 1, wherein the insulator layer is made of a $TiO_2$ film.

6. The capacitor element according to claim 1, wherein the insulator layer is made of an $SiO_2$ film.

7. The capacitor element according to claim 1, wherein the insulator layer is made of an insulating resin layer.

8. The capacitor element according to claim 1, wherein the insulator layer is made of an anodic oxide of a second valve metal.

9. The capacitor element according to claim 8, wherein the second valve metal is selected from the group consisting of Al, Ta, Nb, Ti, Zr, Hf, Zn, W, and Sb.

10. The capacitor element according to claim 8, wherein the second valve metal is the same as the first valve metal.

11. The capacitor element according to claim 1, wherein the insulator layer is made of air space.

12. The capacitor element according to claim 1, wherein the insulator layer is formed by pyrolyzing an electrodeposited polyimide resin.

13. The capacitor element according to claim 1, wherein the insulator layer has a thickness of 100 nm to 10 μm.

14. The capacitor element according to claim 1, wherein the first valve metal is selected from the group consisting of Al, Ta, Nb, Ti, Hf, W, V, and alloys of the foregoing.

* * * * *